(12) United States Patent
Ismail et al.

(10) Patent No.: US 7,370,342 B2
(45) Date of Patent: May 6, 2008

(54) METHOD AND APPARATUS FOR DELIVERY OF TARGETED VIDEO PROGRAMMING

(75) Inventors: Labeeb K. Ismail, Fremont, CA (US); Amar N. Gogoi, Fremont, CA (US); Manu Mehta, Fremont, CA (US)

(73) Assignee: Metabyte Networks, Inc., San Diego, CA (US)

( * ) Notice: Subject to any disclaimer, the term of this patent is extended or adjusted under 35 U.S.C. 154(b) by 159 days.

(21) Appl. No.: 11/438,928

(22) Filed: May 22, 2006

(65) Prior Publication Data

US 2006/0212900 A1   Sep. 21, 2006

Related U.S. Application Data

(60) Division of application No. 09/652,478, filed on Aug. 31, 2000, now Pat. No. 7,146,627, which is a continuation-in-part of application No. 09/096,592, filed on Jun. 12, 1998, now Pat. No. 6,614,987.

(60) Provisional application No. 60/152,153, filed on Aug. 31, 1999, provisional application No. 60/195,547, filed on Apr. 7, 2000, provisional application No. 60/202,086, filed on May 4, 2000, provisional application No. 60/203,104, filed on May 8, 2000.

(51) Int. Cl.
*G06F 3/00* (2006.01)
*H04N 7/173* (2006.01)
*H04N 7/16* (2006.01)

(52) U.S. Cl. ............... 725/46; 725/93; 725/116; 725/146

(58) Field of Classification Search ............ 725/46, 725/95, 116, 146
See application file for complete search history.

(56) References Cited

U.S. PATENT DOCUMENTS 5,371,551 A   12/1994   Logan et al. ............ 386/112

(Continued)

FOREIGN PATENT DOCUMENTS

EP   0 823 815 A2   2/1998

(Continued)

OTHER PUBLICATIONS

*Oracle Lite, The Client Database for Java*; by Oracle Lite, Jun. 5, 1998, http://www.oracle.com/clientdb/olite/.

(Continued)

*Primary Examiner*—Kieu-Oanh Bui
(74) *Attorney, Agent, or Firm*—Kenneth L. Sherman; Myers Dawes Andras & Sherman, LLP

(57) ABSTRACT

A system residing preferably in a television set-top box monitors the television watching habits of one or more viewers and creates one or more profiles for each viewers descriptive of various characteristics of each viewers, including television watching preferences and demographics. The set-top box is able to select among various available video programming segments to create customized and/or targeted video programs for delivery to the viewer or viewers as a linear program. The customized linear video programs may include targeted content, advertising, and other video programming.

34 Claims, 50 Drawing Sheets

U.S. PATENT DOCUMENTS

| | | | |
|---|---|---|---|
| 5,446,919 A | 8/1995 | Wilkins | 455/6.2 |
| 5,463,565 A | 10/1995 | Cookson et al. | 364/514 |
| 5,483,278 A | 1/1996 | Strubbe et al. | 725/61 |
| 5,559,549 A | 9/1996 | Hendricks et al. | 348/6 |
| 5,565,909 A | 10/1996 | Thibadeau et al. | 348/9 |
| 5,585,865 A | 12/1996 | Amano et al. | 725/14 |
| 5,635,989 A | 6/1997 | Rothmuller | 348/906 |
| 5,636,346 A | 6/1997 | Saxe | 395/201 |
| 5,664,046 A | 9/1997 | Abecassis | 386/125 |
| 5,699,473 A | 12/1997 | Kim | 386/109 |
| 5,701,383 A | 12/1997 | Russo et al. | 360/63 |
| 5,704,017 A | 12/1997 | Heckerman et al. | 395/61 |
| 5,717,923 A | 2/1998 | Dedrick | 395/613 |
| 5,754,651 A | 5/1998 | Blatter et al. | 380/241 |
| 5,758,257 A | 5/1998 | Herz et al. | 455/2 |
| 5,758,259 A | 5/1998 | Lawler | 725/45 |
| 5,761,371 A | 6/1998 | Ohno et al. | 386/46 |
| 5,774,170 A | 6/1998 | Hite et al. | 348/9 |
| 5,781,228 A | 7/1998 | Sposato | 348/13 |
| 5,801,747 A | 9/1998 | Bedard | 348/1 |
| 5,848,396 A | 12/1998 | Gerace | 705/10 |
| 5,867,226 A | 2/1999 | Wehmeyer et al. | 348/906 |
| 5,898,456 A | 4/1999 | Wahl | 725/91 |
| 5,953,073 A | 9/1999 | Kozina et al. | 386/1 |
| 5,977,964 A | 11/1999 | Williams et al. | 386/83 |
| 6,002,393 A | 12/1999 | Hite et al. | 345/327 |
| 6,005,561 A | 12/1999 | Hawkins et al. | 345/327 |
| 6,018,612 A | 1/2000 | Thomason et al. | 386/125 |
| 6,029,195 A | 2/2000 | Herz | 709/219 |
| 6,091,883 A | 7/2000 | Artigalas et al. | 386/83 |
| 6,134,532 A | 10/2000 | Lazarus et al. | 705/14 |
| 6,157,772 A | 12/2000 | Kim | 386/83 |
| 6,169,842 B1 | 1/2001 | Pijnenburg et al. | 386/109 |
| 6,233,389 B1 | 5/2001 | Barton | |
| 6,236,395 B1 | 5/2001 | Sezan et al. | 345/328 |
| 6,304,714 B1 | 10/2001 | Krause et al. | 386/125 |
| 6,324,338 B1 | 11/2001 | Wood | |
| 6,466,241 B1 | 10/2002 | Schindler | 715/854 |
| 6,553,178 B2 | 4/2003 | Abecassis | 386/83 |
| 6,587,561 B1 | 7/2003 | Sered et al. | 380/241 |
| 7,096,486 B1 | 8/2006 | Ukai et al. | 725/58 |

FOREIGN PATENT DOCUMENTS

| | | |
|---|---|---|
| EP | 0 838 951 A2 | 4/1998 |
| EP | 0 909 095 | 4/1999 |
| EP | 0 705 036 B1 | 3/2002 |
| WO | WO 92/22983 | 12/1992 |
| WO | WO 94/13107 A1 | 6/1994 |
| WO | WO 95/01057 A1 | 1/1995 |
| WO | WO 96/31980 A1 | 10/1996 |
| WO | WO 97/48230 A1 | 12/1997 |
| WO | WO 98/28906 | 7/1998 |

OTHER PUBLICATIONS

*Reference Material*, by OpenCable, Jun. 5, 1998, http://www.opencable.com/reference/index.html.

*API Requirements for the Advanced Set-Top Box*, by OpenCable, Jun. 5, 1998, http://www.opencable.com/reference/apireq.html.

*The Challenges of Convergence for Set-Top Box Manufacturers*; IBM Microelectronics, Jun. 5, 1998, http://www.chips.ibm.com/settopbox/007066.html.

*White Paper, Set-Top Box Solutions: Helping Customers Meet the Challenges of Convergence*; IBM Microelectronics, Jun. 5, 1998, http://www.chips.ibm.com/settopbox/whitepaper.html.

*Set-Top Box Peripheral Chip*; IBM Microelectronics, Jun. 5, 1998, http://www.chips.ibm.com/settopbox/peripheral.html.

*Set-Top Box Reference Design Kit*; IBM Microelectronics, Jun. 5, 1998, http://www.chips.ibm.com/settopbox/designkit.html.

*Set-Top Box Solutions*; IBM Microelectronics, Jun. 5, 1998, http://www.chips.ibm.com/settopbox/overview.html.

*OpenTV Operating Environment*, Technical White Paper, OpenTV, Inc., Jun. 8, 1998, http://www.opentv.com/hpk.html.

*Application Development for OpenTV*, Technical White Paper, OpenTV, Inc., Jun. 8, 1998, http://www.opentv.com/sdk.html.

*STARSIGHT: The Interactive On-screen TV Program Guide Service With One-button VCR Programming*; StarSight Telecast, Inc., Jun. 9, 1998, http://www.starsight.com/brochure.html.

*StarSight: An Introduction*, StarSight Telecast, Inc., Jun. 9, 1998, http://www.starsight.com/costory.html.

*Services for On-Screen Guides*; TVData, Jun. 9, 1998, http://www.tvdata.com/tv.htm.

*The Largest Databases of Television Information in the World*, TVData, Jun. 9, 1998, http://www.tvdata.com/data.htm.

"Metabyte Personalized Microsoft TV," Press Release, 1 page.

Kageyama et al., "*A Free Time-Shift DVD Video Recorder*"; Aug. 1997, IEEE pp. 463-473.

Examples for traits

Movie
Adventure
Sports
Mad About You
dynamic trait 1
Dynamic trait 2
NBC NEWS
FRIDAY Movie
Premier Mad About You

← 126

Examples for Liking for viewer N

Movie = 14
Adventure = 3
Sports = 0.3
Mad About You = 5
dynamic trait 1 = 3
Dynamic trait 2 = 5
NBC NEWS = 13
FRIDAY Movie = 18
Premier Mad About You = 15

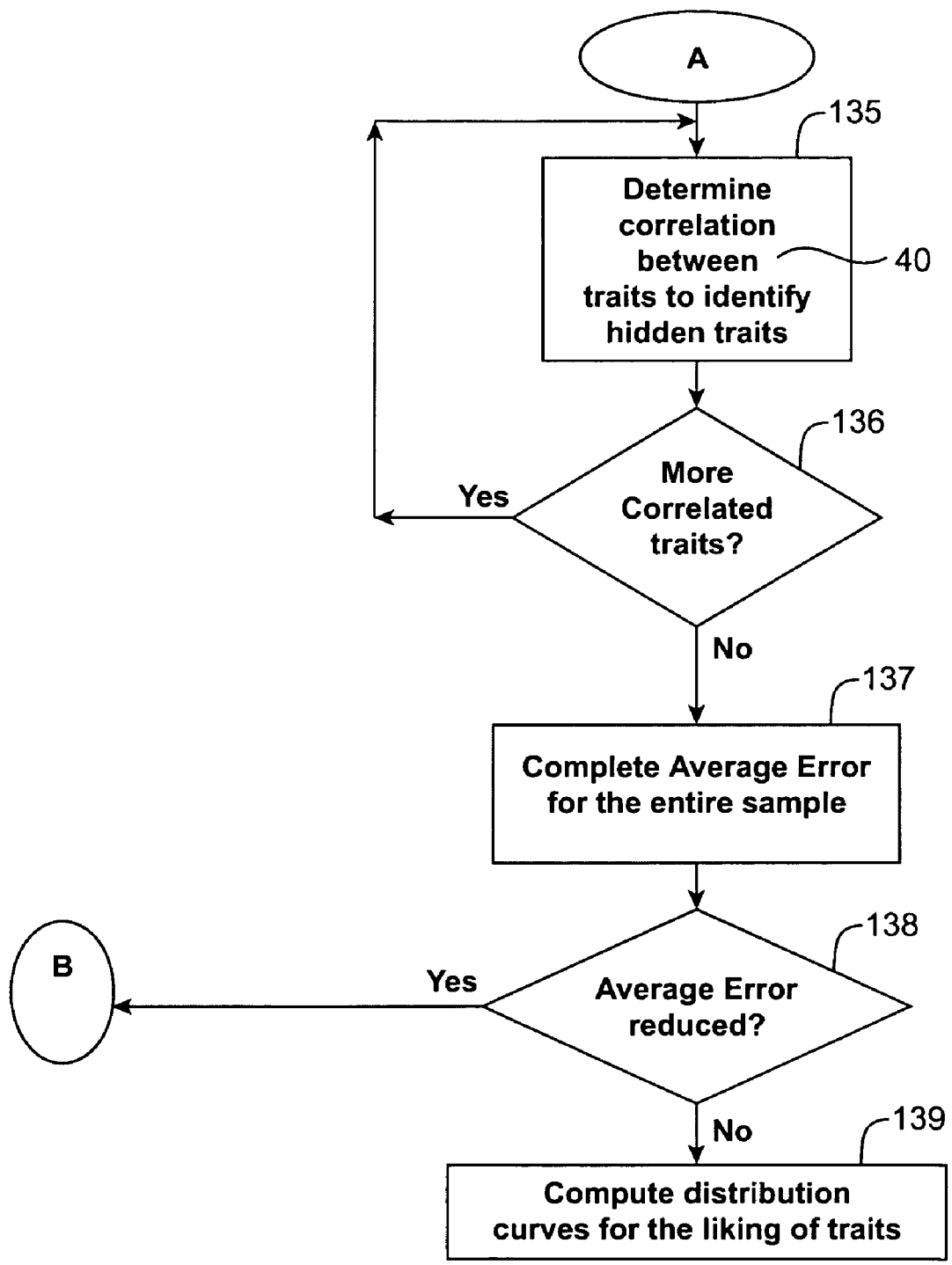
FIG. (5b)

RECOGNIZING HIDDEN TRAITS IN PROGRAMS $t_m$ & $t_n$ are correlated

⇒ $t_m$ can be expressed as $t_m = t_x + t_{m'}$ $t_n$ can be expressed as $t_n = Ct_x + t_{m'}$

Computing Traitness of a trait a program
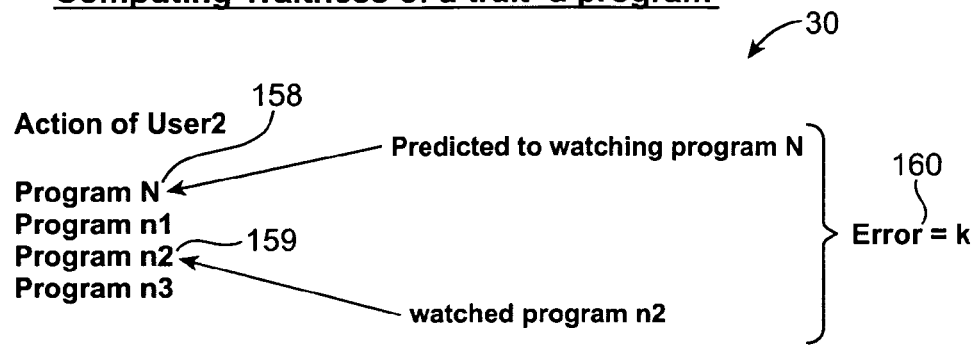
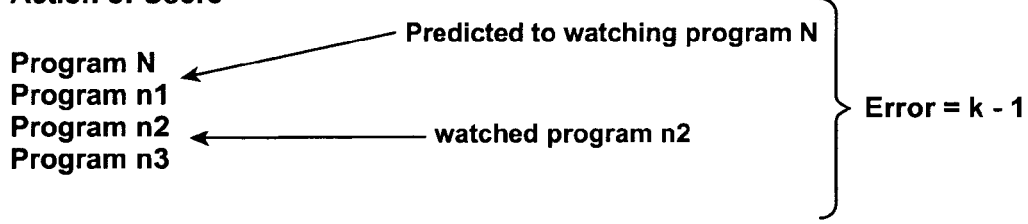
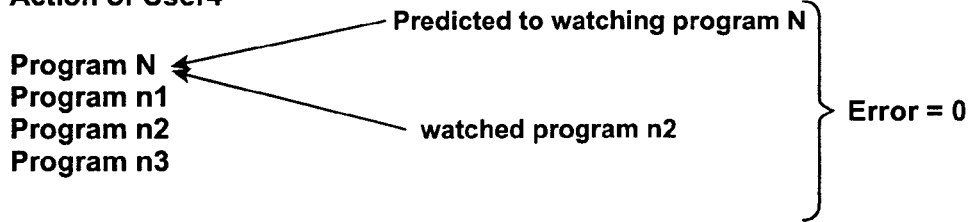
FIG. 9(b)

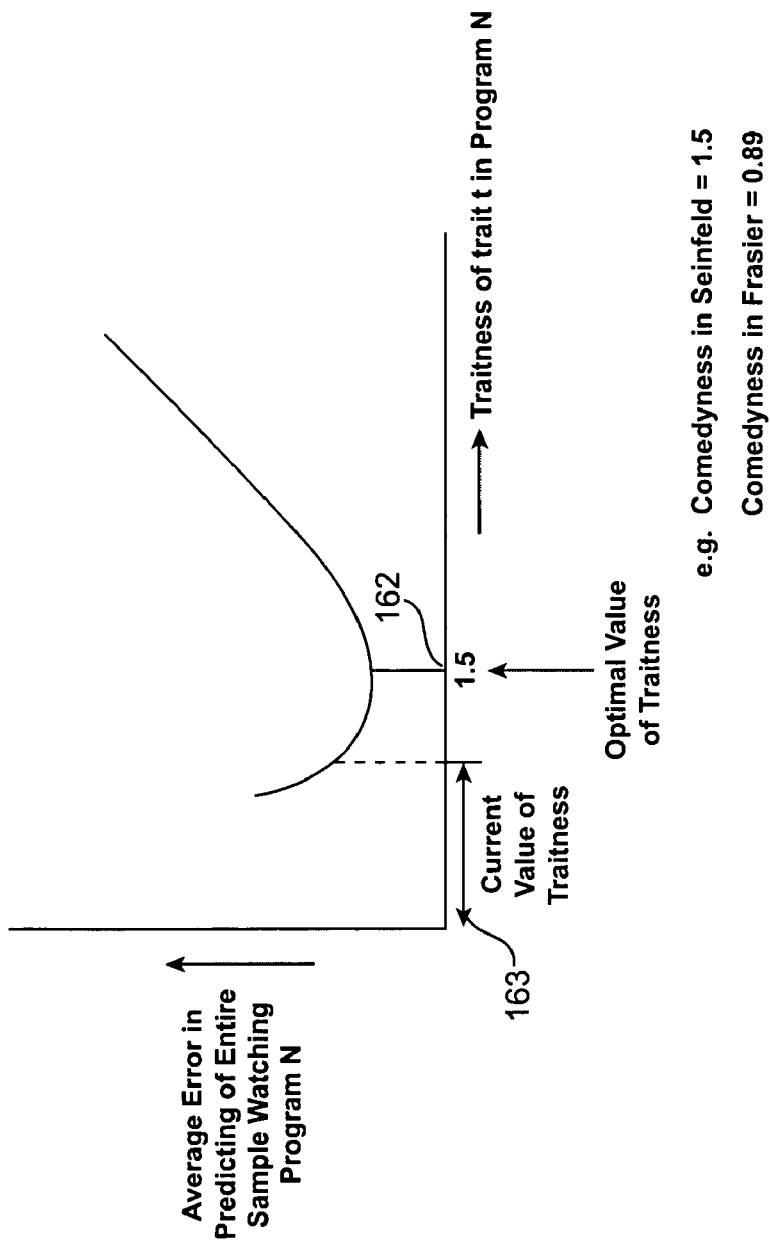

Some Sample Values For Fields in trait Record

Trait type

Static
dynamic
Association
Generated

Trait Description

(NBC, "NEWS"),
SUBSTRING("CIA") IN DESC.
TITLE

Distribution

Normal
Exponential
Defined type 1
Defined type 2

Distribution Parameters

Mean = 13, Deviation = 2

FIG. 11

Example For Broadcsting traitness as a part of EPG Data

> Program Info
> Seinfeld,
> NBC,
> Comedy = 0.07
> sitcom,
> Dynamic trait 1 = 0.1
>   .
>   .
> Actor = Seinfeld

FIG. 13

Distribution of Income in Sample
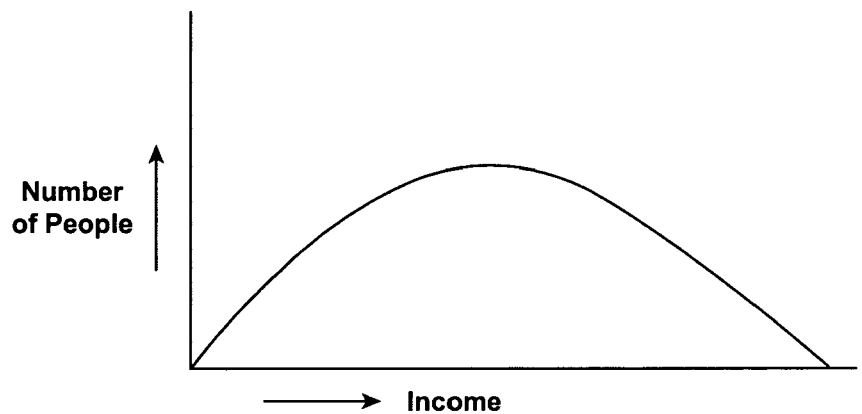
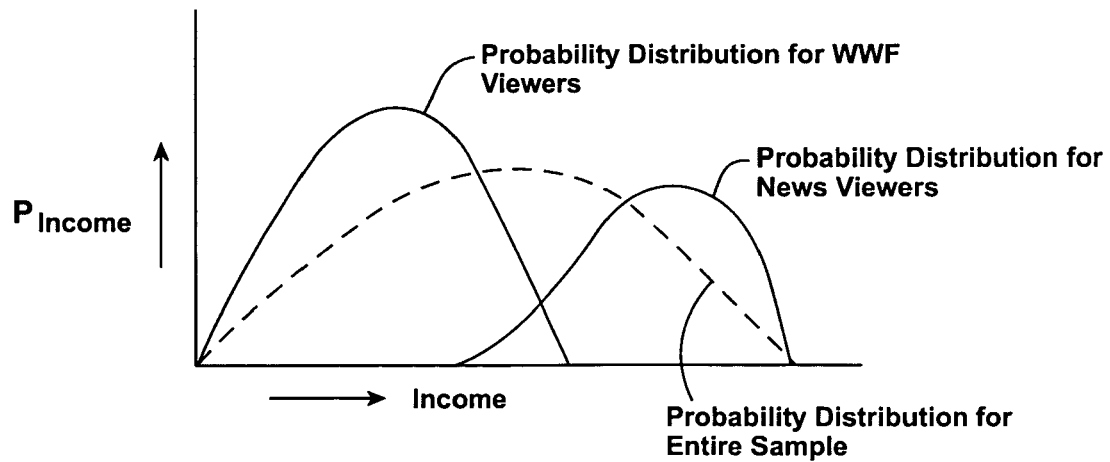
FIG. 21(a)

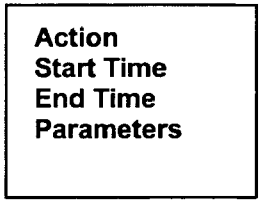
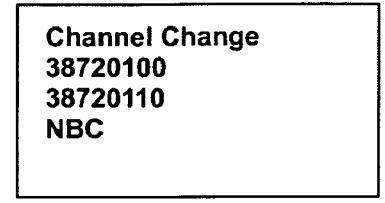
B) Format of user action record
B) Example of user action record
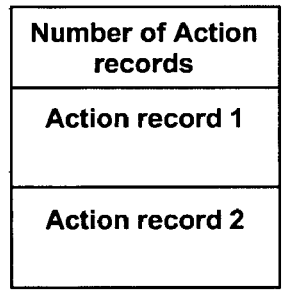
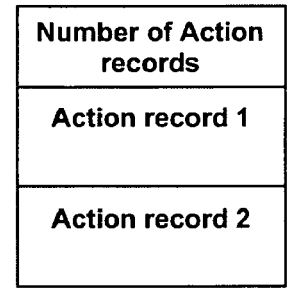
C) Format of History database
D) Format of Usage pattern record
FIG. 37

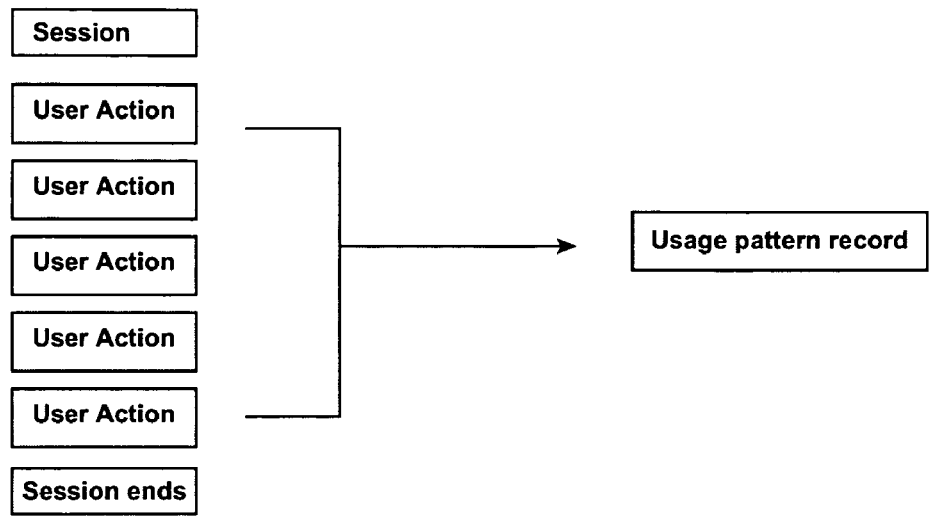
A) One method for creating usage pattern
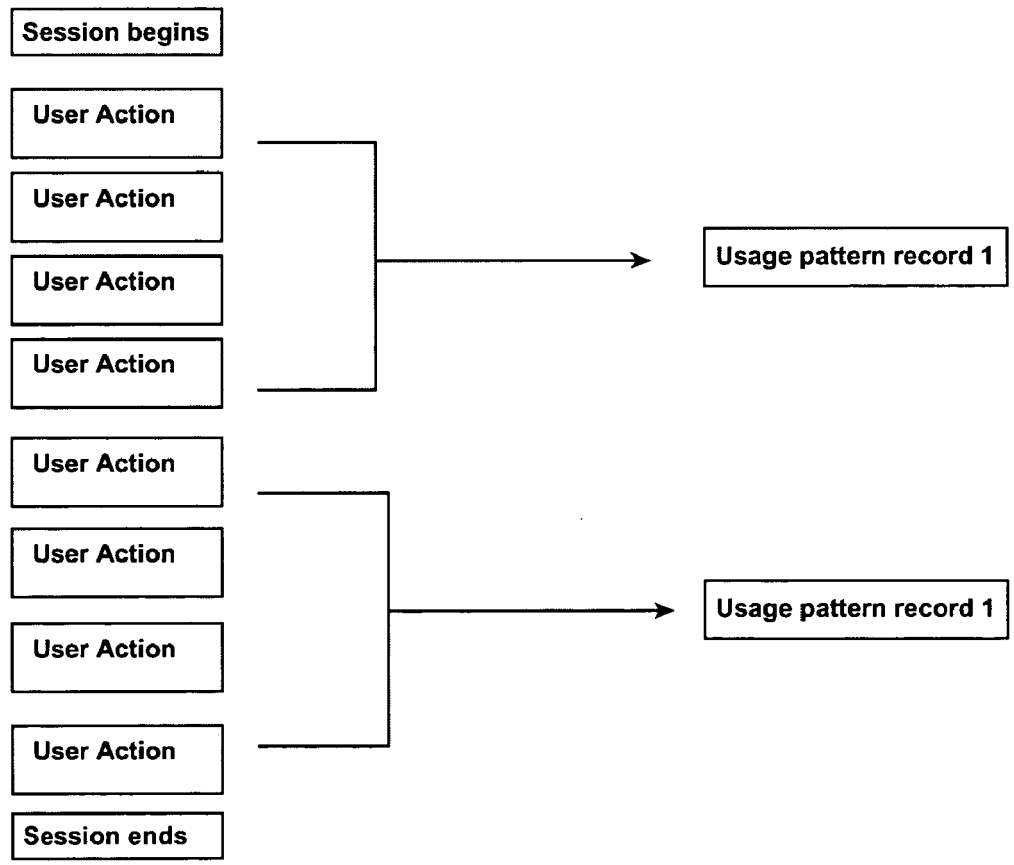
B) One method for creating usage pattern
FIG. 38

One method for creating usage pattern record

METHOD AND APPARATUS FOR DELIVERY OF TARGETED VIDEO PROGRAMMING

PRIORITY INFORMATION

This application is a continuation-in-part of U.S. Ser. No. 09/096,592 filed Jun. 12, 1998, and further claims the priority of U.S. Ser. No. 60/152,153 filed Aug. 31, 1999, U.S. Ser. No. 60/195,547 filed Apr. 7, 2000, U.S. Ser. No. 60/202,086 filed May 4, 2000, and U.S. Ser. No. 60/203,104 filed May 8, 2000, the entire disclosures of which are incorporated herein by reference.

This application is a Divisional Patent Application of U.S. patent application Ser. No. 09/652,478 filed Aug. 31, 2000 now U.S. Pat. No. 7,146,627, which claims priority, as does this application, as a Continuation-in-Part Application of U.S. patent application Ser. No. 09/096,592 filed Jun. 12, 1998 now U.S. Pat. No. 6,614,987, which applications, as well as this application in turn claim the benefit of priority of U.S. Provisional Patent Applications Ser. No. 60/152,153 filed Aug. 31, 1999; Ser. No. 60/195,547 filed Apr. 7, 2000; Ser. No. 60/202,086 filed May 4, 2000; and Ser. No. 60/203, 104 filed May 8, 2000.

FIELD OF THE INVENTION

This invention relates generally to the delivery of targeted video programming to a viewer, and more particularly to the determination of various viewer characteristics for the linear delivery of video programming targeted to the viewer's characteristics to create a targeted or customized, apparently linear television program.

BACKGROUND OF THE INVENTION

Currently, recording of television programs by individuals for viewing at a later time is generally performed using commercially available Video Cassette Recorders (VCRs). Typically, a VCR may be either manually placed into a record mode or may be programmed to record a selected program at a later time. To program the VCR, the user either enters a date, time and channel of the program desired to be recorded, or enters an identification code of the desired program.

Viewers of television programming increasingly have more choices as to which programs to view. For example, cable television provides a dramatic increase in the number of channels available to a viewer in comparison to the channels available by way of a conventional television antenna. Digital satellite systems provide even more viewing choices. Digital broadcast of programs over cable television systems is expected to further increase the number of channels available to viewers.

One effect of the increase in the number of viewing choices is increased difficulty in deciding which programs to watch. People, particularly those with busy schedules, may not have the time to select and view programs to determine which programs they may or may not like. Programs that may otherwise be desirable to a viewer may never be watched if the program is broadcast at a time that is inconvenient for the viewer. Users may select certain programs for viewing to determine if they like the program. However, with several hundred program selections each week, this task can take a considerable amount of time and is likely to cause certain desirable programs to be overlooked.

There are companies, who sample television-viewing habits of the population by monitoring the programs watched by a very small set of TV viewers. These companies collect other demographic information also about the people they monitor for the generation of the sample. These samples give valuable information about the television viewing habits of the population covered by the sample. By analyzing these samples periodically a general mathematical model can be formed which explains the behavioral patterns of the population in television viewing. Each individual viewer would have a very personal liking for television programs which may vary considerably from a model derived from the sample behaviors of general population. At the same time a mathematical model derived by monitoring the behavior of a single user may be inaccurate because of the limited amount of information which can be gathered by watching only a single user for a short period of time. Sending the entire sample of behavioral pattern of the sample population to every viewer device to aid computation of the mathematical model is counter-productive because of the high cost of bandwidth required to transmit this information to each device and the processing power and memory requirement for the viewer device to process this information. Sending personal viewing habits of every user to a server to compute the mathematical model for the individual user would raise privacy concerns for the viewer and also requires a return channel from the viewer device to the server.

With a mechanism to automatically determine personal preferences of a viewer accurately, a very personal TV viewing environment can be presented to the viewer. In case of households with multiple members, by correctly identifying individual members and their preferences, an apparatus can provide an entertainment experience which is most pleasurable to the individual viewer.

Methods have been developed for providing text data to viewers. A closed captioned encoding technique transmits text data in synchronization with its associated video data by inserting the closed captioned text data into a vertical blanking interval of the video signal. However, the closed captioned text data must be inserted into the vertical blanking interval of the video signal by the producer of the video programming. As a result, the vertical blanking interval of the video signal cannot be used by the head end operator to insert other text data such as sports, weather, stock market, news, advertising and other data.

Electronic program guides (hereafter "EPG") provides viewers with on-screen listings of upcoming television programs on cable television channels. The EPG is provided by an EPG data service. EPG data is converted into a video signal at the cable head. The EPG data is converted into a video signal at the cable head and transmitted to the viewer's television by a dedicated cable television channel. After tuning to the dedicated cable television channel, the viewer then wait for the programming for the desired time period is displayed. Often, when EPG data is used, the cable head end operator must dedicate a separate cable television channel to the EPG data and create video signals from the EPG data that are provided by the EPG service providers.

One method of solving this problem is modulation of the EPG data onto an FM carrier and transmitting the FM carrier with a video signal on one of the cable television channels. A dedicated peripheral device is provided at the viewer's television tuner that demodulates the EPG data from the FM carrier. The EPG data is then stored until the viewer requests presentation of the EPG data on the viewer's television.

Upon selection, the EPG data is then displayed on the viewer's television in place of the other video programming.

A data controller is disclosed in U.S. Pat. No. 5,579,055 that manages the flow of text data and electronic EPG data.

Additionally, preference agents for television programs have used Bayesian methods. See for example U.S. Pat. No. 5,704,017 (hereafter the "'017 Patent"). However, in the '017 Patent, a collaborative filtering system is used to predict a desired preference of a television viewer based on attributes of the viewer. A system implementing '017 would need to communicate to a belief network through a two way communication network, disclosing private viewer information to the network. '017 does not leverage the rich EPG information available about television programs which can be used to identify various traits which contribute to viewer's choices.

SUMMARY OF THE INVENTION

An object of the present invention is to provide a method and apparatus to select and deliver video data targeted to a specific viewer, typically a television viewer. The video data may be targeted in accordance with various characteristics of the viewer, including viewing characteristics, demographic characteristics, shopping characteristics, and others.

Accordingly, an object of the present invention is to provide a method and apparatus for determining user preferences for television viewers. The present invention defines a method to analyze sample viewing habits along with associated demographic and other characteristics of the general population to generate parameters of a mathematical model that explains the relationship between the viewing patterns of the population and the associated characteristics, and that can be communicated to viewer devices using a one way communication channel such as a broadcast network. The present invention also defines methods for using these parameters by viewer devices to compute the user preferences of individual viewers without divulging private information about viewing habits to the outside world.

The invention also details an apparatus that relies upon a viewer's computed preferences to store and present broadcast content that may be of interest to one or more individual viewers utilizing the same apparatus to view video data. Thus, the invention also discloses a method to compute the preferences of multiple viewers accessing the same viewing device, e.g. a multiple viewer household with a single television set.

In another aspect, the present invention determines viewing preferences of a user by monitoring programs viewed by the user and causes recording of programs corresponding to the user's preferences. In accordance with the principles of the present invention, apparatus for causing recordation of television programs comprises a preference agent for causing retrieval of attribute information corresponding to each television program viewed by a user of the apparatus. The preference agent generates classification information indicative of viewing preferences of the user as a function of the attribute information. A recording manager causes recordation and storage to a storage device of television programs having attribute information that matches the classification information.

In a further aspect, the invention determines viewing preferences of a user by processing attribute information associated with programs viewed by the user and creating a profile of characteristics describing the viewer. The characteristics may include, but are not limited to, viewing preferences, demographic information (e.g. age, sex, education, occupation, income, political and religious affiliations, marital status, sexual preferences, ethnic background, geographical location of home and work), reading preferences, shopping preferences, music preferences Embodiments employing the principles of the present invention advantageously cause recordation of programs that match certain viewing habits of the viewer. Such embodiments therefore provide the viewer with stored programs that match certain viewing preferences of the user, which can be viewed at the viewer's leisure. The viewer is therefore relieved of the burden of deciding which programs from among several hundred possible programs to watch.

In accordance with a further aspect of the present invention, programs may be recorded for storage in accordance with available capacity of the storage device. Moreover, programs may be deleted in response to selections by the user or based upon a priority, indicated by viewing preferences of the user, in which programs having lowest priority are deleted first to make room for newly recorded programs. The priority of programs may also be a function of time, in which more recently recorded programs are given higher priority.

In accordance with further aspects of the invention, determining which programs to record may also be a function of priority in which program s specified for recordation are given highest priority, followed by programs having attribute information corresponding to one or more user specified criteria, then followed by programs having attribute information corresponding to the recordation preference information.

In accordance with further aspects of the invention, the user specified requests may be in the form of a first type of request comprising information indicative of a specific program and a second type of request comprising specifications indicative of one or more programs having attribute information corresponding to the user's specifications.

In accordance with further aspects of the invention, the user may cause recordation of a currently broadcast program being viewed by the user by causing generation of a pause input. This advantageously allows a user to interrupt viewing of a currently broadcast program by recording the remainder of the program for subsequent viewing. Program viewing options may be presented to the user in the form of a menu that provides an easy to use interface for selection of programs and viewing and other options including play, pause, delete, fast-forward, rewind and so forth.

Preferably, the preference agent organizes the recordation preference information in the form of a database organized in accordance with categorization parameters. Programs may be received On either analog or digital formats. Programs stored in digital format are advantageously presented to the user in the form of additional channels. This allows the user to easily switch between programs (either recorded or broadcast) simply by switching channels.

BRIEF DESCRIPTION OF THE DRAWINGS

FIG. 4 shows examples for traits and Liking values.

FIGS. 5a-b are flowcharts illustrating the Data analysis performed on a representative sample.

FIGS. 9a-c illustrate the process of determining trait-ness of a trait in a program.

FIG. 11 lists some sample values for different fields described in FIG. 10.

FIG. 13 shows an example for broadcasting trait-ness as a part of EPG data

FIG. 21a illustrates distribution of income for different programs.

FIGS. 35-41 illustrate various aspects of the process of creating and using multiple viewer profiles according to the present invention.

DETAILED DESCRIPTION OF THE PREFERRED EMBODIMENTS

Figure 1:
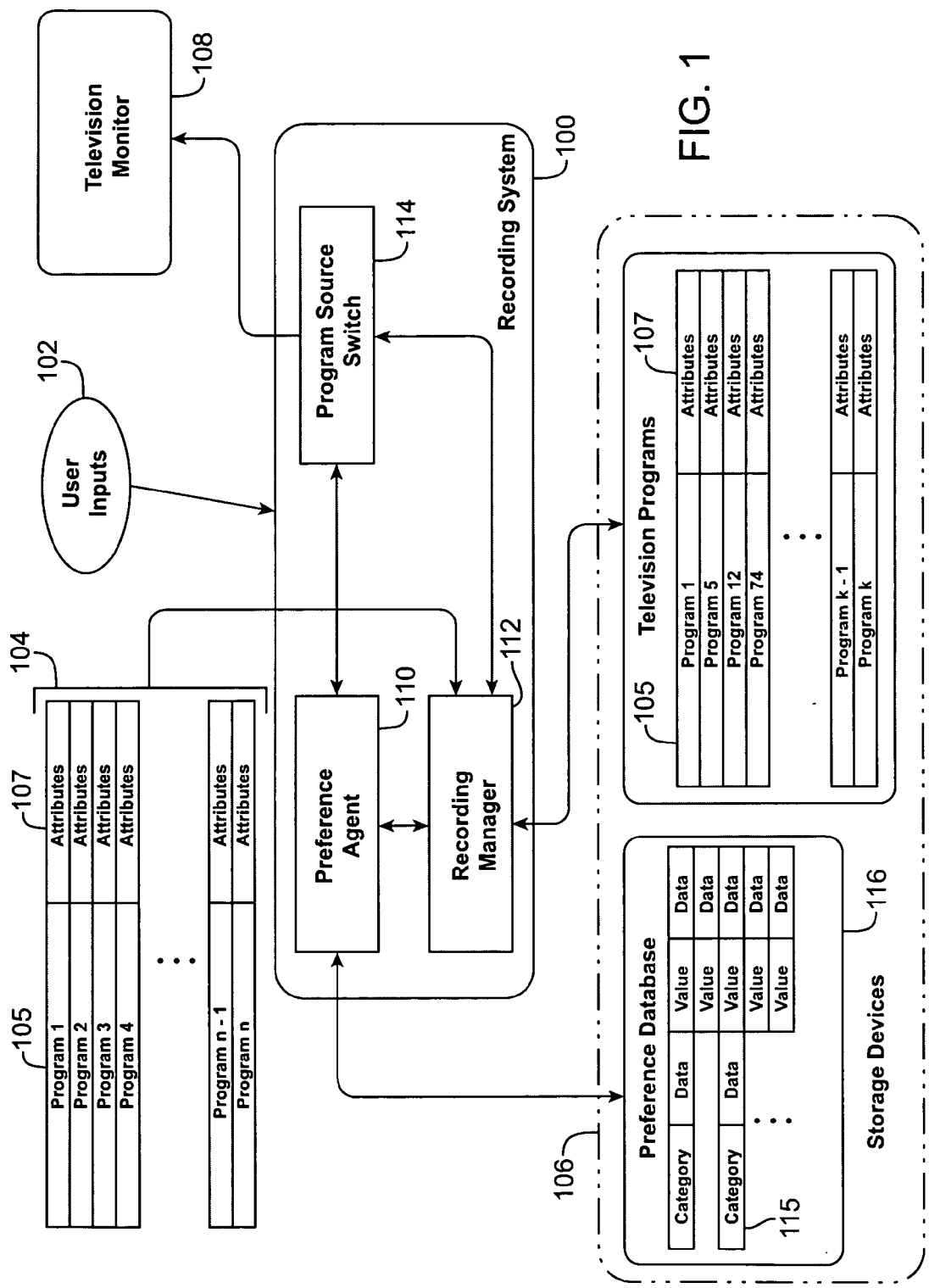
FIG. 1 is a high-level block diagram of a Program selection device employing the principles of the present invention.

In FIG. 1, a television control system 100 operates in accordance with the principles of the present invention to cause recordation of television programs in response to user inputs 102 and television signals 104. Television control system 100 transmits signals to a television monitor 108 for viewing by the user. Preferably, in digital embodiments, programs that are recorded by system 100 are presented to the user in the form of additional channels. Thus, the user can rapidly determine, by changing channels, the stored programs that are available for viewing. The user can also change channels between stored programs or between stored programs and currently broadcast programs. If the user changes channels from a recorded program to another program, playback of the recorded program is preferably paused. Alternatively, whether the playback of the recorded program is paused or continued, is a user selectable option. As described further herein, the user may specify programs for recordation by specification of a particular program, or by specification of particular attributes of the program such as comedy/drama, actor(s). When manually specifying programs for recordation, the user may specify that the program is to be recorded once or repeatedly, such as weekly, when broadcast.

Signals 104 include a first component 105 which contains the information necessary to display video and audio components of a television program on television monitor 108. Signals 104 preferably also include a second component 107 termed herein "attribute information." An example of such attribute information 107 is the information available by way of the DVB-SI and ATSC-SI formats and various proprietary formats such as StarSight EPG Data and TVData available from StarSight Telecast, Inc., Fremont, Calif., and TVData, Glen Falls, N.Y., respectively.

Attribute information 107 for any particular program varies depending on the program type, but typically includes a plurality of categories such as start time for the program, duration of the program, the title of the program and other, attributes (categories) of the program, together with an associated value corresponding to each of the categories. Preference agent 110 processes the attribute information 107 to generate if "category-value" pairs 115. For example, if an attribute for a program is duration, then the category may be duration and the value for that category may be 120 minutes. If the attribute for a program is title, then the category may be title and the value may be "Star Wars." Other category-value pairs for a movie may include a description category with a short description of the movie being the value, a primary actor category with the names of the primary stars of the movie being the values, a director category with the name of the director being the value, a theme category with the theme such as adventure, comedy being the value, and a ratings category with ratings by particular critics being the value. Category-value pairs for a sports game, such as a football game, may include names of the teams who are playing, the location of the game, and the specific tournament, such as the play-offs, or Superbowl, etc.

The category-value pairs 115 (preference information) are indicative of viewing preferences of the user. The data shown in FIG. 1 as being associated with the category-value pairs 115 contains weighting information for the associated category value, in addition to other information shown by way of example further below. Preference agent 110 maintains the preference information 115 in the form of a preference database 116. Television programs 105 recorded by the system 100 are preferably stored separately together with the associated attribute information 107. In an alternative embodiment, the category value pairs 115 (with or without the associated values) are stored with the television programs 105 and the raw attribute information 107 is not maintained by the system 100.

Preference agent 110 generates, in response to user viewing habits, data for each category stored in preference database 116 and for each value of each category. The data generated by preference agent 110 for each category and value is preferably indicative of the amount of time that the particular category and/or value is watched by the user relative to the total amount of time that the particular category and/or value is available to be watched. The relative amount of time that a program is watched by a user is a convenient indication of the user's relative viewing preference. However, other indications of user viewing preferences may also be used. Program source switch 114 operates in response to user inputs 102 to select either presently broadcast programs, by way of television signal 104 or stored programs from storage devices 106.

Recording manager 112 operates to cause recordation and storage of television programs 105 and attribute information 107 in accordance with information generated by preference agent 110 and stored in preference database 116. Recording manager 112 also responds to user requests to record particular programs and to user requests to record programs having specified category-value pairs.

The signals transmitted to the monitor 108 preferably take a conventional analog form. Alternatively the signals transmitted to the monitor 108 maybe digitally encoded. The exact form of the signals transmitted to the monitor is not critical and may take a form as required by a particular monitor. The television signals 104 received by the television control system 100 may take one of a variety of signal formats including analog encoded signals that are encoded in accordance with the well known NTSC or PAL standards. Alternatively, the signals 104 may be digitally encoded in a manner as transmitted by commercially available digital satellite systems (DSS) or in accordance with the MPEG-2 (Motion Picture Expert Group-2) standard. In any given embodiment of television control system 100 the signal 104 may take a variety of the aforementioned forms. For example, television control system 100 may be coupled to receive inputs from a digital satellite system, the inputs being digitally encoded. The television control system 100 may also be coupled to receive inputs from a Community Antenna Television System (CATV) in which the signals are either encoded in analog or digital form. The television control system 100 may also be coupled to receive analog or digital signals from a conventional home antenna.

The attribute information 107 may be transmitted to the television control system 100 contemporaneously with the television program 105 in a variety of ways including industry standards, such as DVB-SI (Digital Video Broadcasting-Service Information) as defined by the European Telecommunication Standards Institute (ETS), or the ATSC digital television standard as defined by the Advanced Television System Committee (ATSC). By way of example, in the DVB-SI protocol, programming for the next six hours is transmitted every eight seconds for each channel. As a further example, program information for the next seven days is available from the interactive on-screen TV program guide available from StarSight Telecast, Inc. Programming information further into the future, such as for the next seven days, may also be obtained in other ways. For example, by receiving the information in a time-multiplexed manner over a particular channel. Such information can easily be transmitted when the user is performing an action that does not require a moving video image on the screen, such as when the user has a control menu displayed on the screen.

Alternatively, television control system 100 can download the attribute information 107 separately from the television program 105 by way of a separate communication session via a modem or the Vertical Blanking Intervals (VBI) contained in television signals. Such separate communication sessions include data download mechanisms supported by the MPEG-2, DVB-SI and DSS protocols.

The attribute information 107 can take a form under the DVB-SI protocol as shown below:
event_id,
start_time.
duration,
DESCRIPTOR1,
DESCRIPTOR2,
DESCRIPTORn.

The event-id field Is a unique alpha-numeric code assigned to a program. DESCRIPTORS can be "Short Event Descriptors," "Extended Event Descriptors" or "Content Descriptors" which include the following information:

Short Event Descriptor:

```
{
    event_name-length
    event_name,
    event_description-length
    event_description
}
Extended-even
{
    ITEM1
    ITEM2
    ...
    ...
    ITEMn.
}
content descriptor:
{
    CONTENT1,
    CONTENT2,
    ...
    ...
    CONTENTn.
}
```

ITEMs include the following information:

```
{
    item_description_length,
    item_description,
    item_value_length,
    item_value
}
```

An example of item descriptions can be "Director" and item value can be "Martin Scorsese". CONTENT includes the following information:

```
{
    DVB-SI defined theme,
    DVB-SI defined sub-theme, programmer defined theme, programmer
    defined subtheme,
}
```

An example of theme and subtheme are MOVIE and COMEDY, respectively. The programmer defined theme and sub-theme are values that may be provided by the EPG Data provider.

Category-value pairs 115 are generated from the above type of information. The category-value pairs 115 take the following format: Category Name—Category Value, where category name cart be "Title", "Director", "Theme", "Program Type" etc. and category values can be "Seinfield" "Martin Scorcese", "Comedy", "Sitcom" etc. Generation of category-value pairs 115 from attribute information 107 allows generation by preference agent 110 of categories that are not explicitly present in the attribute information 107. For example, category-value pads 115 can be: Title-49ers, Description-football, and Description Search Rule-football (AND) San Francisco. Thus, preference agent 110 is capable of generating category-value pairs 115 from attribute information 107 even where there is no field in the attribute information that corresponds to the created category-value pair.

Preference database 116 is preferably generated initially by downloading category-value pairs from a third-party source such as StarSight Telecast, Inc. Advantageously, such sources may provide information customized for particular geographical areas and dates. For example, the database may contain data that gives sporting events involving local teams higher ratings than other sporting events. In addition, seasonal or holiday programs may be indicated as being preferred during particular seasons or holidays. For example, programs involving summertime activities would be indicated as having higher weighting during the summer than at other times of the year. The preference database is modified as described herein in accordance with the user's viewing habits. In addition, the preference database can be periodically updated from third-party sources to reflect the aforementioned seasonal or holiday updates.

Categories in the preference database 116 are either predefined, such as those received from third-party sources, or are dynamically created from attribute information 107 received for programs 105. Categories, and associated values, that are dynamically created are preferably given a default rating by preference database 116. An example of the preference information created by preference agent 110 or downloaded to preference agent 110 is shown below. In the following example, the three columns of numbers in the category statistics and value statistics portions indicate weighting (in a range of 0 to 1000) duration watched (in seconds) and amount of time that programs matching that particular category or value was available (in seconds). The information is preferably stored in the form of database records.

| Categories: | |
| --- | --- |
| channel | 1000 |
| title | 1001 |
| title-Substring | 1002 |
| genreInfo | 1003 |
| description | 1004 |
| descSubString | 1005 |
| episodeName | 1007 |
| type | 1008 |
| stars | 1009 |
| director | 1010 |
| YearProduced | 1011 |
| MPAARATING | 1012 |
| criticRating | 1013 |

| Values: | |
| --- | --- |
| Titanic | 2000 |
| Ami | 2001 |
| 3rd Rock From the Sun | 2002 |
| The Gods Must Be Crazy | 2003 |
| Seinfeld | 2004 |
| Headline News | 2005 |
| Bugs & Daffy | 2006 |
| News | 2007 |
| 004 | 2008 |
| 005 | 2009 |
| 063 | 2010 |
| 49ers | 2011 |
| SITCOM | 2012 |
| COMEDY | 2013 |
| MOVIE | 2014 |
| NEWS | 2015 |
| Sanfrancisco 49ers | 2016 |
| A Coke bottle raises havoc for a tribe of African bushmen | 2017 |
| John Mayers | 2018 |
| Lousie Barnett | 2019 |
| Marius Weyers | 2020 |
| Sandra Prinsloo | 2021 |
| Jeff Bridges | 2022 |
| Valerie Perrine | 2023 |
| Phil Hartman | 2024 |
| Jamie Uys | 2025 |
| Lamont Johnson | 2026 |
| 1981 | 2027 |
| 1973 | 2028 |
| 1996 | 2029 |
| THREESTAR | 2030 |
| TWOSTAR | 2031 |
| NUDITY | 2032 |
| VIOLENCE | 2033 |
| ADULTSITUATIONS | 2034 |
| ATULTLANGUAGE | 2035 |

| Category - Value pairs: | |
| --- | --- |
| 1001 | 2001 |
| 1001 | 2002 |
| 1001 | 2003 |
| 1001 | 2004 |
| 1001 | 2005 |
| 1001 | 2008 |
| 1000 | 2009 |
| 1000 | 2010 |
| 1002 | 2011 |
| 1003 | 2012 |
| 1003 | 2013 |
| 1003 | 2014 |

| Category statistics: | | | |
| --- | --- | --- | --- |
| 1001 | 1000 | 31104 | 4022280 |

| | -continued |
|---|---|
| 1002 | 1000 31104 4022280 |
| 1003 | 1000 31104 2613384 |
| 1004 | 1000 20304 1996596 |
| 1005 | 1000 20304 1996596 |
| 1006 | 1000 5238 1259028 |
| 1007 | 1000 3438 369450 |
| 1008 | 1000 13266 812970 |
| Value Statistics | |
| 2001 | 1000 1638 88074 |
| 2002 | 1000 6714 178560 |
| 2003 | 1000 6552 387054 |
| 2004 | 1000 5400 165600 |
| 2005 | 1000 1600 9000 |
| 2006 | 1000 3600 28800 |
| 2011 | 500 1800 10800 |

In the above example, fourteen categories are provided (1000-1013) followed by thirty-six values. The correspondence between the categories and values (category-value pairs) is next shown. Data for the categories and then the values is shown next. This data is organized in three columns as described above.

In the embodiment shown in FIG. 1 and described above, the ratings for categories and values are dynamically generated by the preference agent 110 instead of being stored in preference database 116. In an alternative embodiment, the ratings may be stored in preference database together with the category-value pairs.

Figure 2:
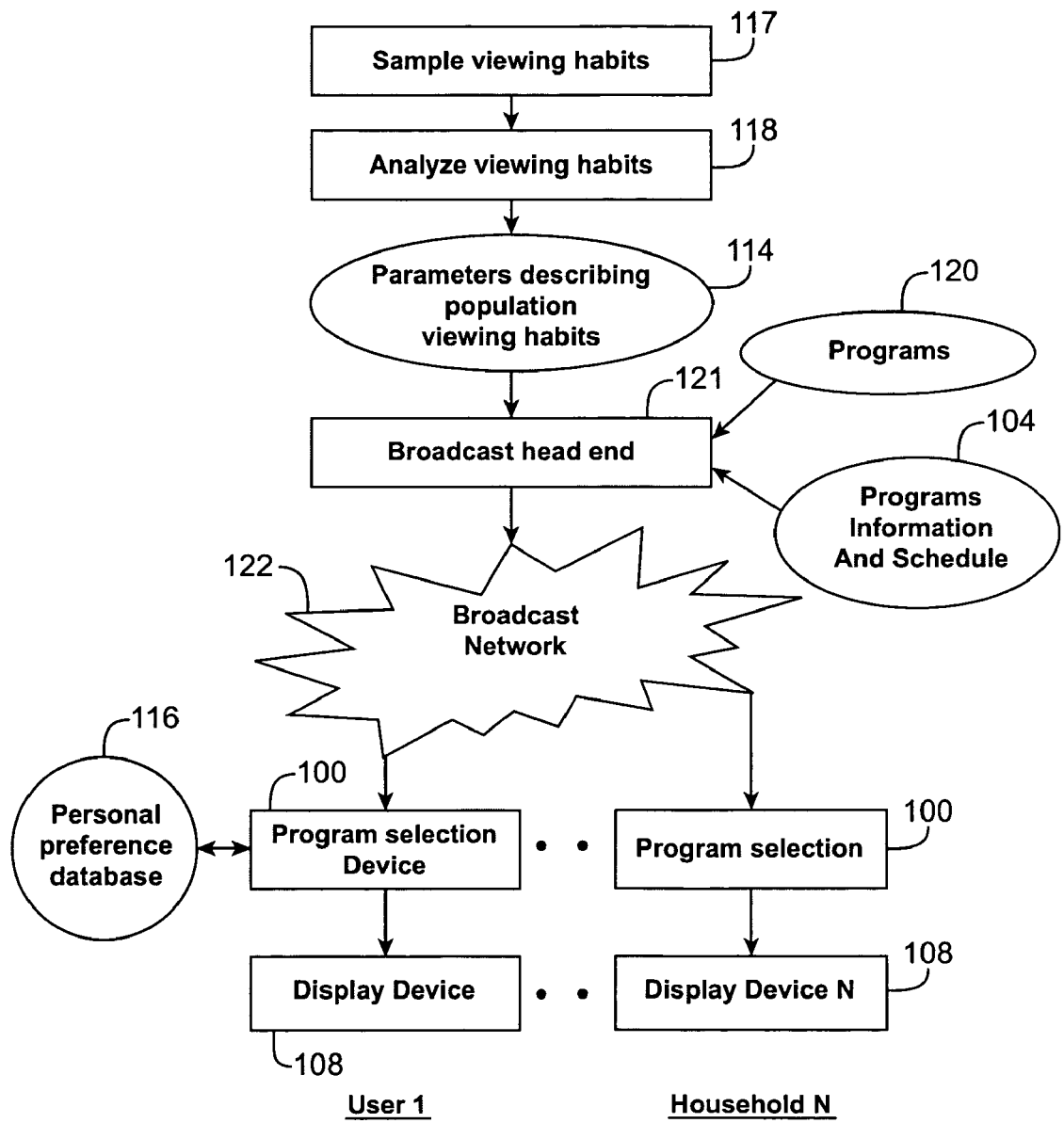
FIG. 2 is a high-level block diagram of a system employing the principles of the present invention.

Referring now to FIG. 2, preference determination is used to predict a user's preferences in the choice of TV programs. This prediction is based on, (i) analysis of the individual users viewing habits, (ii) analysis of the viewing habits of a representative sample of users and (iii) EPG data for the television programs available during the period of the collected sample.

The viewing habits of a user are described below in the context of actual programs watched by the user. However, other information may be just as useful for the purposes of the invention, and includes information regarding programs that are never watched by the user or watched only very briefly before changing to another channel, programs that the user schedules to record, programs that the user records but does not watch or watches only briefly, and programs for which the user requested information from a program guide (e.g. an on-screen EPG menu) or for which the user never requests information or for which the user requests information but does not choose to watch.

One method for creating a preference determination is through the use of a Bayesian network that is used to predict user behavior, and hence a preference agent, is a knowledge based approach. In this method a knowledge engineer interviews an expert about the Field of expertise of the expert. The expert and the knowledge engineer determine the distinction of the worlds that are important for decision making in the field of the expert. The knowledge engineer and the expert next determine the dependencies among the variables and the probability distributions that quantify the strengths of the dependencies.

A second method is Bayesian network is a data based approach. In this second method the knowledge engineer and the expert first determine the variables of the domain. Data is then accumulated for those variables, and an algorithm applied that creates the belief network to predict user behaviors from this data. The accumulated data comes from real world instances of the domain. This second approach exists for domains containing only discrete variables.

Bayesian methods can be performed by utilizing an algorithm known as the "EM" algorithm, which, as recognized by those skilled in the art, calculates the maximum a posteriori values ("MAP values") for the parameters of the model to predict user behavior. The EM algorithm is described in Dempster. Maximum Likelihood From Incomplete Data Via The EM Algorithm, Journal of the Royal Statistical Society B, Volume 39 (1977), incorporated herein by reference.

After calculating the probability for each variable, each variable within the belief network is then scored for goodness in predicting the preferences of the user by rendering a subscore. As recognized by those skilled in the art, the subscores are generated by using the marginal likelihood of the expected data at the maximum a posteriori values.

One skilled in the art will recognize that any standard model to predict user behavior inference algorithm can be used to perform this step, such as the one described in Jensen, Lauritzen and Olesen, Bayesian Updating in Recursive Graphical Models by Local Computations, Technical Report R-89-15, Institute of Electronic Systems, Aalborg University, Denmark, incorporated herein by reference.

Television viewing habits of the population are sampled to generate representative samples of viewer behaviors, 117. This task is typically performed by companies such as Nielsen Media Research, who collects user behavioral samples to conduct market research. The results of the sampling is stored in a viewer behavior database. The format of the viewer behavior database is proprietary to the company conducting the sampling. Viewer behavior database contains demographic information about the people in households participating in the sampling. This information includes but is not limited to race, age, annual income and gender. Viewer behavior database also contains information about all the television programs each viewer watched during the period of sampling.

Program Information and the schedule of television programs is available in the EPG database, 104. Program Information for a television program contains information about various attributes of the program which includes but not limited to the title, program type and program category of the television program, arid also the actors acting in the television program.

Figure 3:
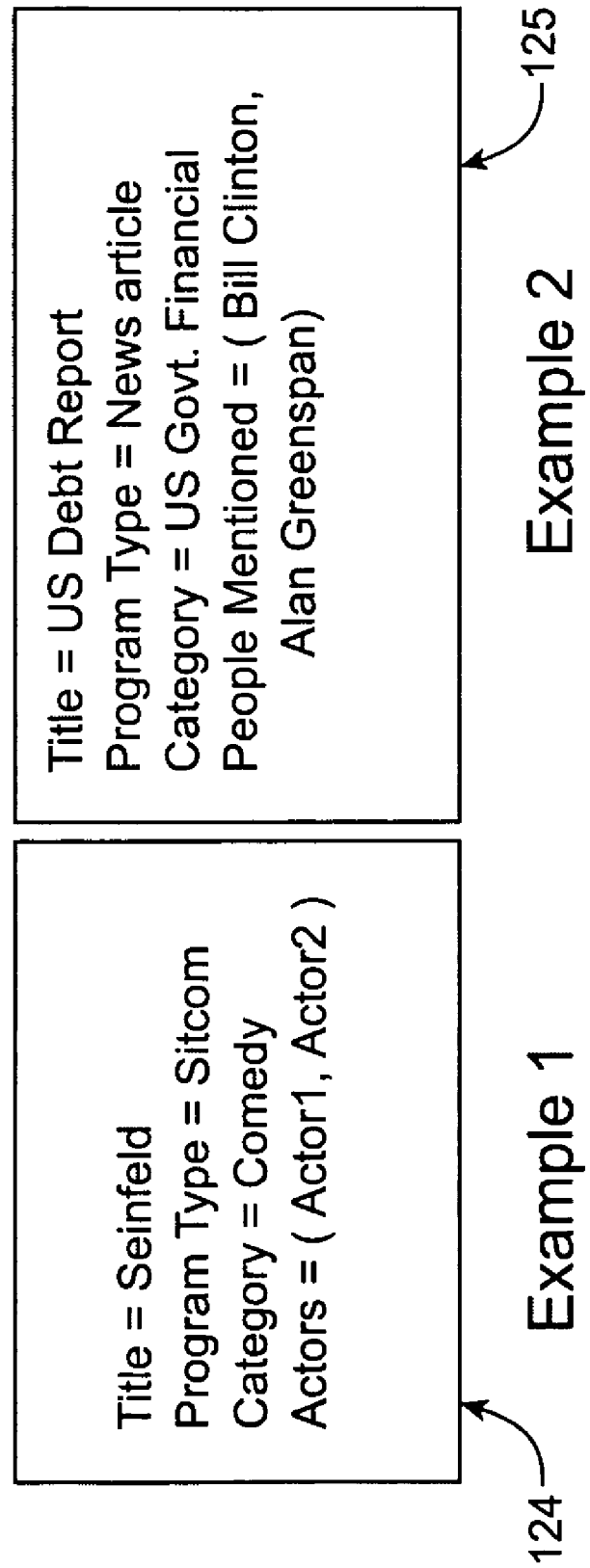
FIG. 3 shows two examples for Program information.

FIG. 3 lists two examples of program information, example 1, 124, describes the program information for a audio visual television program, and example 2, 125 describes program information for a graphical text based television program.

Viewer behavioral database is analyzed 118 to identify traits of TV programs and determine how such identified traits influence viewing habits in the representative sample of users. These traits and their influence amongst the viewing population are then used in aiding the process of predicting an individual user's choice in TV programs. FIG. 4, 126, lists some examples of such traits. Some of these traits are derived from program information, 104. Some of these traits are derived by looking for users liking for association of multiple traits or association of traits with other viewing parameters which includes but is not limited to time, day of the week, holiday, working day and weather season. Some of these traits are derived by data analysis of Viewer behavioral database. Any given program would exhibit varying degrees of the above identified traits. This is expressed as the traitness of the trait in the program, e.g. trait-ness of comedy in Seinfeld may be 1.2 and traitness of comedy in Mad About You may be 0.79. The trait-ness of a trait in a program is computed as a part of the data analysis, 118.

The present invention also provides for a methodology for determining viewer preferences. In one embodiment, an individual viewer picks one show to watch out of the collection of available program by evaluating a stochastic liking function for each program and choosing the program with the highest score. The liking function is modeled as an aggregate of liking for a specific trait and the degree to which that trait is exhibited by that program. The liking function can be computed as:

$$l(p)=\Sigma \lambda(tn)*tn$$

Where l(p) represents the liking for program p $\lambda(tn)$ represents the liking for a specific trait tn tn represents the degree to which the Trait tn is exhibited by p When a viewer watches television, it is assumed that the viewer chooses a program for which the value of l(p) is the highest. For any given viewer, the better the values of $\lambda(tn)$ represent its actual liking, the more the accuracy in determining its preference for TV programs. Thus for any given user if all the relevant traits are known along with the exact liking of each of those traits, the above Liking Function would always accurately predict the liking of any given program.

However, identification of all the relevant traits and the determination of the exact liking of each viewer is a non trivial task and arrived at iteratively by a process of regression analysis.

While a majority of the traits relevant to a specific user may be derived directly from the EPG information itself, some of the traits are discovered by analyzing the user's viewing habits over time. Traits that are suitable for discovery by a process of regression analysis are generally hidden or associated traits.

Hidden traits are those which influence a user's viewing habits but which can not be derived from the EPG information. For example, sitcoms featuring a specific ethnic background would resonate more with viewers of that ethnic background. Another example of the effect of a hidden trait could be the strong liking of the sitcom "Frasier" amongst the set of users who have a strong liking for the sitcom "Cheers." Assuming that the names of actors performing in a sitcom are not be available in the EPG data, this affinity towards both the sitcoms by the same set of people may be explained by the presence of some trait commonly exhibited by both the sitcoms, namely the presence of one of the central characters in both the sitcoms. Such hidden preference criteria would have to be captured by adding the hidden traits in the computation of the Liking Function.

Associated traits—Traits which have a different influence on a user's viewing habits when combined with other traits. For example a user would have a certain liking for any given Seinfeld episode, and a certain liking for any premiere sitcom being aired for the first time. However, its liking for a premiere episode of Seinfeld may be sufficiently large enough to require an additional trait, "new Seinfeld", to fully explain its liking for a premiere episode of Seinfeld.

The liking of each trait for a given user has to be similarly refined from initial approximations by regression analysis. Examples of traits and the associated liking for a sample user include but are not limited to those listed in FIG. 4. The trait "NBC<=> NEWS" is an example of an associated trait where the traits being associated are "Channel NBC" & "Program Type News." Users liking for NEWS programs may be 1 & the preference for the "NBC Channel" may be 2 whereas its preference for NEWS on NBC may be 13, i.e., this user does not always watch news programs or programs in general on the NBC channel, however he has a strong preference for NEWS programs on the NBC channel. If only its liking for the "Channel NBC" & "Program Type News" are considered, its preference for "News on NBC" would be unexplainable.

This procedure to identify traits is first carried out using the viewing habits of the representative sample along with the determination of the distribution of likings of each trait within the representative sample.

Some of the outputs of the analysis 102, of the viewing habits of a representative sample are a set of preference determination parameters viz. (i) the traits which are exhibited by recurring program and the degree to which such a trait is exhibited, and (ii) a distribution list of the likings amongst the viewing population of each of the above trait.

Figure 5A:
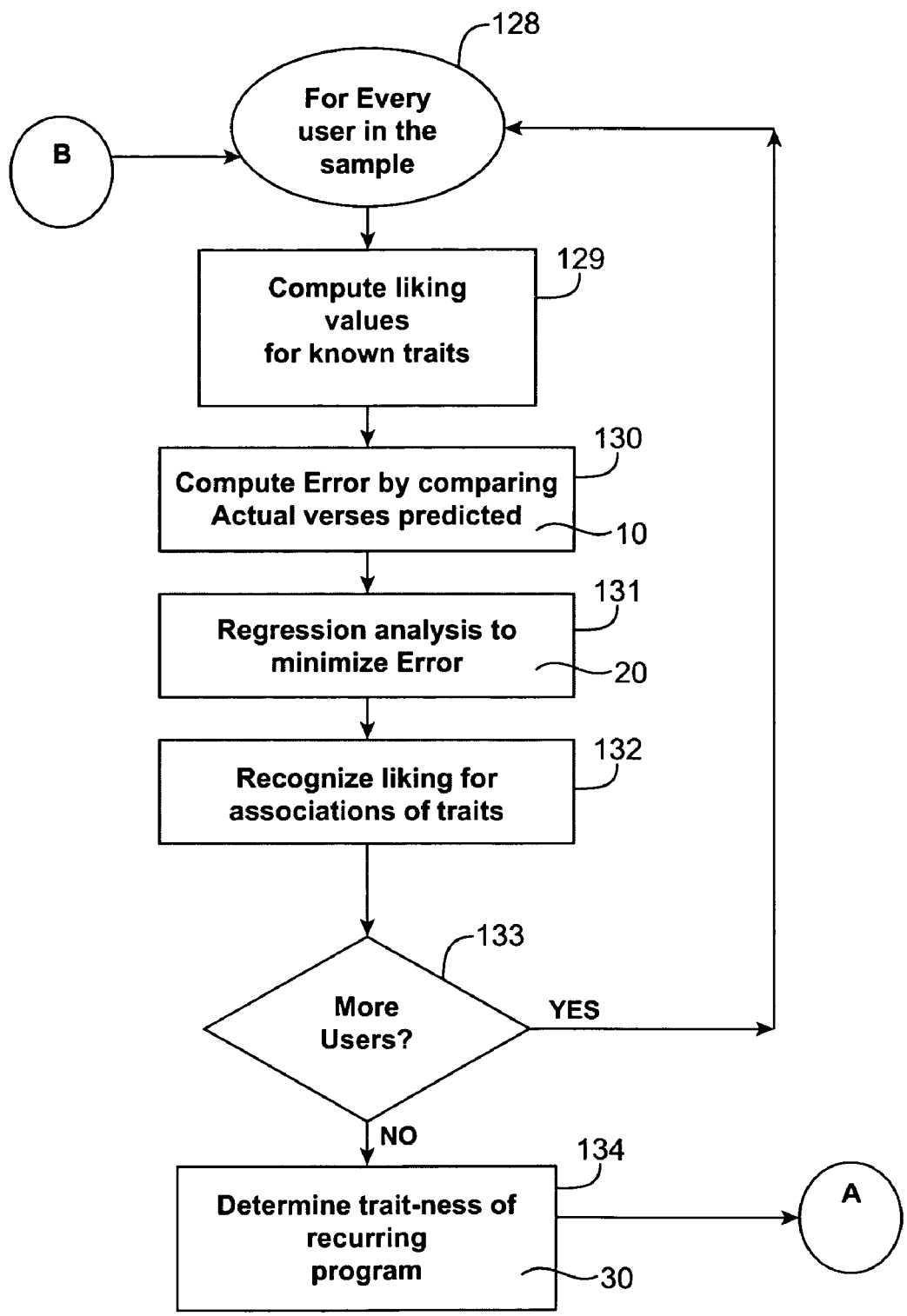

One methodology to derive these parameters is outlined in FIGS. 5(*a*) and 5(*b*). Different phases of the flow chart are explained further in the following sections. An initial set of liking values are computed for each user, 129. This initial liking value may be arrived at in various ways. One of the ways could be to base it on the amount of time for which a given trait was watched as opposed to the amount of time it was available during the user's viewing period.

Figure 6:
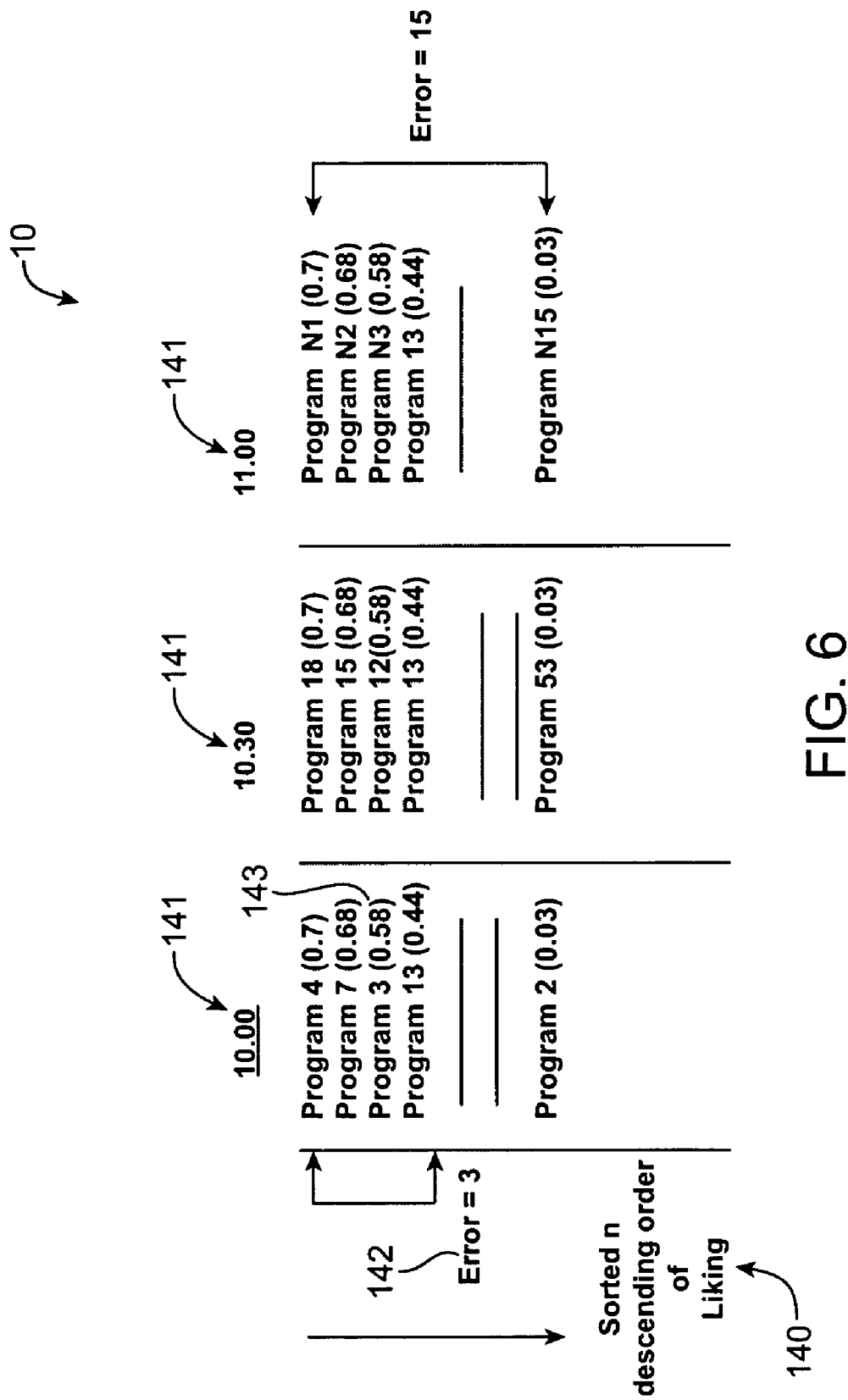
FIG. 6 illustrate the process of computing the error in prediction of user choices FIG. 7 illustrate a step in the process of regression analysis

Using these initial liking values for the traits the Liking Function l(p) is computed for all the programs that were available during the times the user watched a given program. These programs are then arranged in descending order, 140, of liking value for a time period during which the viewer watched a program, 141. The actual program the user watched at a given time is highlighted, 143. If all the highlighted programs in FIG. 6 had the highest score, the Liking Function correctly identified the user's preference. If the program watched by the user ranks below some other competing program available at that time the liking values used do not correctly reflect the user preference. By way of example, but not by way of limitation, if there are N programs ranked above the program actually watched, the error in the Liking Function for this program may be called N, 142. Such values of N are determined for each program watched by the user by comparing it with the Liking Function of the other competing programs. In the example illustrated in FIG. 6 values of N are computed for the times when the user watched TV between the hours of 10:00-10:30, 10:30-11:00, 11:00-11:30. Using regression analysis, the liking values of each of the traits are adjusted incrementally to reduce the average value of N. The set of liking values which yield the lowest value of the average of N are considered the best set of liking values for that user.

Figure 7:
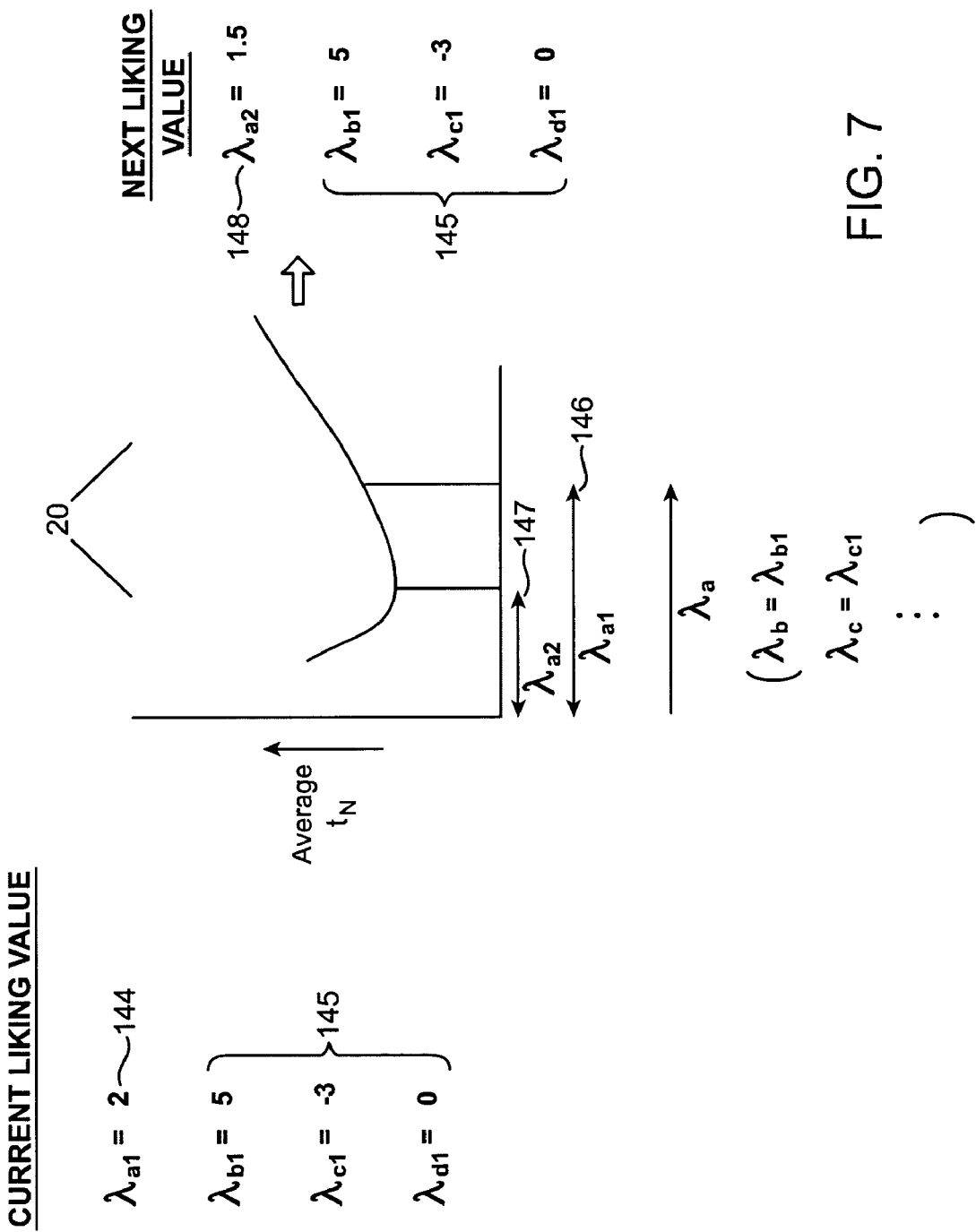

One methodology of the regression process is illustrated in FIG. 7. At the beginning of the process liking values for traits a, b, c, are $\lambda a1, \lambda b1, \lambda c1, \ldots$ (144,145). $\lambda a1$ represents the liking of trait "a," $\lambda b1$ represents the liking of trait "b" and so on. The Liking Function of all the relevant programs are computed using this initial set of liking values. The liking value $\lambda a1$ of the first trait "a" is changed incrementally to determine the average value of N. The value $\lambda a2$, 147, which yields the lowest average value of N, is taken as the new liking value for the trait "a." This new value liking value $\lambda a2$, 148, now replaces the old value and is now used to determine the remaining $\lambda$ values. The above set of liking values computed would predict the users preferences with a high degree of accuracy if set of the traits considered in the Liking Function includes all the traits that are relevant to a user. The average value of N not converging (to 0 or some other acceptable value) would indicate that not all traits that are relevant to the user have been considered in the computation of the Liking Function. Introduction of additional traits, either associated or hidden, is used to improve the determination of the user's preference.

A determination of associated traits is achieved by a variety of different methods.

One method is through the application of heuristic rules of thumb where the associative value of a number of traits is not reflected in the program information obtained from an EPG but is relevant to human viewing habits. For example, a user who has a liking for Seinfeld would most probably have a much higher preference for a premiere or new episode of Seinfeld. Such heuristic rules of thumb regarding the associative value of a number of traits may be passed to each set top box via the Head End. Another method of determining associated traits is with an algorithmic search which looks for common traits in programs and introduces new associated traits to try to improve the Liking Function for a user.

Figure 8:
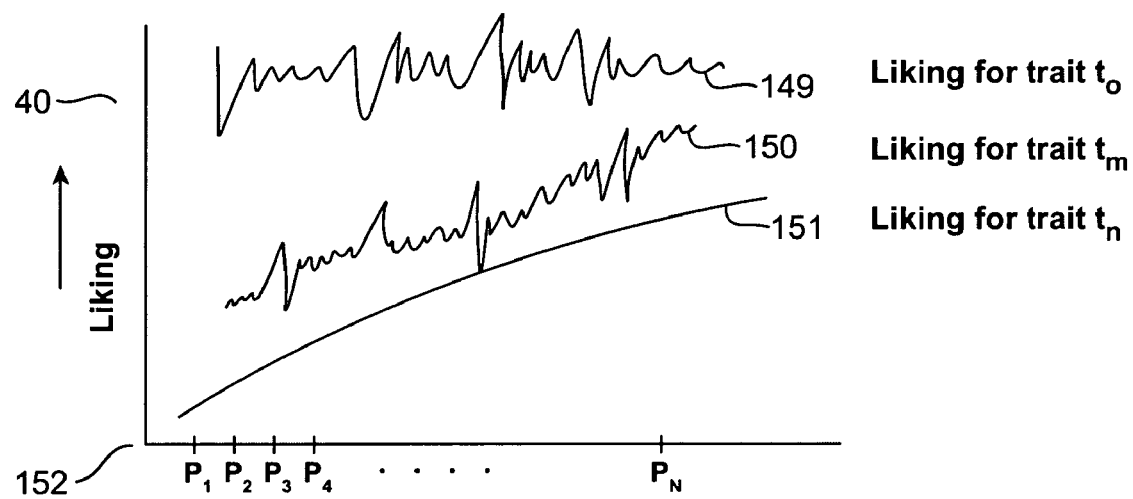
FIG. 8 shows the relationship between two correlated traits.

Determination of hidden traits in different programs can be achieved in a number of ways. One of these methods is illustrated in FIG. 8. The possibility of the presence of a hidden traits exists whenever there exists a strong co-relation between any two traits present in different programs. The y-axis represents an increasing liking value for higher values of y. Every point on the x-axis in FIG. 8 represents a user arranged such that the liking value of the trait "tn" increases with higher values of x. If for the same values on the x-axis the liking values of a strongly co-related trait "tm" are also plotted, it will exhibit a relation to the liking graph of the trait "tn". The co-relation between any two traits may be explained by he presence of a common hidden trait. Thus traits "tm" and "tn" may be expressed mathematically as $$tm = tx + tm'$$

$$tn = Ctx + tn'$$

where C is some constant indicating the amount of co-relation between traits "tm" & "tn".

Hidden traits can also identified by applying rules of thumb or some other appropriate manner.

While ail programs of a specific genre exhibit some common traits, the degree to which these traits are exhibited vary from program to program. This degree of traitness for recurring programs can be quantified such that it best explains the viewing choice of watching or not watching that program in the representative sample. For example consider a user who has a certain liking ☐ for comedy. The users' decision to watch a comedy program would be influenced by whether the amount of comediness exhibited by that program crosses some threshold of comediness that is determined by its liking for comedy.

Figure 9A:
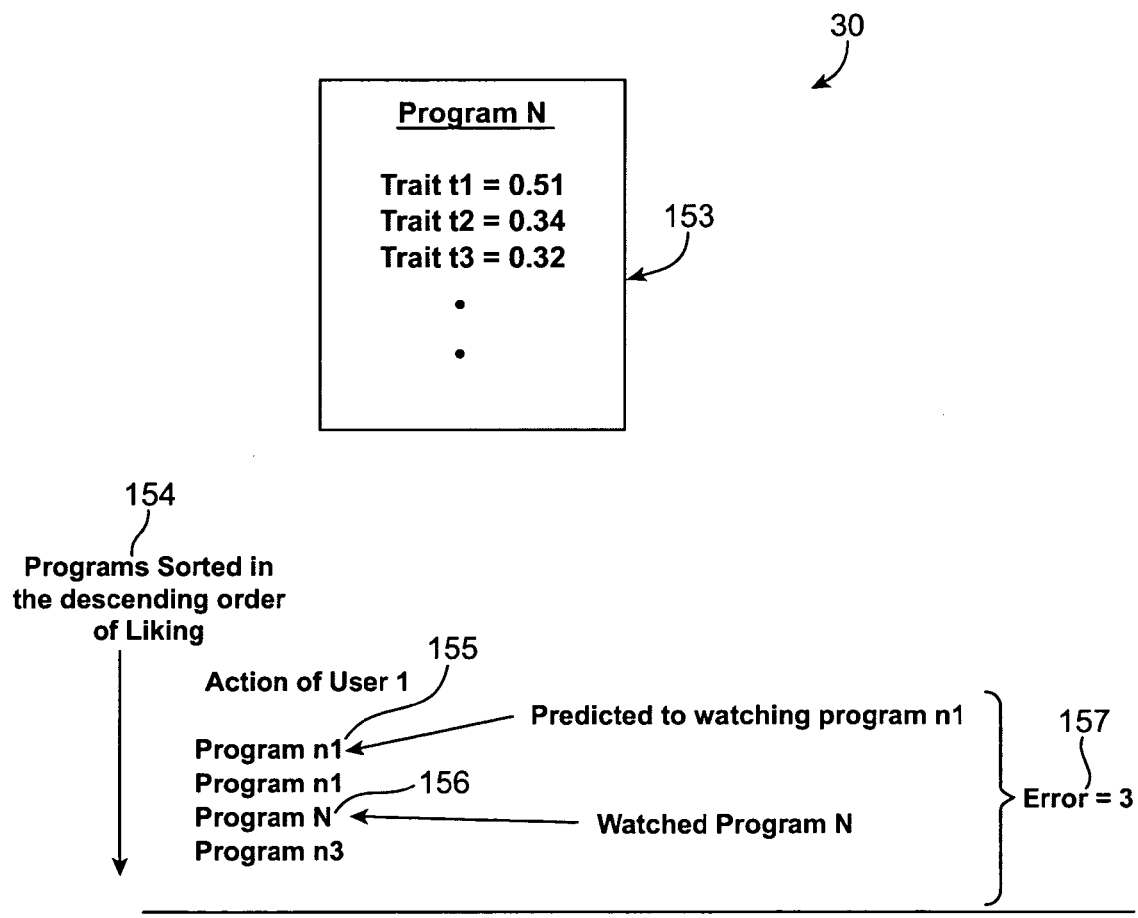

One method to determine the traitness of a trait T in a given program N is illustrated in FIGS. 9(a)-(c). The highlighted program represents the programs actually watched 156 by a user. All available programs are arranged in decreasing order of rank 154 as computed by the Liking Function. In the case of User 1 155 the Program N 156 which was watched by him appears third in rank whereas the Liking Function should have actually ranked Program N at the top. In this case the margin of error 157 in the traitness of trait T is 3. In the case of User 4 the program N watched by the user was ranked the highest. The margin of error in the traitness of trait T is 0. In the case of user 2 where he did not watch Program N, it was ranked the highest. The margin of error in this case can be considered to be a constant K. A suggested value of K may be the number of programs available to the user at that time. Similarly for user 3, the margin of error may be considered K-1. Such margins of error are computed for all users who watched the Program N and the average margin of error is computed.

Using regression analysis, the traitness value of the trait T is adjusted incrementally to reduce the average value of the margin of error. The value of traitness which yields the lowest value of the average of the margin of errors is considered the best value of the traitness of the trait T exhibited by the program N.

Traitness values may also be assigned by rules of thumb or some other appropriate manner.

Figure 10:
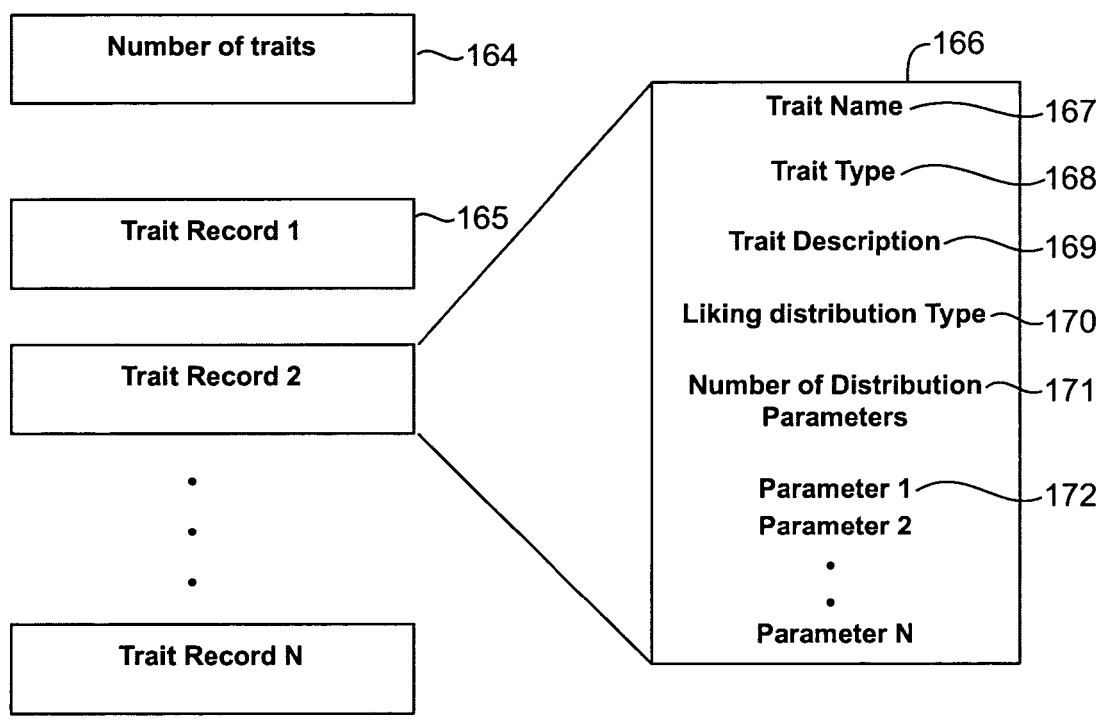
FIG. 10 is a block diagram-showing an example for the Liking distribution record format.

One of the outputs of analyzing the viewing habits of a representative sample is a distribution list of the likings amongst the viewing population of each trait. This information is presented schematically in the FIG. 10 and is made available to every individual user Set Top Box along with the broadcast TV programs and program information. "Number of traits", 164, represents the total number of traits that have been identified after analyzing the viewing habits of the representative sample. The distribution of liking of each trait is provided in a "Trait Record", 165. Information included in a trait record include the name of the trait, 167, the type of the trait, 168,(whether hidden, associate, etc), the liking distribution of the trait 170, and the distribution parameters, 172, of the trait. Examples of various possible values in a trait record are provided in FIG. 11.

Figure 12:
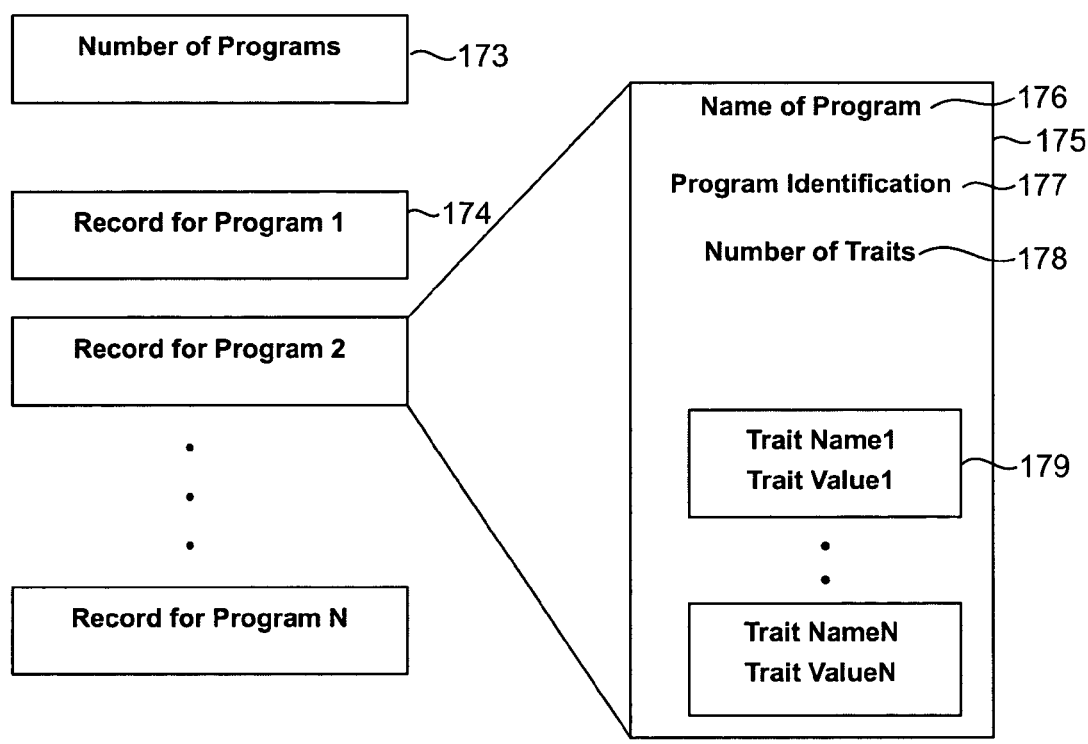
FIG. 12 is a block diagram showing an example for the trait-ness record format.

FIG. 12 illustrates one schematic representation of traits present in recurring programs. This information is passed along with the above liking distribution of traits. The "Number of programs" 173 represents the number of programs for which trait information is sent. Relevant traits and the degree to which they are exhibited are included in the "Program Record" 174. The "Program Identification" 177 information is used to identify the TV program to which this record pertains. An example of a Program record for a Seinfeld Episode is given in FIGS. 13. As given in the example certain traits such as "Program Name—Seinfeld", "Channel—NBC", "Program Type—Sitcom" can be derived directly from the EPG and are called static traits. Additional traits such as "comedy" which store the degree of comediness associated with a Seinfeld Program may also be passed as a part of the EPG data.

Referring again to FIG. 2, the program content and the program information (in the form of an EPG) are transmitted from a Broadcast Head End along with preference determination parameters, 119. Examples of preference determination parameters include but are not limited to (i) the traits which are exhibited by each program and the degree to which such a trait is exhibited and (ii) a distribution list of the liking values amongst the viewing population of each trait.

This information is received in each household by a program selection device 100, that include a preference Determination Module, a personal preference database, 116, a storage device and a display device 108. The personal preference database 116, is used to store the results of the analysis of the individual user's viewing habits. The storage device stores programs as per the user's specific requests or programs recommended by the preference determination module.

Program Selection Device 100 monitors each user's viewing actions and selection of TV programs being watched.

Figure 14:
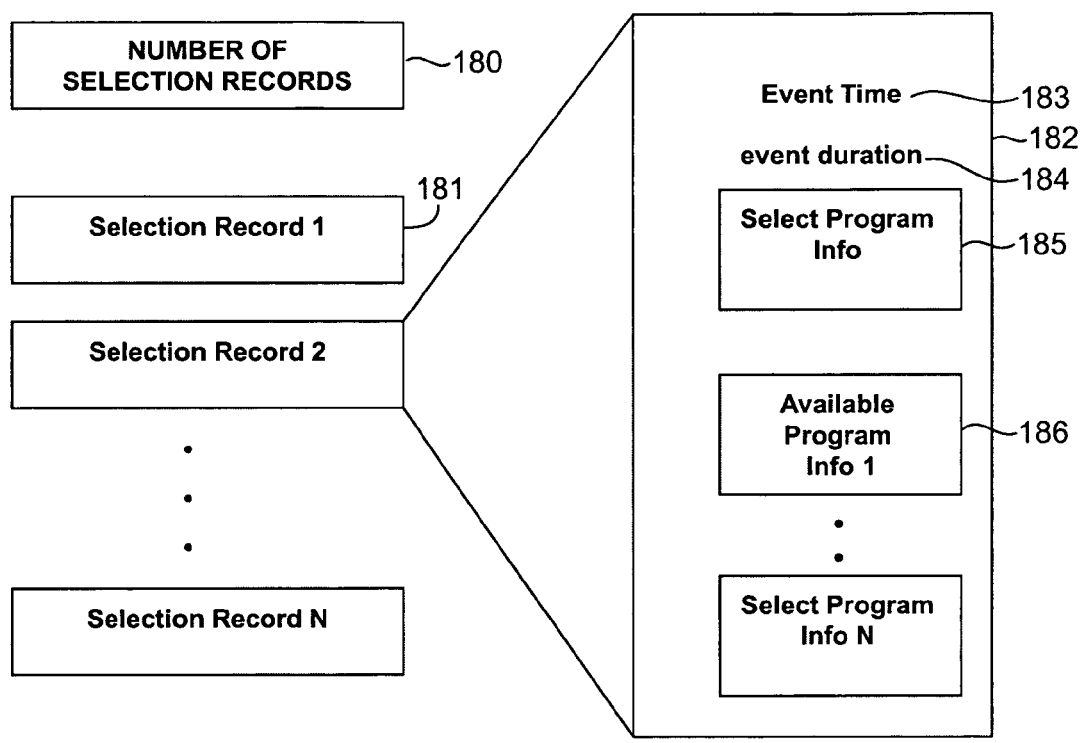
FIG. 14 shows an example for user selection record format.
Figure 15:
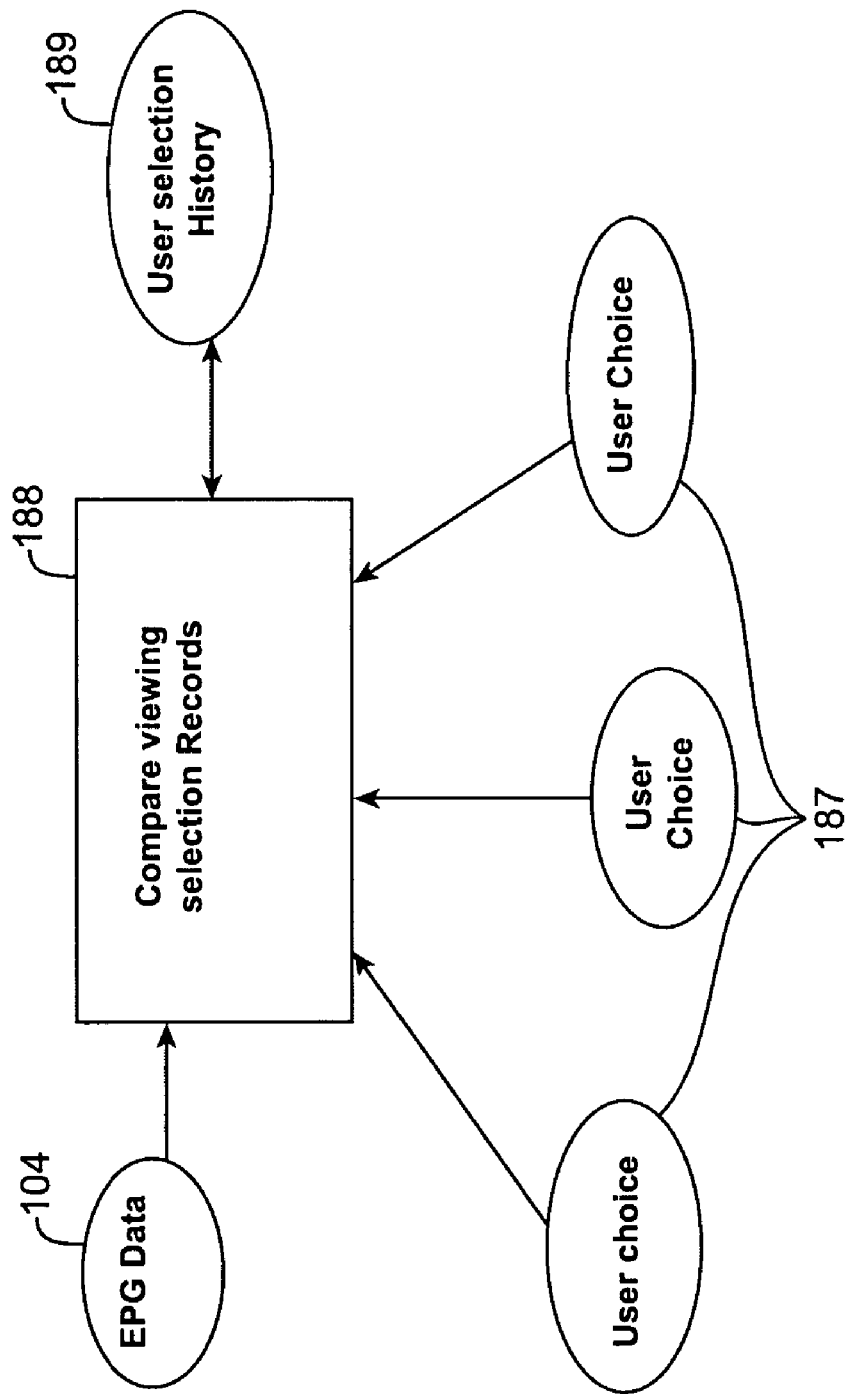
FIG. 15 is a block diagram showing the inputs and output for the generation of user selection history

This is stored in a storage device or in memory in the form of selection history data 189 (see FIG. 15). The schematic representation of selection history data is given in FIG. 14. The "Number of selection records", 180 represents the number of user selection choices stored in the selection history data Each selection record 181, contains the information on the actual programs watched 185 along with information on the competing programs available at that time 186. Storing program information is required as the EPG may not be able to provide information on past programs. Information on these program may be obtained directly from the EPG data when the information is obtained while the program is still current. The time 183 and duration 182 for which a program was watched also form a part of the selection record. As illustrated in FIG. 15, a uses selection history 189 is derived from each choice 187 made by the user along with program information from the EPG 104.

Figure 16:
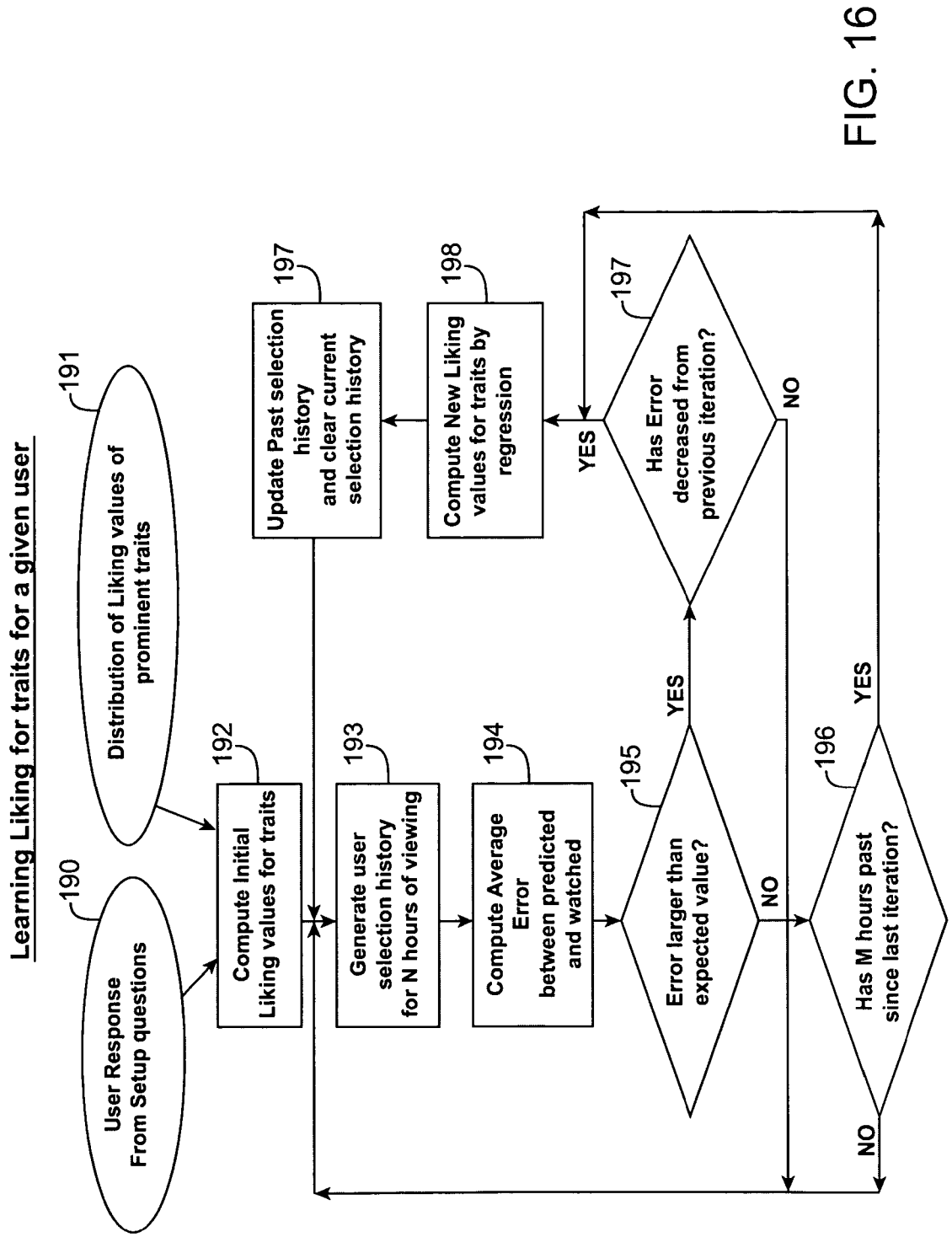
FIG. 16 is a flowchart illustrating the process of learning the liking values, performed on a program selection device.

One process of learning the user preferences of a specific individual is illustrated in FIG. 16. The liking distribution in the representative sample for traits identified by data analysis, 118, are used by the Liking Function to minimize the effect of error introduced because of lack of sufficient sampling in the computation of the liking of the identified traits by an individual. An individual user's response to setup question 190 may also be factored in determining initial values of liking for that individual 192.

A user selection history 189 is maintained for a fixed number of hours. The number of hours for which the user selection history is maintained can be preferably changed to have an increased rate of learning during initial days of a new user using the device. Average Error is computed N 194, in a similar manner as for users; in the representative sample, as previously described in FIG. 6. If the average error is greater than a tolerable limit 195, new liking values are computed 198. Entries in the user selection history are moved to the Past selection history. If the Average error remains under a tolerable limit the liking values are computed only after a predefined number of hours 196.

Another embodiment of the selection record stores a program ID instead of the entire program information. In this embodiment, the actual program information is broadcast at predetermined times from the Head End where each program is identified by the same program ID stored in the selection record. In this embodiment, the computing 198 of liking values for traits are performed only at this predetermined time.

Figure 17A:
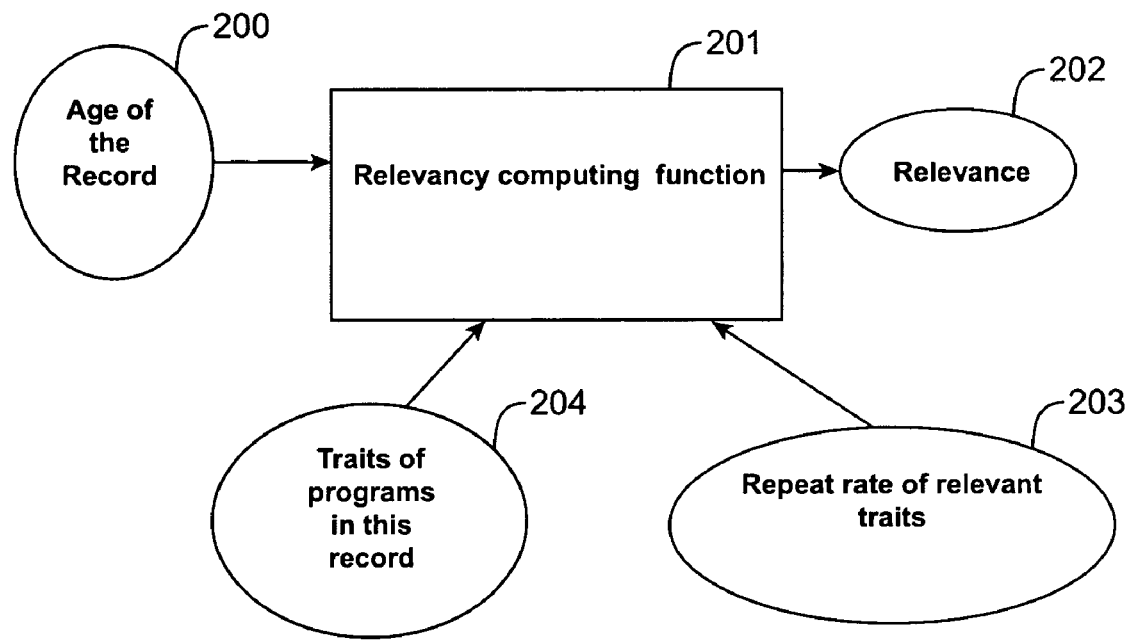
FIG. 17(a) is a block diagram showing the inputs and output for the computation of relevancy value for selection history record.
Figure 17B:
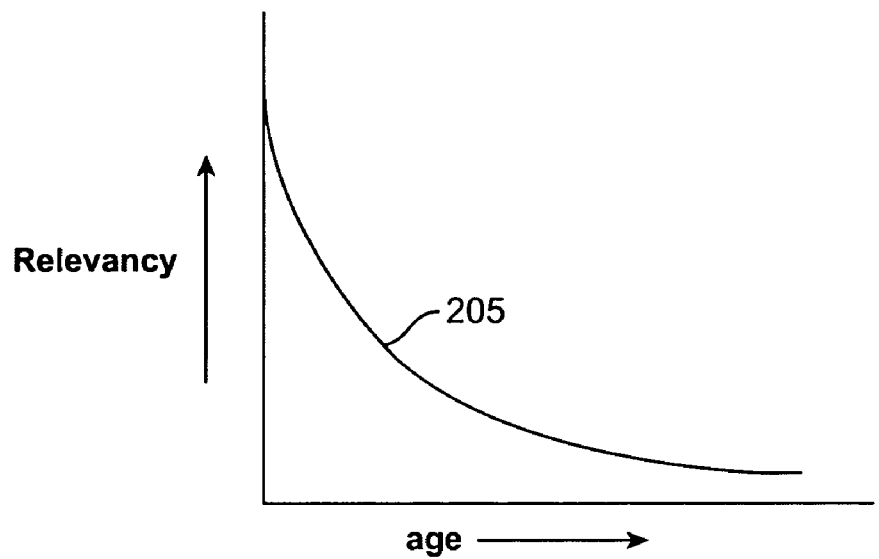
FIG. 17(b) is a graph representative of relevancy over age.
Figure 17C:
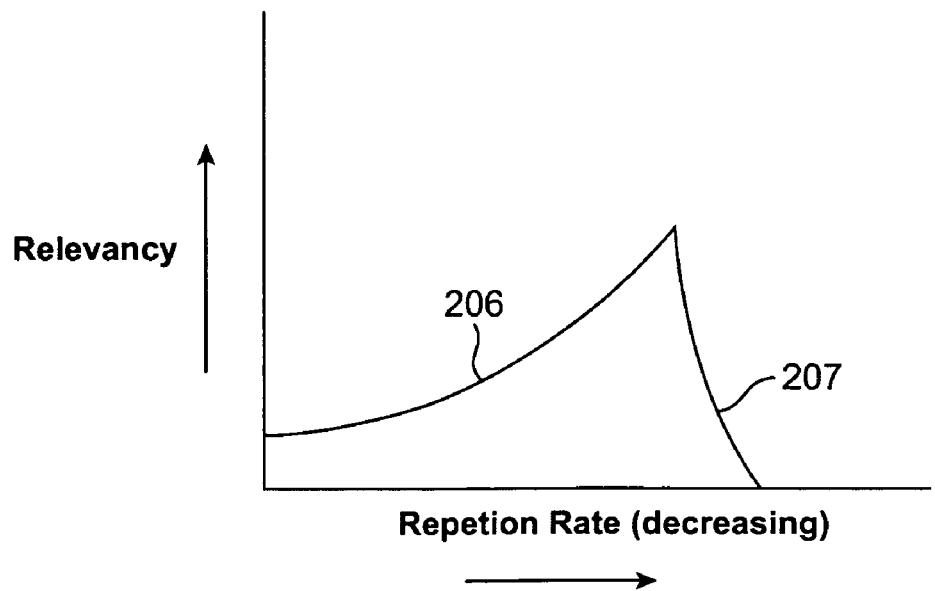
FIG. 17(c) is a graph representative of repetition rate over relevancy.

Referring now to FIG. 17(a), after each computation of liking values, entries in the user selection history is moved to the Past selection history. Selection history is partitioned as user selection history 189 and Past selection history 216 to optimally store the section history records. Selection history contains information about all selections made by the user between two computations of Liking values. Past selection history maintains the most relevant information about the most relevant selections made by the user in past. The number of records in the Past selection history can be advantageously configured to suite the memory available for storage of such records. Relevancy in this context is the importance of the record in computing the liking values and is dependant on many parameter including but not limited to the age of the record 200, the repetition rate 203 of traits contained in programs 204 in the selection record. The relationship between relevancy and age 205 of the record is shown in FIG. 17(b). The most relevant records are the most recent records. The relationship between relevancy and the repetition rate of traits contained in programs in the section record is shown in FIG. 17(c). As the repetition rate decreases, the relevancy increase 206, till certain limit after which the relevancy decreases 207. A good example to illustrate the reasoning behind this relationship would be relevancy of keeping records on user selection when Seinfeld a weekly program is available and the relevancy of keeping records on user selection when Olympics a 4 yearly program is available. While it is important to keep records about Seinfeld to compute likings of various traits contained in Seinfeld, it is pointless to keep records about viewer's liking for the last Olympics. Consider a user who does not have a liking for movies except on Fridays. To accurately determine the user likings of trait of "Friday night-ness" of a movie, the selection records pertaining to its viewing actions on a Friday have to be maintained for at least a number of weeks. However if the repetitive nature is too far apart in time, the relevancy decreases sharply. The "Relevancy versus Repetitive Rate of a Trait" graph in FIG. 17(b) measures increasing values of relevancy for higher values on the y-axis. The x-axis measure decreasing rates of repetitiveness of a trait in a program. As shown in FIG. 17(a), beyond a certain threshold of repetitive rate, the relevance decreases sharply.

Figure 18A:
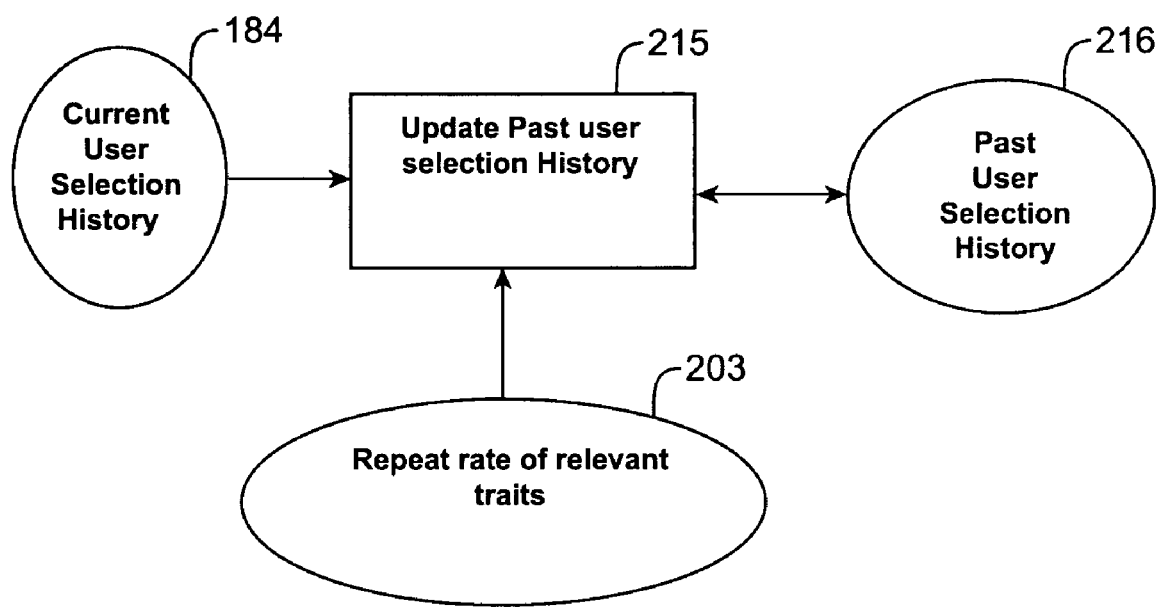
FIG. 18(a) is a block diagram showing the inputs and output for the process of updating of past selection history
Figure 18B:
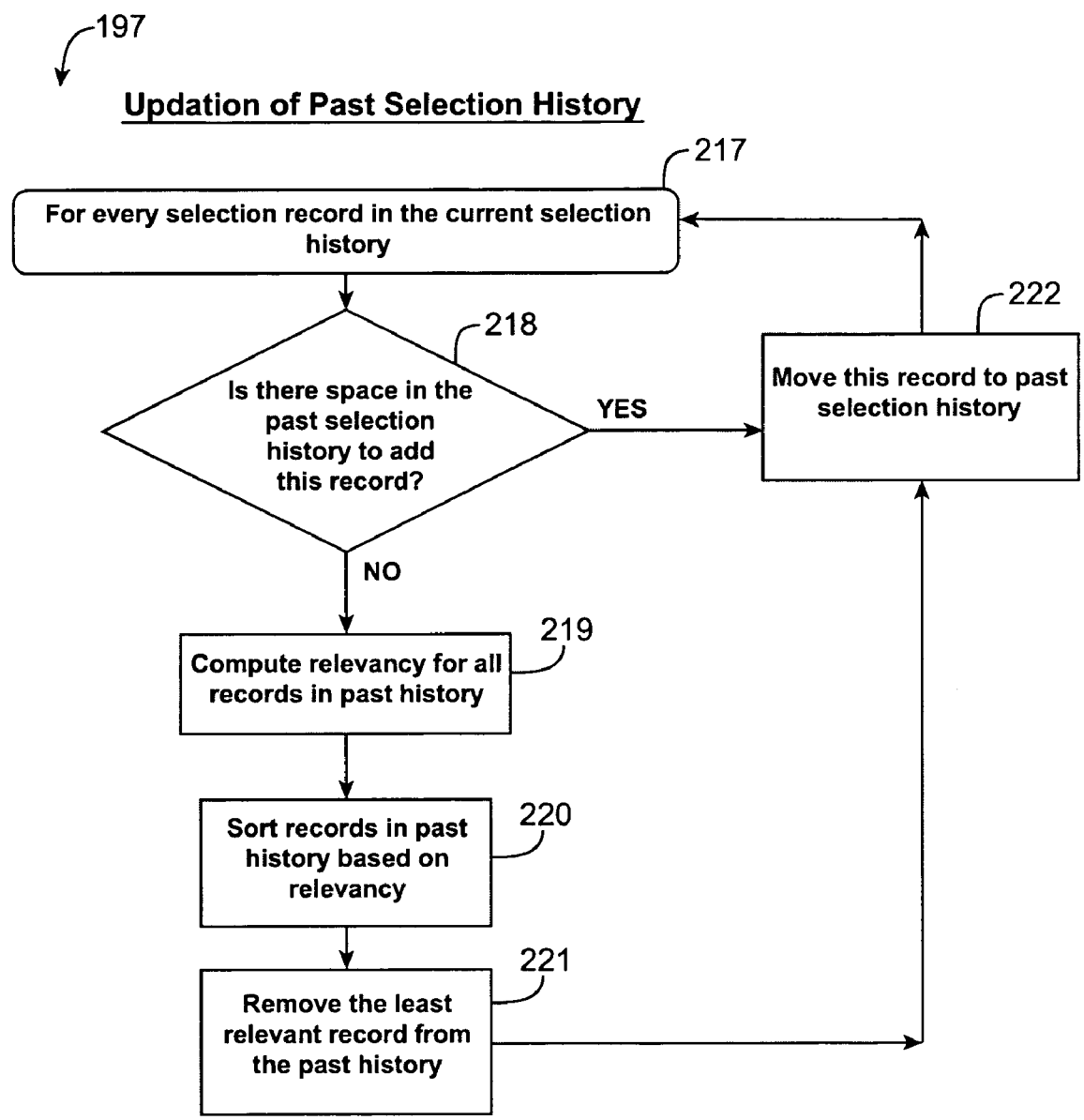
FIG. 18(b) is a flowchart illustrating the process of updating of past selection history

The process of updating of past history is shown in FIGS. 18(a) and 18(b). The processing is done for every record in the user selection history. If there is enough memory to store the new record in the past selection history 218, the record is removed from the user selection history and added to the past selection history 222. If there is not enough space in the past selection history 218, the records in the past selection history are sorted based on relevancy 220, and :he least relevant record is deleted 221 to make space to add the new entry 222.

In another embodiment of the present invention, the number of available programs 186 stored in the past selection history can be limited to an optimal number to make best use of the memory available (see FIG. 18). In this embodiment only the programs with higher values of liking, representing the traits which have significant liking values, are stored in past selection history record.

Figure 19:
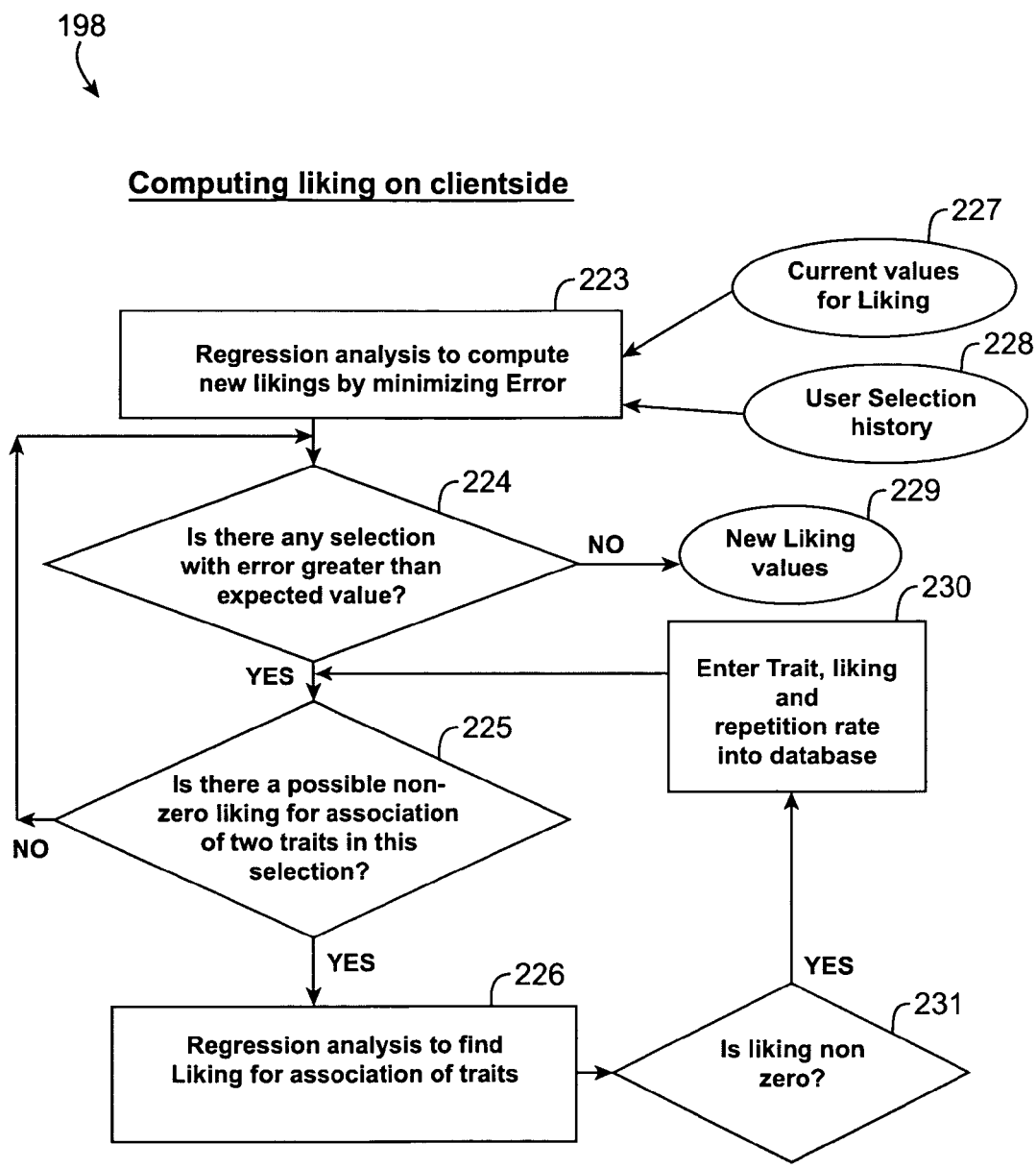
FIG. 19 is a flowchart illustrating the process of computing liking values performed on a program selection device.

Computing of Liking values for different traits performed by the Program selection device 100 is shown in FIG. 19. This process is performed 198 during the learning process as explained by FIG. 16. Regression analysis is performed to minimize error in prediction of viewer behavior stored in user selection history and past selection history by using current liking values as the starting point. The regression analysis process 223 is the same as the one performed in representative sample 131. If there are any selection record for which the error is more than a predefined threshold 224, the selection record is examined for the presence of possible associated traits 225. The rules which defines the presence of possible associated traits may be rules of thumb. Possible association of traits can also be discovered by looking up the list of associated traits which were discovered from the representative sample. Liking for possible associated traits are computed by regression analysis 226. If the computed liking is a significant value 231, the liking for trait is entered 230 into the preference database 116. Other parameters like the repetition rate for the trait also is entered into the database 230. The repetition rate is computed by looking at the repetition rate of the trait in user history and past history. If there are no previous selection record with this trait, then the repetition rate is assumed as a predefined value. As new selection records are created, the repetition rate is updated. At the end of the process (illustrated in FIG. 19) of computing the liking values, a weighted average of the current liking values and the old liking values is computed. This forms the new set of liking values. Learning rate can be increased or decreased by changing the weight of the current liking values.

Figure 20:
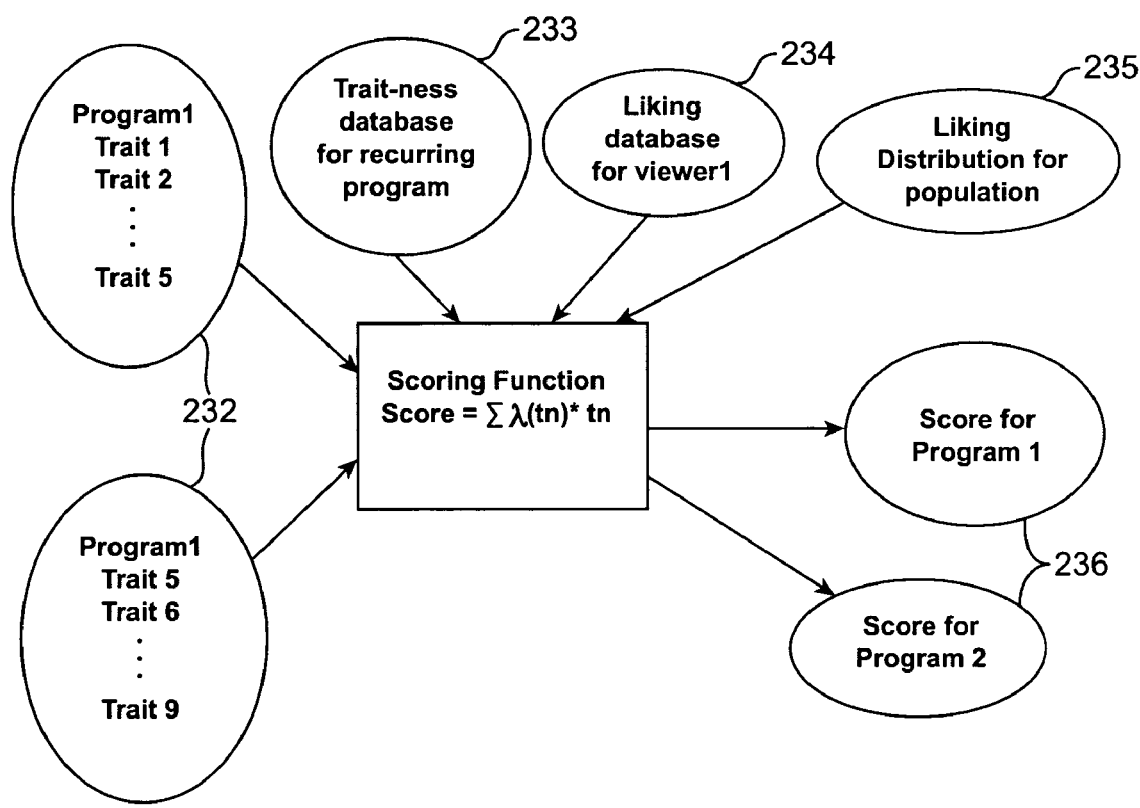
FIG. 20 is a block diagram showing the inputs and output for the computation Liking for programs.

A flow chart of computing scores for programs for future prediction is illustrated in FIG. 20. As described earlier Liking 236 for a program 232 is computed by evaluating the function $1(p)=\Sigma\lambda(tn)*tn$. $\lambda(tn)$ is computed as a weighted average of liking for the trait tn for the user 234 and the liking for the trait tn for the general population 235.

In another embodiment of the present invention which is suited to function on program selection devices operating on households with multiple users, the viewer is asked to input the number of viewers in a household during the initial setup process. Each viewer can answer a set of setup questions which would capture their liking for representative traits. An initial set of possible liking values are created for each viewer. Learning process updates each viewer's preference database separately after identifying each viewer session correctly. Viewer identification is done either by explicit input from the viewer identifying the viewer or automatically by identifying the viewer by monitoring the television viewing behavior of the viewer. To identify a viewer automatically, the error value between predicted and actual is computed for all viewers. The viewer with liking value which yields the least error value is chosen as the possible viewer. The certainty of this decision is expressed as a probability which is computed as a function of the differences between error values for different viewers in this household.

The objective of the present invention is to determine demographic characteristics of a user by analyzing the users viewing habits in juxtaposition with viewing habits of a representative sample of users whose demographic characteristics are known. These demographic characteristics of a user collectively constitute a demographic profile. Upon successful creation of an accurate demographic profile for a user, the present invention can receive a collection of possible ads and show individual users only those which are targeted to a matching profile.

Some example of demographic characteristics include, but are not limited to, a users gender, race, age and income. The output of the analysis of viewing habits of the representative sample provides a basis for determining demographic characteristics of the individual user.

Figure 21B:
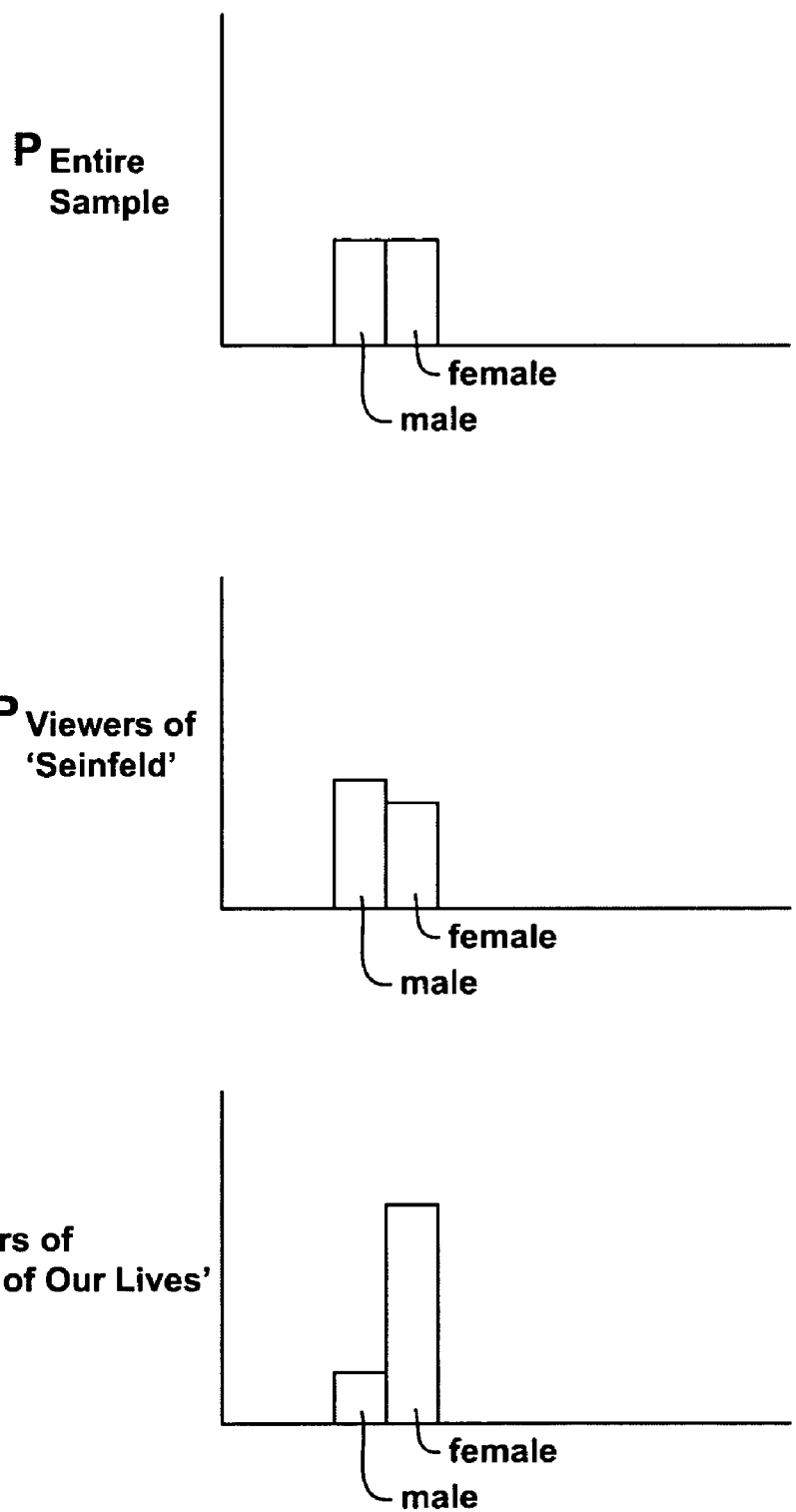
FIG. 21b illustrates distribution of gender for different programs.

The TV program viewing preference information chosen in the analysis of viewing habits, of the representative sample, plays an important role in determination of a demographic characteristic. Different TV programs might be required to determine demographic characteristics. Typically TV programs where a majority of the viewing audience shares a common demographic characteristic, in a proportion which is different from what is observed in the general population, are best suited in the discovery of demographic characteristics. For example to determine the "income" demographic characteristic consider graph (i) in FIG. 21a. The x-axis represents the annual salary in increasing order of x. For any point in the x-axis, the y-axis represents the probability of finding an annual salary of x in the representative sample (which is the same in the general population). Now consider graph (ii), where the dotted curve plots the same income distribution represented in the graph (i), the first solid curve (the leftmost curve) shows the income probability distribution of the viewing audience for program P1 in the representative sample and the second solid curve represents the income probability distribution of the viewing audience for program P2 in the representative sample. Analysis of the viewing habits of an individual user for the above programs P1 & P2 could be used to determine his most probable annual income. Using Bayesian inference this probability may be expressed by the following mathematical formula $$P(Ixy|Wp1)=P(Wp1|Ixy)P(Ixy)/P(Wp1)$$

where

Ixy represents an annual income range of x-y

Wp1 represents watching program p1

P(Ixy|Wp1) represents probability of income of Ixy given the fact that program p1 was watched P(Wp1|Ixy) represents probability of watching program p1 given the fact that the annual income is Ixy P(Ixy) represents probability of income of Ixy in the representative sample P(Wp1) represents probability of watching program p1 in the representative sample Thus for a user who watches program p1, the probability of his income being within a certain range can be determined.

Programs whose viewing audience display a demographic characteristic in the same proportion as is observed in the representative sample (which is the same in the general population) do not contribute significantly in determining demographic characteristics. Consider the graphs in FIG. 21b. Graph (i) shows a bar graph which represents the probability of a person in the representative sample being male or female. The graph (ii) shows the probability of person being male or female within the viewing audience of program P3 which is very similar to what is observed in the general population. If Bayesian inference is used to determine the gender of a person who has watched program P3, the probability of the person being a male or a female would be the very close to the probability of person being a male or a female in the general population (which is already a known value). Nothing significant is gained by analyzing the viewing habits of the individual for the program P3. On the basis of the graph (iii) on the other hand, analyzing viewing habits for program P4 would yield additional certainty in determining the gender of a person than what is already known about the gender distribution in the general population.

The determination of which programs yield high probability values in determining a demographic characteristic of a user may be done by applying rules of thumb through an algorithm which chooses the program on the basis of how much a demographic trait in it viewing audience differs from what is observed in the general population by some other means.

Depending on the program content and the demographic characteristics of its viewing audience, the same television program maybe used to determine one or more traits. It is also possible that a completely different set of programs are required to study different demographic characteristics.

Furthermore, the present invention contemplates analyzing other preferences of a user in addition to or in place of the users television viewing preferences. Such information may include, but is not limited to, musical preference, reading preferences, shopping preferences (a very large category that comprises, among many others, preferences in clothing, furniture, jewelry, decorations, appliances, electronic equipment), political and religious tendencies, etc. Such information may be obtained from any source, but in one preferred embodiment it is obtained from on-line sources (typically accessible as world wide web sites) that the user is a member of or visits frequently, such as music clubs, book clubs, other special-interest sites (e.g. a site devoted to a particular sport or hobby), news sites, etc. Other information descriptive of the users preferences includes user subscriptions, such as to newspapers, magazines, newsletters, shopping catalogs, and other special interest publications.

While it is possible from Bayesian inference to ascribe a certain preference for a specific show based on a users demographic characteristics, it may not be the only factor which explains the users choice of a particular show. For example, consider the graph (ii) in FIG. 21a. It might be possible for a user, U1, having income less than x1 having a strong preference for program P2 for unknown reasons. So just using Bayesian inference to arrive at U1's most probable annual income based on his viewing habits of only a single program P2 would not yield the most meaningful result. To strengthen the belief of a Bayesian inference, the users viewing habits have to be analyzed for a set of programs where the viewing audience of each program from that set displays a similar demographic characteristics. The programs of the set are so chosen that degree of co-relation of traits exhibited by the programs in the set are minimal. Each program that the user views from this set of programs adds towards strengthening the belief of the Bayesian probability of the user possessing that demographic characteristic.

To explain the need for minimal co-relation consider the previous example. If another program P3 which is very similar to P2 in content and has the same demographic traits in its viewing audience as P2 is available to user U1, he would have a similar liking for P2 as P3. In this scenario strengthening the belief of the Bayesian probability by the user U1 watching program P3 is not a positive contribution. However if program P3 were very different in contents and the traits that it exhibits, the probability of U1 choosing P3 is greatly diminished and keeps the belief in the Bayesian probability from erroneously rising. In this situation the probability of a user who actually possessed the demographic characteristic of watching both programs P2 &: P3 would be quite high and the strengthening of the belief would be a positive contribution.

Thus a Belief Function for the Bayesian probability for a demographic characteristic dc1 may be computed in many ways which includes but is not limited to $$BF(dc1) = MAX(bp(w1), bp(w2) \ldots, bp(wm))*cr1 + \\ MAX(bp(wk), bp(wk+1) \ldots, bp(wk+m)) \\ *cr2 + \ldots + MAX(bp(wn), bp(wn+1) \ldots, \\ bp(wn+m))*cm$$

where bp(wn) is the Bayesian probability of a user having that demographic characteristic given the fact that he watched program wn (w1, w2, ... wm), (wk, wk+1, ..., wk+m), (wn, wn+1, ..., wn+m) are sets of programs where any member of a set has a high degree of co-relation with another member of the same set, but a very low degree of co-relation with a member of another set.

MAX(bp(wn), bp(wn+1) ..., bp(wn+m)) represents the maximum Bayesian probability value of all possible values within that set cr1 represents a co-relation co-efficient of the set (w1, w2, ... wm), c2 represents co-relation co-efficient of the set (wk, wk+1, ..., wk+m) and so on. Elements of the same set have the co-relation co-efficient.

Figure 23A:
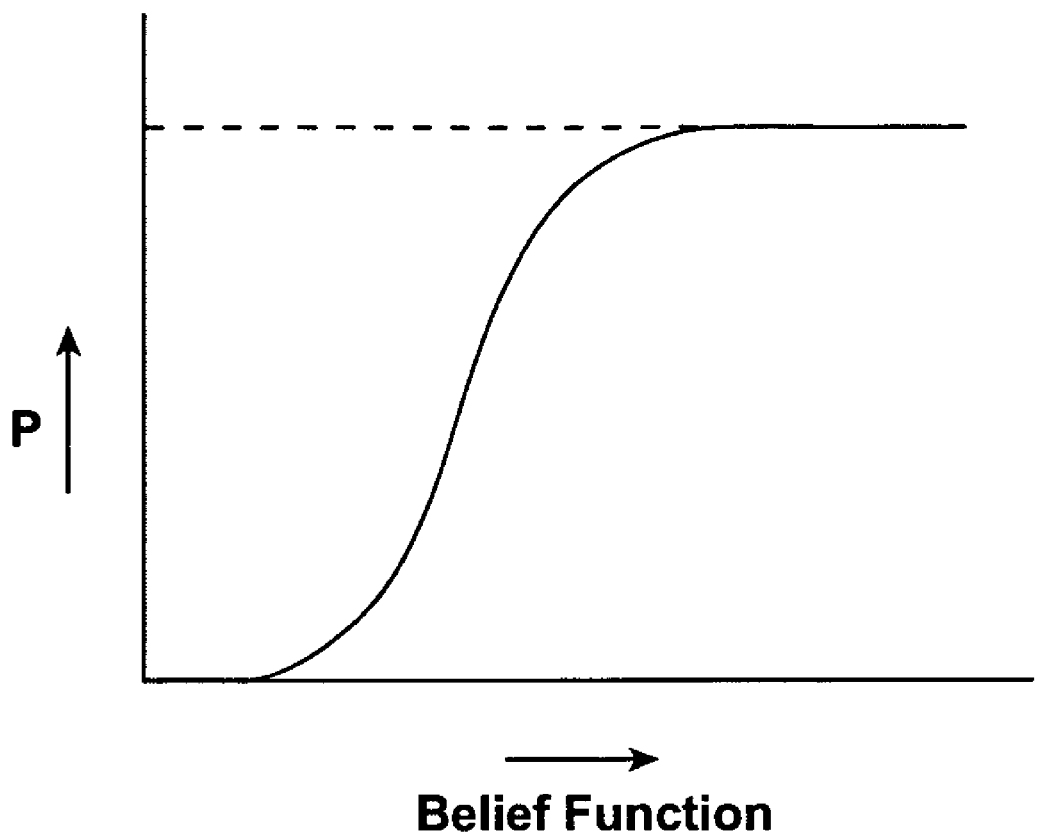
FIG. 23a is a graph illustrating the relationship between Belief function and probability for a user belonging to particular demographic trait value.

The Belief Function for any demographic characteristic is illustrated by the S curve in FIG. 23a. The x-axis represents increasing values of the Belief Function for a demographic characteristic for increasing values of x. The y-axis represents increasing values of the probability of a user displaying that demographic characteristic for increasing values of y. As shown in Figure, the probability does not increasing any further for higher value of the Belief Function.

Figure 23B:
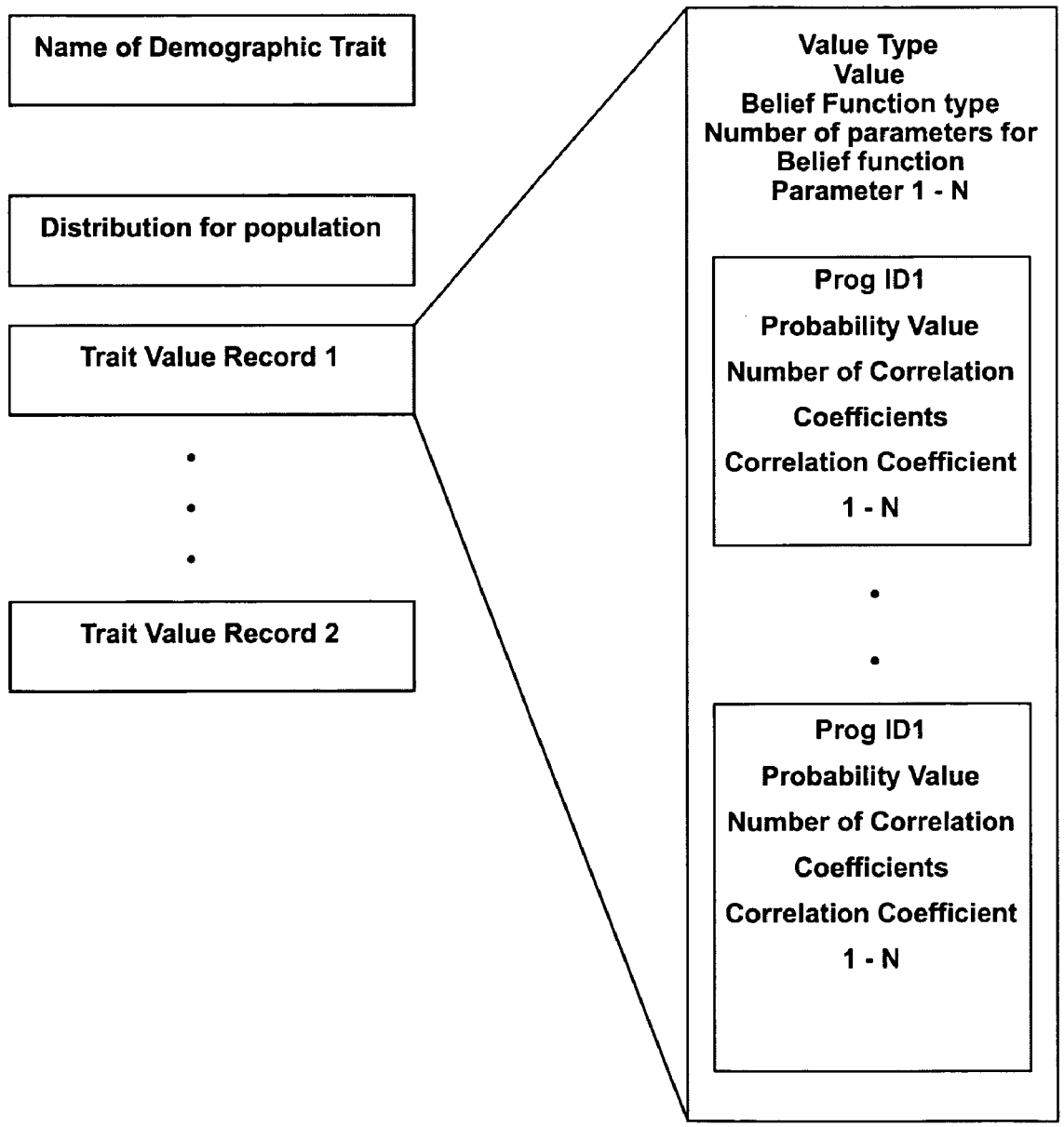
FIG. 23b is a flow chart of a demographic trait record format.

Some of the output of the analysis of viewing habits of the representative sample are schematically illustrated in FIG. 23b:

Display of advertisements by a program selection device in accordance with the invention is done when a users computed demographic profile matches the target profile of the advertisements. Some of the elements contained in an advertisement are the advertisement contents (may consists of video clips, audio clips, and/or graphical or textual information) and the meta data which includes information on the demographic profile to which this advertisement is targeted.

Figure 23C:
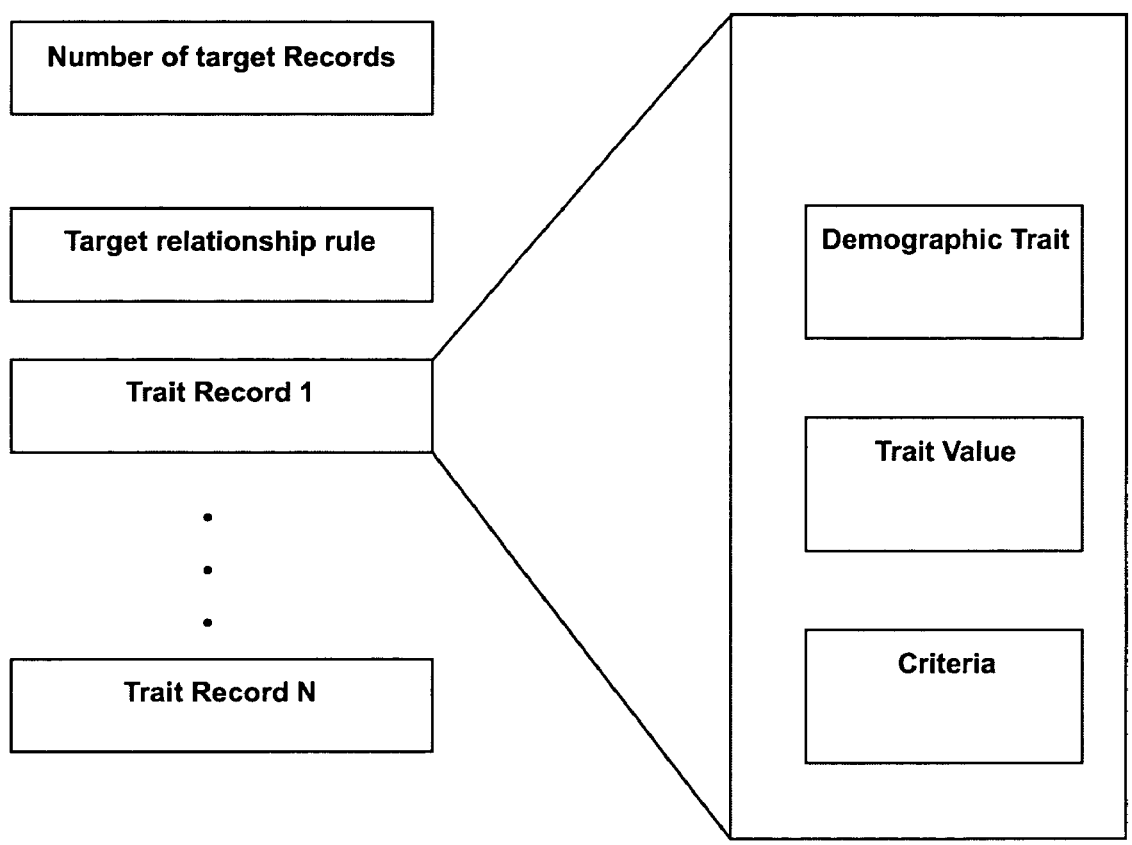
FIG. 23c is a flow chart of an advertisement targeting record format.

The meta Data contained in an advertisement is represented schematically in the FIG. 23c. Here "Number of Target Records" refers to the number of "Target Records" included in this "Target Ad Meta Data". Each "Target Record" refers to a demographic characteristic that this advertisement is targeted to. The "Target relationship rule" is used to determine the relationship rule. For example, the advertisement may be targeted towards users who satisfy any one of the following criteria:

income level is between Ix & Iy ethnic background is e1

The "Target relationship rule" would be used to specify the above relationship.

Figure 22:
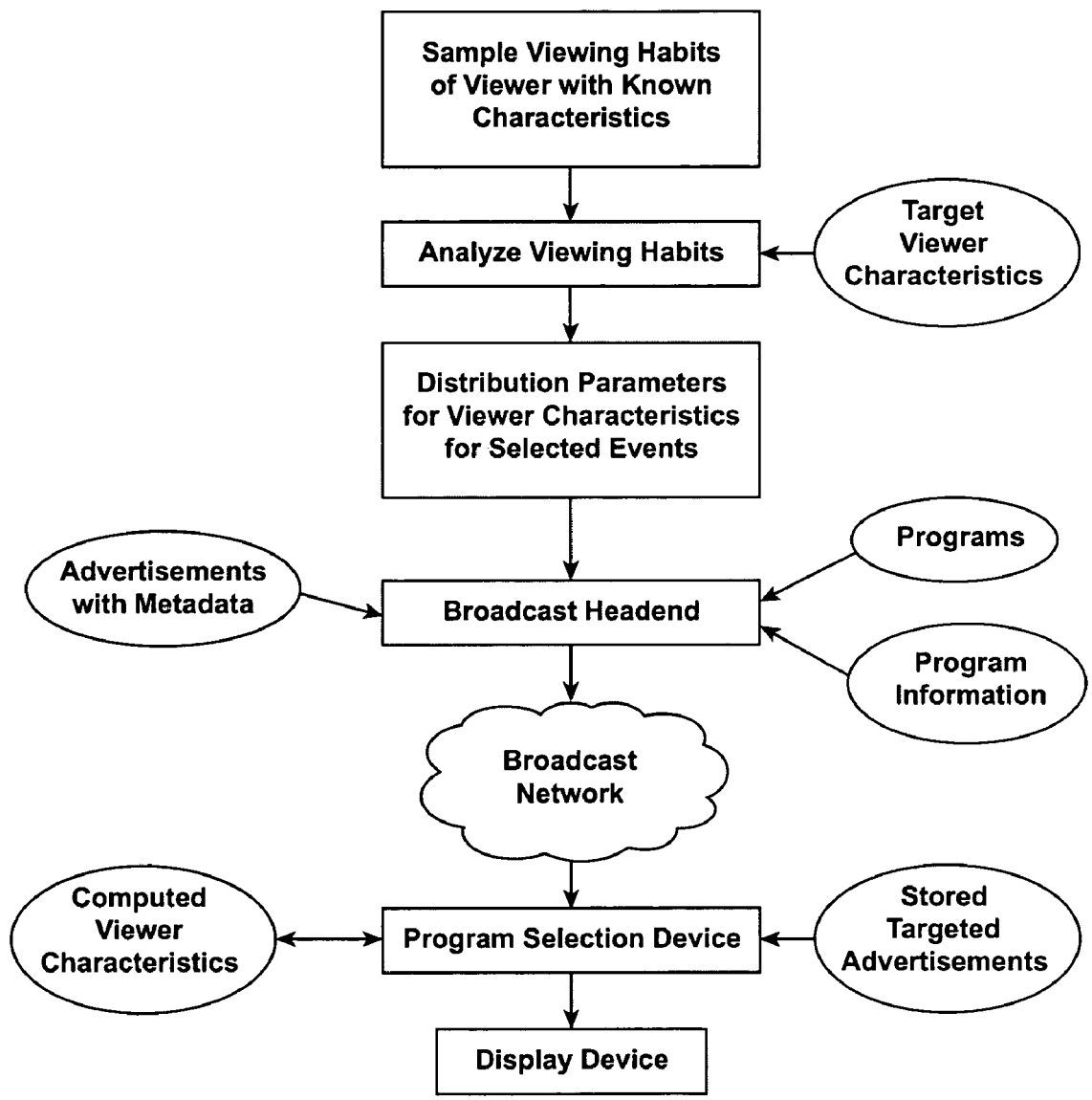
FIG. 22 is a system architecture for providing targeted advertising.

The "Demographic Trait Data" determined by analysis of viewing habits of a representative sample with known demographic characteristics and the "Target Ad Meta Data" are broadcast to a Program Selection Device from a Broadcast Head-end along with program content and EPG data. This is illustrated in FIG. 22. This is received by each user at each Program Selection Device to determine the user demographic profile. Broadcast of the "Demographic Trait Data" and "Target Ad Meta Data" along with the advertisement content may be done on a periodic basis, or may be made always available on the broadcast networks or through some other communication mechanisms on an as-needed basis.

At the Program Selection Device the "Demographic Trait Data" and "Target Ad Meta Data" are collected and stored in a storage device such as, but not limited to, a hard disk, flash ROM, or main memory. Collection of this data may be done at fixed time periods or whenever suitable depending on the embodiment chosen. For each trait record in the "Demographic Trait Data", the Program Selection Device goes through past Selection History. Each program on the "Trait Value Record" that is available in the past Selection History is used in the computation of the Belief Function. The Belief Function Distribution graph in the "Trait Value Record" is then used to determine the probability of the user having that demographic characteristic. If an earlier probability for this demographic characteristic is available a weighted average of the old probability and the newly determined probability is taken and stored. Each targeted advertisement where the "Probability satisfaction criteria" of the "Target Record" is met by user's demographic profile is chosen for display at the appropriate time.

As discussed elsewhere in the disclosure, in another preferred embodiment the present invention enables providing other targeted content to the user in addition to advertisements.

Referring again to FIG. 1, television control system 100 is preferably implemented by way of a general purpose digital computer and associated hardware that executes stored programs to implement the functions shown within block 100. The exact hardware and software platforms on which the television control system 100 is implemented is not important and may take a variety of forms. For example, television control system 100 may be implemented in a set-top box such as may typically used by individuals in the home to receive CATV signals. Another implementation of television control system 100 is in the form of a personal computer configured with the requisite hardware and software to receive and display television signals. An example of a set-top box that maybe programmed in accordance with the principles described herein is described in the following documents by IBM Microelectronics: "Set-Top Box Solutions", Product #G522-0300-00 (Nov. 19, 1997); "Set-Top Box Reference Design Kit", GK10-3098-00 (Apr. 15, 1998); "Set-Top Box Peripheral Chip", GK10-3098-00, (Apr. 15, 1998); "Set-Top Box Solutions: Helping Customers Meet the Challenges of Convergence", G522-0300-00 (Nov. 19, 1997); and "The challenges of convergence for Set-Top Box manufacturers", G599-0302-00 (Nov. 19, 1997). An example of an Application Programming Interface (API) available for set-top boxes which can serve as a platform for the embodiments described herein is described in "API Requirements for the Advanced Set-Top Box" published by OpenCable (Oct. 21, 1997). An example of an operating system incorporating functionality to support the embodiments described herein is available from OpenTV, Inc. and is described in the following Technical White Paper publications by OpenTV, Inc.: "OpenTV™ Operating Environment" and "Application Development for OpenTV™." An advantage of such an operating system is the support provided in the form of function calls to obtain attribute information 107 from the signals 104. Alternatively, a general purpose operating system such as the Windows NT operating system from Microsoft Corporation may be used in conjunction with additional software that provides the functions required to extract the necessary information from attribute information 107 and to perform other manipulation of the received signals 104 and the stored information 105.

Storage devices 106 may include a variety of different types of storage devices. For example preference database 116 may be stored in a non-volatile, random-access semiconductor memory. Television programs 105 and attribute information 107 may be stored on storage devices having greater capacity such as a conventional magnetic, hard disk drive. In general, storage devices 106 are understood to encompass a variety of storage devices. The exact form of the storage devices 106 is not critical so long as the storage devices have the capacity and speed to store the necessary information. Storage devices 106 may also comprise a conventional video cassette recorder (VCR) which operates under control of system 100 to store television programs 105 and attribute information 107 on conventional magnetic tape.

For the purposes of the present description, the television control system 100 is presumed to be integrated into, or coupled to, a system including a tuner and other functions necessary to receive television signals and to extract the attribute information 107 from the television signal and to perform other functions typically associated with the receipt and viewing of television signals. In certain embodiments, television control system 100 may operate in conjunction with a database agent that facilitates interaction with preference database 116 by causing storage and retrieval of information to or from the database in an optimal manner. The preference database 116 may be implemented by a commercially available database product such as the Oracle Light database product available from Oracle Corporation which also incorporates the functionality to implement the data base agent described above.

Figure 24:
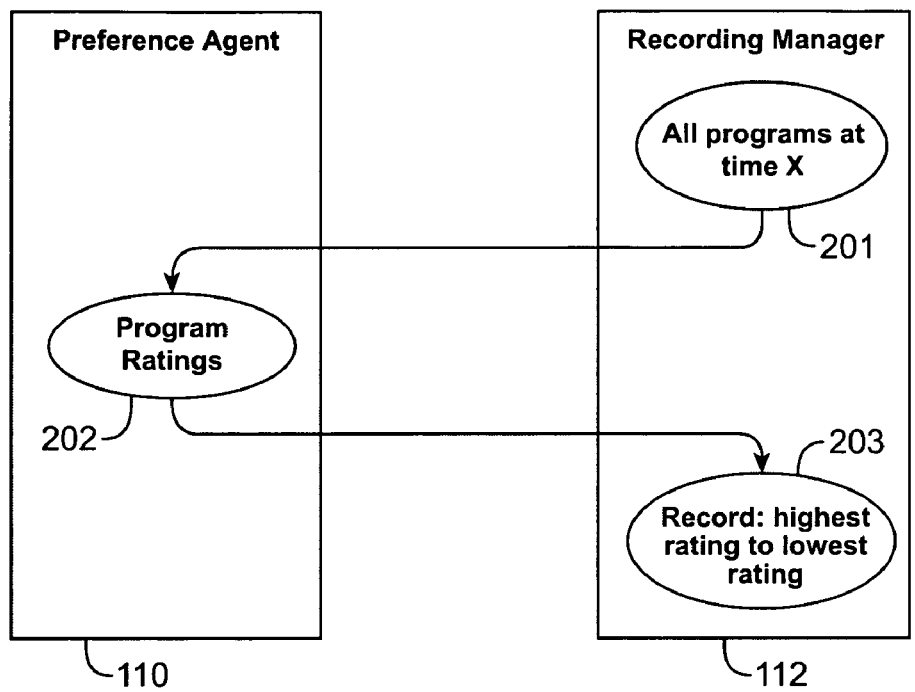
FIGS. 24 and 25 are block diagrams illustrating operation of certain functions performed by the television recording system of FIG. 1.

Recording manager 112 causes recording of programs 105 by periodically initiating a sequence of steps shown in FIG. 24. At 201, recording manager 112 sends a request to preference agent 110 for ratings of all programs at a particular time (X), or alternatively, for ratings of all programs within a particular time period (X). By way of example, the steps shown in FIG. 2 may be performed every six hours. In certain embodiments, the frequency with which the steps in FIG. 24 are performed may be changeable by the user. Preference agent 110 responds at step 202 by providing ratings, from preference database 116, for each program received from recording manager 112. Recording manager 112 then causes recordation of the programs at time X, or within time period X in accordance with the ratings received from preference agent 110. Specifically, programs having the highest rating are given highest preference for recordation and programs having the lowest rating are given lowest preference to recordation. The recordation is subject to storage capacity constraints. For example, if the highest rated program is one-hour long, and only thirty minutes of recording space is available on storage devices 106, then the one-hour program is skipped and the highest rated thirty-minute program is recorded.

Highest priority for recording of programs is given to programs specifically requested by the user. For example, if the user identifies a particular program for recording, such as by specifying the date, time and channel, or by specifying an identification code for the program, recordation of that program is given priority over programs rated by the preference agent. Next highest priority is given to programs matching particular category-value pairs specified by the user. For example, if the user does not identify a particular program, but specifies that one-hour long documentaries pertaining to travel should be recorded, then recordation of programs matching such category-value pairs is given priority over programs rated by the preference agent 110. In alternative embodiments, relative priority between user-specified programs, user-specified category-value pairs and programs rated by the preference agent 110 is changeable by the user.

Figure 25:
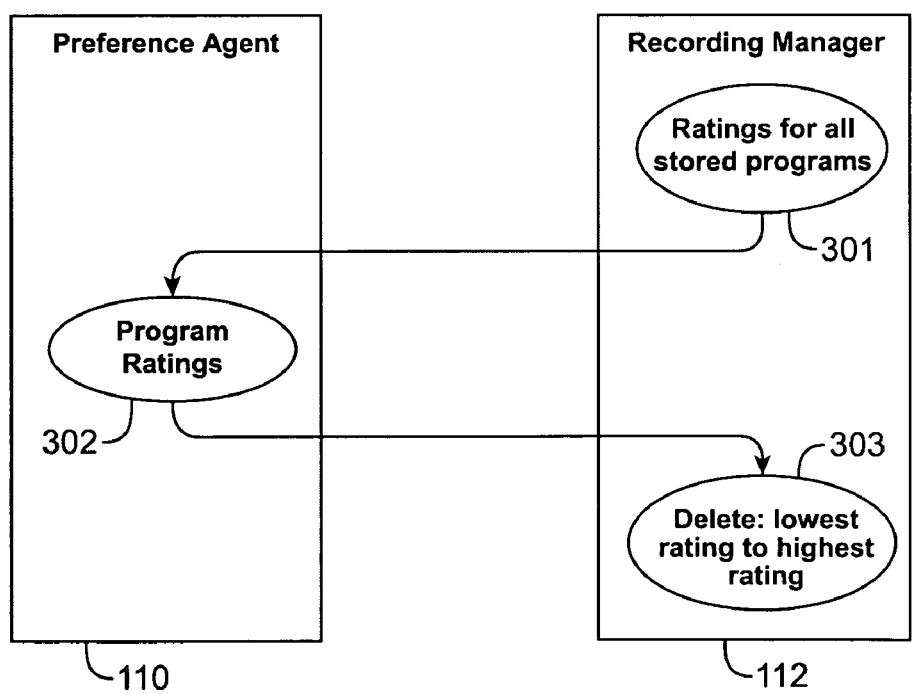

Recording manager 112 manages storage capacity on storage devices 106 by causing deletion of television programs 105 in accordance with ratings of such programs generated by preference agent 110. This is performed in a manner similar to that explained above for determining which programs to record. FIG. 25, which shows the steps taken by recording manager 112 to determine which programs to delete, is similar to FIG. 24. At step 301, recording manager 301 requests ratings from preference agent 110 of all programs stored on storage devices 106. At step 302, preference agent 110 responds by providing the requested deletion ratings. At step 303, recording manager 112 responds by causing deletion, when needed, of programs in accordance with the deletion ratings received from the preference agent 110. Specifically, when additional space on storage devices 106 is required to record one or more additional programs, recording manager 112 causes deletion, or overwriting of programs having the lowest rating first. Thus, stored television programs which are determined by preference agent 110 to be least preferable, in relation to other stored television programs, are deleted or replaced first, and those determined to be most preferable are deleted or replaced last. Deletion of programs occurs only when required. Advantageously, this results in storage device 106 typically being filled to maximum capacity, thus providing the user with as wide a variety of programs as possible. The user can specify programs that are to remain on the storage device 106. Such programs are not deleted by the recording system 100 in the steps shown in FIG. 25. In addition, the user can specify programs that are to be deleted, and therefore override the steps shown in FIG. 25.

In certain embodiments, the preference database is used by system 100 to alter the manner in which information about currently broadcast programs is presented to the user. For example, in such embodiments, the preference database is used to rearrange the order in which currently broadcast programs are presented to cause programs having attribute information 107 rated highest by preference database 116 to be presented first. Alternatively, the preference database 116 can be used to organize information regarding the currently broadcast programs according to the liking of various traits stored in the preference database.

Figure 26A:
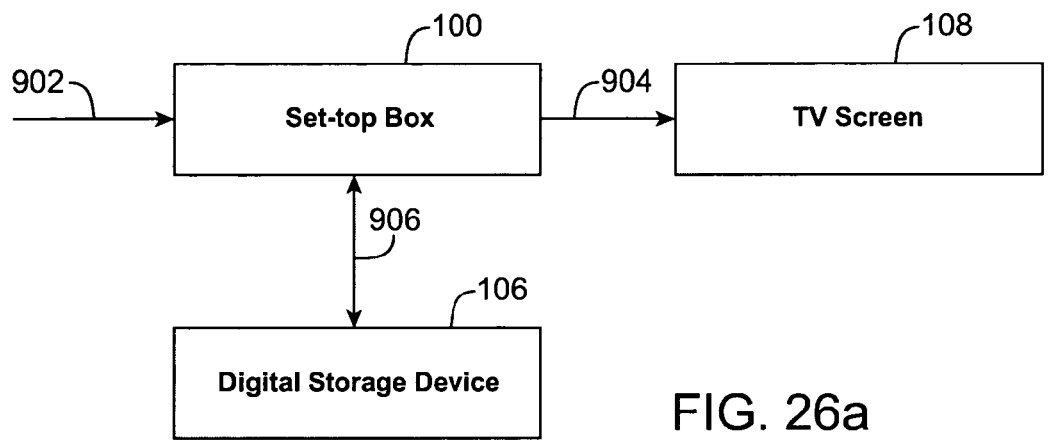
FIGS. 26(a)-b illustrate alternative hardware configurations in systems embodying the principles of the present invention.
Figure 26B:
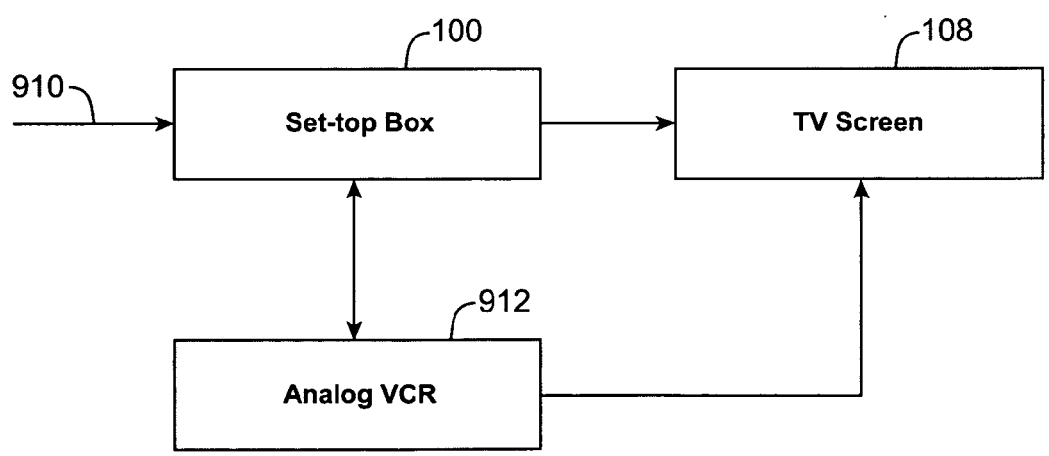

FIGS. 26a and 26b illustrate alternative hardware configurations for systems employing the principles of the present invention. FIG. 26a illustrates a hardware configuration that supports storage and retrieval of digitally encoded audio and video. Interface 902 is a standard digital cable or digital satellite input interface. Interface 906, which is the hardware interface to storage devices 106 preferably takes the form of an IDE or SCSI interface, or the proposed IEEE-1394 interface. Interface 906 is an NTSC or PAL encoded video interface. If the television signal 104 takes the form of an analog signal, as in the case of most current television broadcast signals, and CATV signals, then the signal 104 must be digitized and generally compressed (for example, by the MPEG-II standard) before storage on a digital storage medium such as shown in FIG. 26a.

FIG. 26b illustrates an embodiment using an analog storage device 106 such as a conventional VCR. If the television signal 104 is analog then the interface 910 takes the form of a conventional NTSC or PAL interface. If the television signal 104 is digital then the interface 910 takes a form as interface 902 shown in FIG. 26a and a digital-to-analog converter is required to convert the received signal to analog form before storage on storage device 106.

Figure 27:
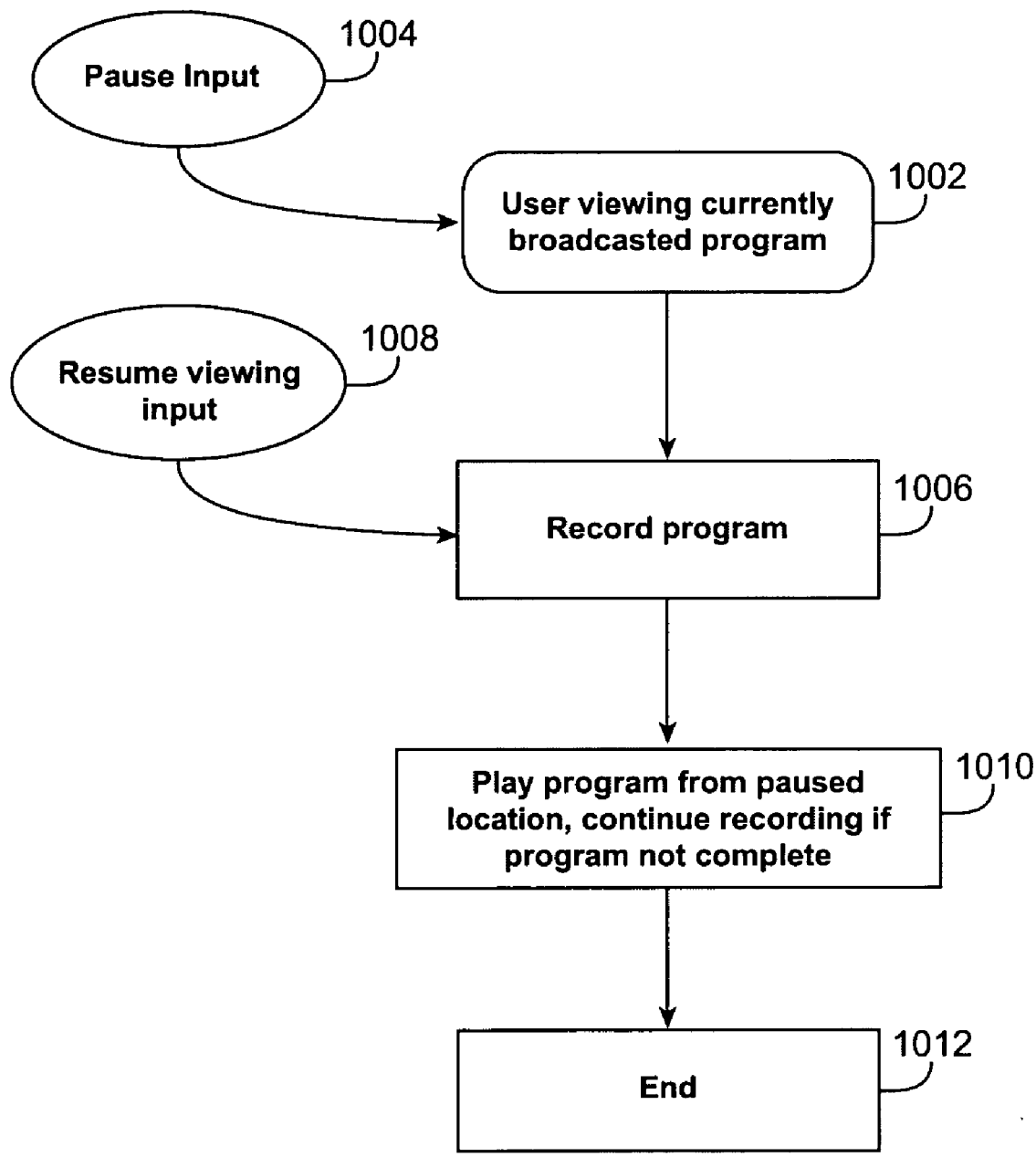
FIG. 27 is a flowchart illustrating additional aspects of operation of the television recording system of FIG. 1.

FIG. 27 illustrates operation of an automatic pause-record feature of preferred embodiments. If a user is watching a currently broadcast program and wishes to stop or temporarily pause viewing of the program, the recording system 100 advantageously allows the program to be recorded so the user can resume viewing the program at a subsequent time. As shown in FIG. 27, at 1002, the user is viewing a currently broadcast program. Generation of a pause input at 1004 by the user, such as by pressing of an appropriate button on a remote control coupled to the recording system 100, causes the system 100 to cause at 1006, recordation of the program being viewed by the user. The user is then free to watch another program or stop watching the television 108 altogether. At a subsequent point in time, if a resume viewing input is received, such as by pressing of an appropriate button on the aforementioned remote control, then at 1010, the recording system 100 causes the program recorded at step 1006 to be retrieved and shown on the television 108 from the point the recordation was initiated at step 1006. If the program is still being broadcast when step 1010 is initiated, then recordation of the program continues by the system 100. The user thus can easily interrupt viewing of a currently broadcast program and resume subsequent viewing.

Preferably the recording system 100 supports a variety of functions such as fast-forward, rewind and visual scan of stored programs, and other functions supported by the storage medium 106. For example, if the storage medium 106 takes the form of a VCR then the program viewing and manipulation functions will be limited to the standard VCR functions of fast-forward, rewind, forward or reverse visual scan. If the storage device 106 takes the form of a digital storage medium then more advanced program search and retrieval functions can be supported.

It will be appreciated that the functions performed by the preference agent 110 and the recording manager 112 are illustrative of a particular embodiment. However, the division of tasks between the two modules 110 and 112 may be changed. In addition, the data formats 115,116,105 and 107 may also take a variety of forms.

Figure 28:
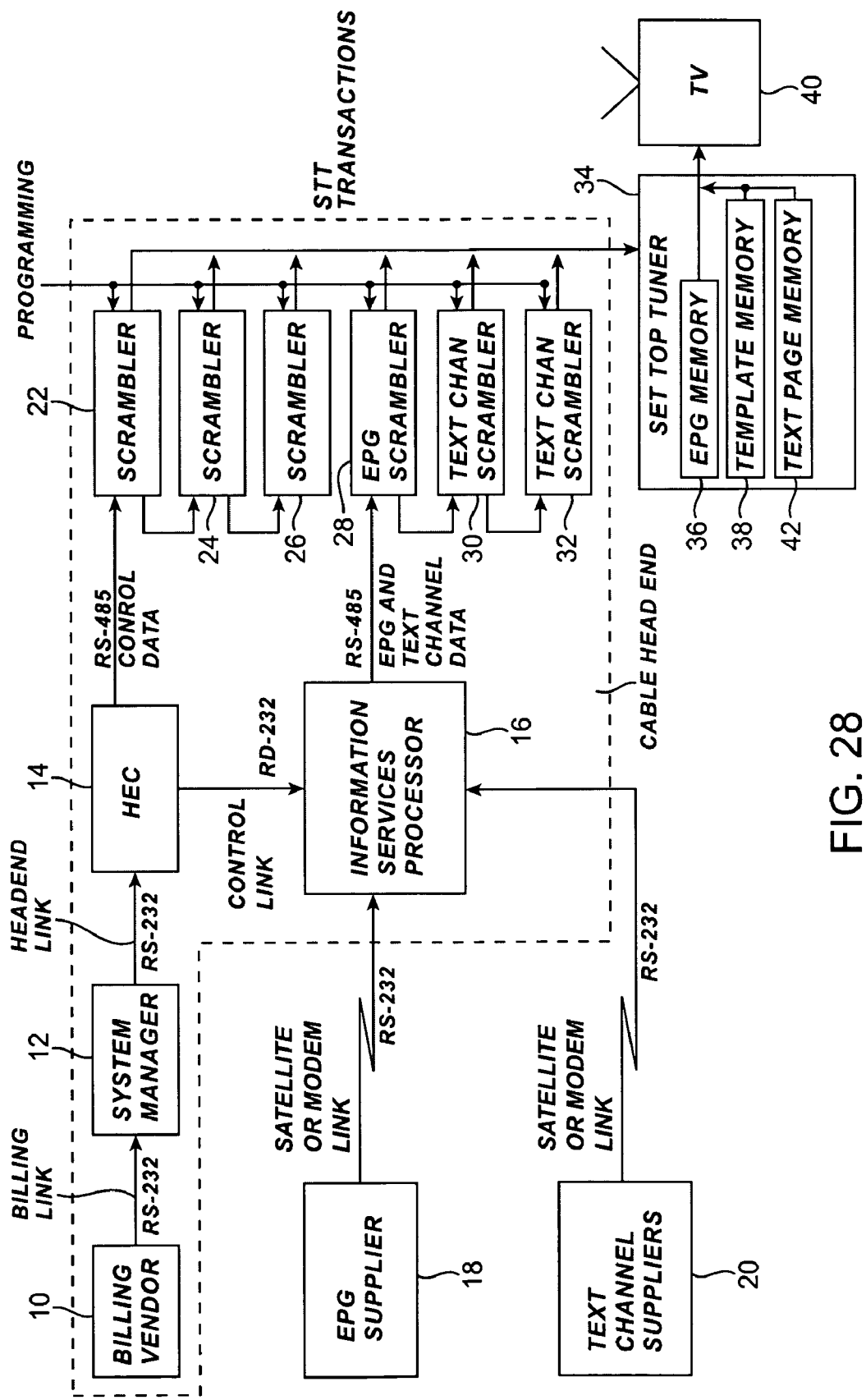
FIG. 28 is a block diagram of one embodiment of a system for providing EPG data and text data to a viewer.

FIG. 28 illustrates an EPG and text information service in accordance with one embodiment of the present invention. As shown, a local cable television company's billing vendor 10 communicates via a billing link to an RS-232 port of a system manager 12 located at a cable head end. Billing vendor 10 includes a subscriber database and generates a monthly bill for the subscribers in the system based on the level of service and any pay-per-view purchases. System manager 12 can be a personal computer or other processing device which receives viewer authorization transactions from billing vendor 10 and generates transactions for delivery to the distribution apparatus or the subscribers. Such transactions include text channel definition transactions which instruct the subscriber's set top box which group of channels it is entitled to receive, which frequency to tune for a particular text data channel, whether to mute the audio for that text channel, the pagination delay between pages, and the like.

System manager 12 also communicates via a head end link to an RS-232 port of a head end controller (HEC) 14 which controls the transmission of television programming to the subscribers. As will be described in more detail with respect to FIG. 29, HEC 14 communicates via a control link to an RS-232 port of an information services processor (or data controller) 16 which manages the flow of EPG and text data in accordance with the invention. As shown by dotted line in FIG. 28, information services processor (ISP) 16 is preferably located at the cable head end with system manager 12, HEC 14 and the signal scramblers. However, those skilled in the art will appreciate that all of the head end equipment need not be located at one site.

EPG data is supplied from one or more local or remote EPG suppliers 18 via a satellite link, modem link or other communication link to an RS-232 port of ISP 16. Similarly, text data from one or more text channel suppliers 20 is provided via a satellite link, modem link, or other communication link to another RS-232 port of ISP 16. In preferred embodiments, ISP 16 has a plurality of identical RS-232 ports for accepting data from a plurality of EPG suppliers 18 and text channel suppliers 20.

Also, as shown, one of these RS-232 ports can be used for a control link to HEC 14 as well. ISP 16 manages EPG and text source databases in response to control signals from HEC 14 in order to provide EPG data and/or text channel data to selected viewers.

HEC 14 also provides control data directly to the viewer's set top box via an RS-485 output port. Preferably, the control data from HEC 14 can include text channel definition transactions as well as EPG definition transactions for instructing the set top box at which frequency to tune for the EPG data and the like. The control data may also include software for downloading into the viewer's set top box for reprogramming the viewer's set top box as necessary. The control data from HEC 14 can be inserted into the vertical blanking interval of the selected cable television signal by daisy-chained scramblers 22, 24 and 26 using known in-band techniques, although the control data from HEC 14 may also be modulated on an out-of-band carrier or an in-band audio carrier for transmission as. Preferably, scramblers 22-26 are daisy-chained so that the scramblers may be addressed individually or globally.

Similarly, EPG data and text channel data from ISP 16 are provided to the viewer's television set top box via an RS-485 output port of ISP 16. EPG data and text channel data are similarly inserted into the vertical blanking intervals of selected cable television signals by EPG scrambler 28 and text channel scramblers 30 and 32, respectively. Scramblers 22-32 may insert the control data, EPG data, and text channel data into other portions of the video signals such as the horizontal blanking intervals or else replace the video entirely. Typically, the number of scramblers depends on the number of premium channels for which scrambling is used. Preferably, EPG scrambler 28 and text channel scramblers 30 and 32 are identical to control data scramblers 22-26 and are similarly daisy-chained for individual or global addressing. As shown in FIG. 28, scramblers 28-32 receive a single serial data channel which carries the combined EPG data and text data and display control transactions, as described in more detail with respect to FIG. 29) for all data streams in use. Each scrambler is also equipped with memory for storing a predetermined amount of this data in an internal memory so as to minimize the number of database accesses. Preferably, scramblers 28-32 have internal memory sufficient to store a significant number of transactions. For example, scrambler 30 may have enough internal memory to score a day's sports scores for display on a sports text channel. The data received and stored in scramblers 28-32 is preferably in RS-485 format, and the protocol in a preferred embodiment is SDLC. All data transactions to scramblers 28-32 are sent on individual data streams specifying the target scrambler (station addresses in SDLC protocol), and the control data is sent on a global data stream which is filtered in the scramblers 28-32 based on the address of the scrambler so that the data streams can be configured by a transaction from ISP 16. The individual EPG data and text data streams are preferably generic in the scramblers so that they can be allocated as desired. Preferably, scramblers 28-32 have baud rates of at least 9600.

Preferably, the subscriber's set top box is a set top box 34 which comprises an EPG memory 36 for storing the EPG data from ISP 16. For example, EPG memory 36 may store one or two weeks of EPG data for selective access by the viewer via a menu of the set top box 34. This menu preferably allows the viewer to scroll through the EPG data stored in EPG memory 36 using the key pads of the viewer's television remote control device. Set top box 34 may also comprise a nonvolatile template memory 38 for storing the template in which the EPG data is to be inserted for display to the viewer on the viewer's television 40. In this manner, a video signal containing the template display data need not be continuously retransmitted to the set top box 34, thereby saving more bandwidth. Instead, the EPG data only needs to be updated every 30 minutes or when there is a program change. Of course, different set top boxes 34 may have varied amounts of memory and processing capabilities for such purposes in accordance with the acceptable memory costs during manufacture of the set top box 34.

As shown in FIG. 28, set top box 34 may also comprise a text data memory 42 for storing a page of text data for presentation to the screen. Thus, while one page of text data is displayed to the subscriber, the next page of text data may be loaded into the text data memory 42.

ISP 16 manages the flow of text data and EPG data from the data service provider to the viewer's set top box 34. ISP 16 manages this data by accepting data only from one or more authorized text data and/or EPG data sources, processing the text data and EPG data in its internal database manager, and formatting the processed data into a common data transaction format for output to the scramblers for transmission to the set top box 34. Provision of EPG data and text data to the subscribers is controlled by the head end controller 14 via the control link.

One example of a suitable ISP 16 is an IBM PS model 7546 personal computer with a plurality of RS-232 serial input ports for EPG data and/or text data inputs and at least one RS-485 HDLC serial link at its output of the type used by HEC 14. As shown in FIG. 28, the control link can be a single RS-232 serial port. The hardware and software components of ISP 16 are then configured as illustrated in FIG. 29.

Figure 29:
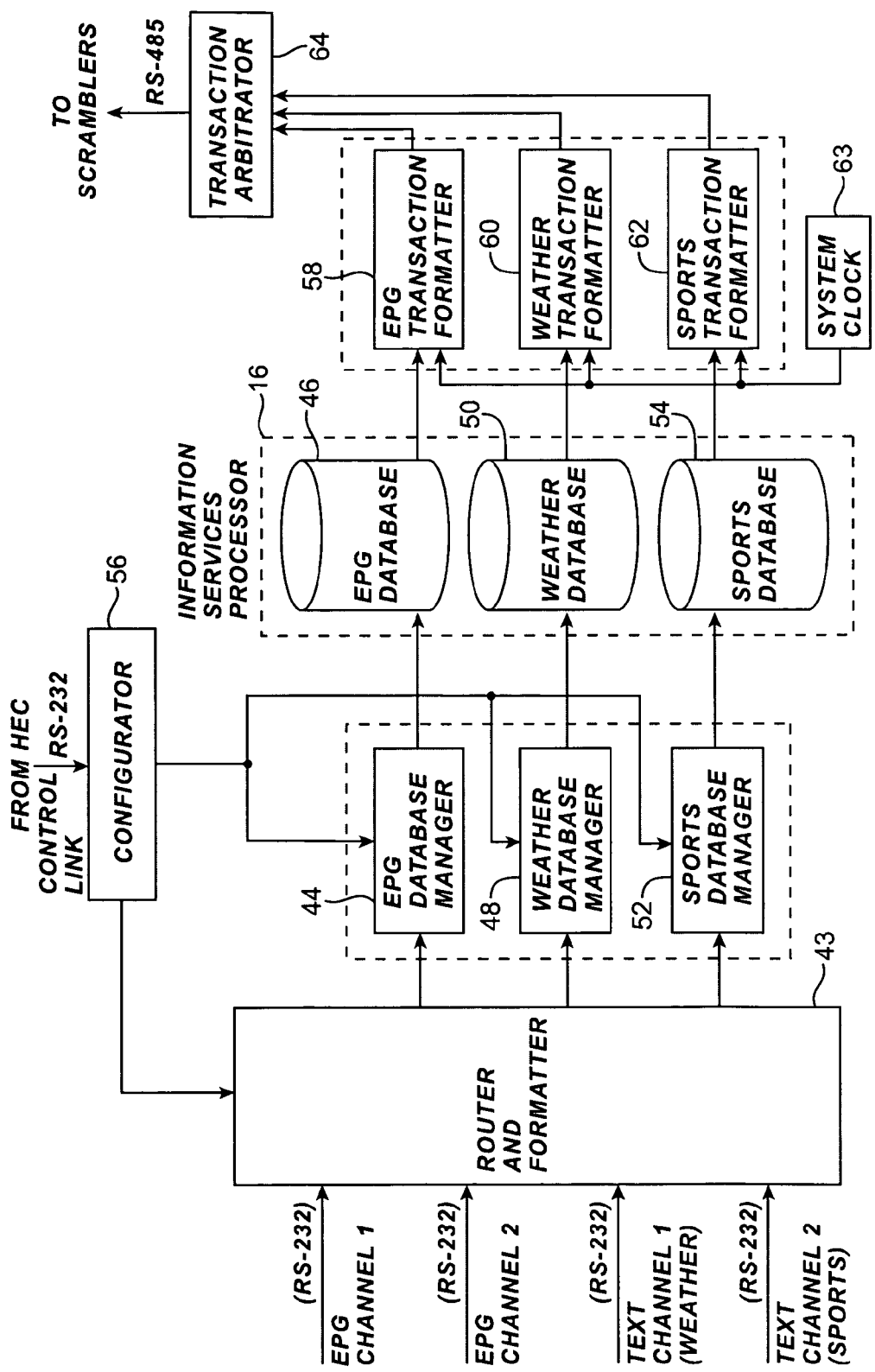
FIG. 29 is a block diagram that illustrates one embodiment of a data controller for receiving EPG data and text from data providers, formatting the data for display and inserting the data into a vertical blanking interval of a cable television channel.

One embodiment of ISP 16 is illustrated in FIG. 29 as a plurality of RS-232 ports which provide a common interface for the EPG data and text channel data asynchronously provided by the EPG supplier(s) 18 and text channel suppliers 20. The EPG data and text channel data is transmitted to ISP 16 via a satellite link (when the interface is operated in simplex mode) or by modem (when the interface is operated in half duplex mode). Preferably, the data is transmitted at a baud rate of at least 1200.

ISP 16 functions as a "gate keeper" which only allows access by authorized data sources. Accordingly, when ISP 16 receives a message from an EPG supplier 18 or a text channel supplier_0, it first checks the data for authorization. If that supplier is not authorized, the data is ignored. When the supplier is authorized to access ISP 16, ISP 16 performs the requested action and returns a command response message. If the communications link is simplex, the response is ignored. In this manner, access to ISP 16 can be limited by authorization codes, but as will be described below, access is also limited by whether the data provider provides EPG data or text data in the transmission protocol expected by ISP 16.

Messages sent between an EPG supplier 18 or a text channel supplier 20 and ISP 16 can be formatted to include a start of text byte, a data block of ASCII characters, checksum bytes and an ASCII carriage return. This format is used in commands sent to ISP 16 from the data suppliers as well as in responses sent to the data suppliers. The checksum can be a two byte CRC of all bytes in the message field beginning with the first character following the start of text character up to but not including the checksum field. The checksum is transmitted in the message as the hexadecimal ASCII representation (four bytes) of the CRC computation. The data blocks can be configured differently depending upon whether the input data is EPG data or text data.

EPG data from the EPG supplier 18 can be formatted in accordance with an EPG command set including, for example, a Define Program Command which is used to identify all data relating to a single program, a Define Category Command which is used to establish a category for identifying different types of programs, and a Delete Category Command which is used to delete an unused category to make room in the database of ISP 16 for new programming categories. The EPG data may be formatted on a per program basis by these commands.

Delimiter characters can be used for variable length fields such as the title and description blocks to identify the length of the field. For example, a NUL (0 hexadecimal) means the field is null, SOH (I hexadecimal) means the field is valid, and EIX (31 hexadecimal) means the end of the current record.

Once data transmitted with a Define Program Command is stored in an EPG database of ISP 16, the EPG data is formatted into transactions for transmission to the set top box 34. This command may also be used to update a program definition since it will overwrite a corresponding entry in the EPG database of ISP 16.

ISP 16 may respond to such commands from the EPG supplier 18 by sending an appropriate response such as: no error (normal response), service provider not found (not authorized), type of service not found (not authorized), category ID riot found, unrecognized command, checksum error, insufficient disk space, and the like. Other EPG commands and command responses may be provided as desired.

The text channel data can originate from many different text channel suppliers 20 and arrive at the ISP 16 through different communications links such as satellite, dial up modem, direct connect modem or with a direct connect to the system manager 12.

ISP 16 can include a plurality of databases and database managers. As shown in FIG. 29, there may be two types of databases maintained in ISP 16—one type for EPG data and one for text channel data. The EPG database is designed to collect data from each EPG supplier and to sort each EPG program record by channel and time of day. A separate database is created for each text channel for collecting text data from the associated text channel supplier 20 and formatting the received text data for transmission on individual text channels using the techniques to be described below. Each database that is created is identified by the service provider and type of service codes listed in the Define Program Command for use in the control link commands provided to ISP 16 from HEC 14.

As shown in FIG. 29, a received command is checked for its command code, the service provider, type of service and authorization code, as appropriate, by router and formatter 43. If the command is from an unauthorized data source, the subsequent data is ignored. However, if the received data is from an authorized supplier, router and formatter 43 routes the data to the appropriate database within ISP 16. For example, if EPG data is received, it is routed via EPG database manager 44 to EPG database 46.

In one embodiment, EPG database manager 44 sorts the received EPG data by channel and time of day and stores the received EPG data in the appropriate location in EPG database 46 for later recall. EPG database manager 44 may also perform garbage collection on the EPG database 46 as records are deleted. EPG database manager 44 may also call a data compression software routine such as the Huffman Compression Algorithm which, as known to those skilled in the art, maps more frequently used characters to fewer bits than the usual eight bits used in normal ASCII, while giving the less frequently used characters more bits. The number of bits used for a character is based on its probability of appearing in the data stream. Huffman encoding is described in detail in an article entitled "Lossless Data Compression", Byte, March, 1991, pp. 309-314, incorporated herein by reference. Such a routine is desired to maximize storage efficiency at EPG database 46. Similarly, each text database manager can store the text information in the associated text database and performs data compression.

Router and formatter 43 and database managers 44, 48 and 52 are all controlled by configurator 56, which is, in turn, responsive to control data from HEC 14. Configurator 56 responds to control commands from HEC 14 to provide updated authorization information to router and formatter 43 for comparison with the incoming data and for adding/subtracting database managers and databases and the like as EPG suppliers 18 and text channel suppliers 20 are added and subtracted from the system.

Access to ISP 16 is can be carefully controlled through the use of authorization codes. In addition, ISP 16 can maintain control over the information services provided to the viewer by storing the EPG data and text data in a particular format in the appropriate database within ISP 16.

Figures 30, 31:
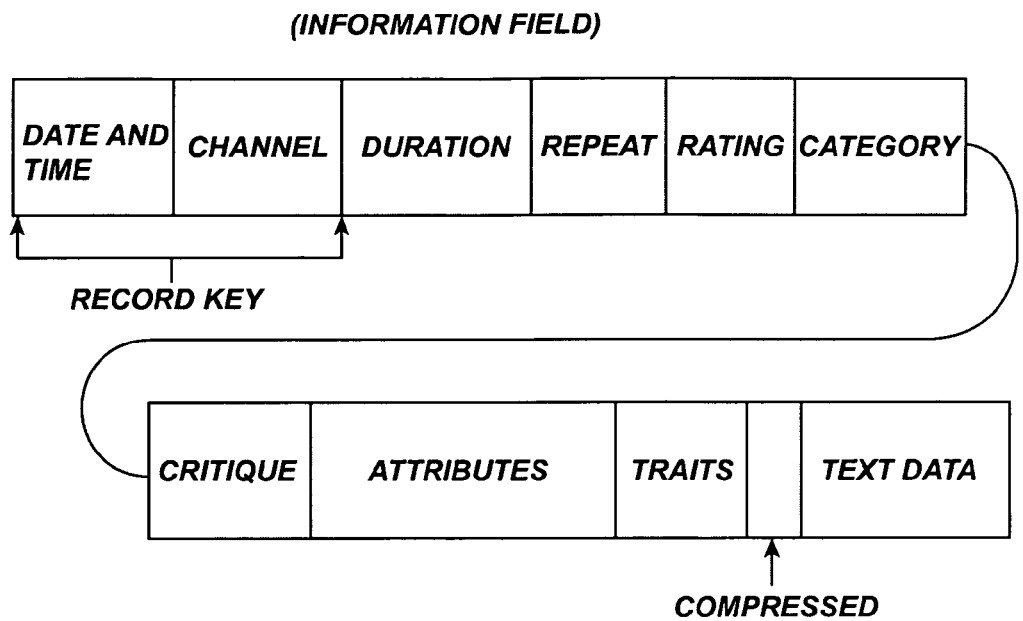
FIG. 30 illustrates one embodiment of an information field of the EPG data read from the EPG database of FIG. 29.
FIG. 31 illustrates a data format of data read from the database for insertion into an assigned cable television channel.

Referring now to FIG. 30, the EPG database key can be a combination of the date and time field and the channel number from the EPG data. Following these fields are the duration field, the repeat field, the program rating field, the program category field, the critique field, the attributes flag field, the program traits flag field, the text data compressed flag and lastly the text data. The text data field may further consist of several optional subfields with a delimiter between each field.

EPG database manager 44 can access the EPG database 46 through shared library routines such as add a record, delete a record, read a record, and the like. As the EPG database 46 is used it can be fragmented as records are added and deleted, and as a result, EPG database manager 44 may further include garbage collection routines for periodically performing the garbage collection function on the EPG database 46. The text databases are similarly configured except that garbage collection is not necessary.

In one embodiment, EPG transaction formatter 58 reads the database records of EPG database 46 and formats them to program-based transactions having a predetermined number of bytes which are transmitted to the EPG scrambler 28 for insertion into the vertical blanking interval of a video signal and transmission to the set top box 34. These transactions are then sent via a transaction arbitrator 64 to the EPG scrambler 28 shown in FIG. 28 for insertion into the appropriate video channel.

The transactions from transaction arbitrator 64 can be output to a single RS-485 output port of ISP 16 which is connected to multiple scramblers of the type used to scramble premium cable channels. The transactions are segmented into EPG data and text data streams for transmission to the EPG scrambler 28 (if the transaction includes EPG data) or to the text channel scramblers 30 and 32 (if the transaction includes text data).

In one embodiment, the EPG transactions generated by EPG a transaction formatter 58 are formatted into SDLC frames as noted above. A sample SDLC format for the EPG transaction data is shown in FIG. 31. In FIG. 31, the beginning flag delineates the beginning of the SDLC frame, the station address delineates the scrambler to be addressed, the control byte is a command code that defines what is to be processed, the information field contains the EPG data formatted as in FIG. 30, the frame check contains the CRC for all data between the beginning and ending flags, and the ending flag delineates the end of the SDLC frame. A transmission from EPG transaction formatter 58 will address a specific data stream and a response from the EPG scrambler 28 will identify its data stream in the station address location. As noted above, such transmissions may or may not require a response from the EPG scrambler 28.

The EPG transactions typically include an Add EPG Block command including a byte specifying that the following data is from the EPG data stream, a control code byte specifying, for example, whether a reply from the scrambler is expected, two bytes setting forth the EPG data block number, a flag setting forth whether the EPG data is Short Term or Long Term data, the number of transactions which make up the EPG data block, and the actual transactions. EPG transaction formatter 58 may also generate a Delete EPG Block command which specifies that the data is to be deleted from the EPG data stream, the control code byte, and the EPG block number to be deleted.

Figure 32:
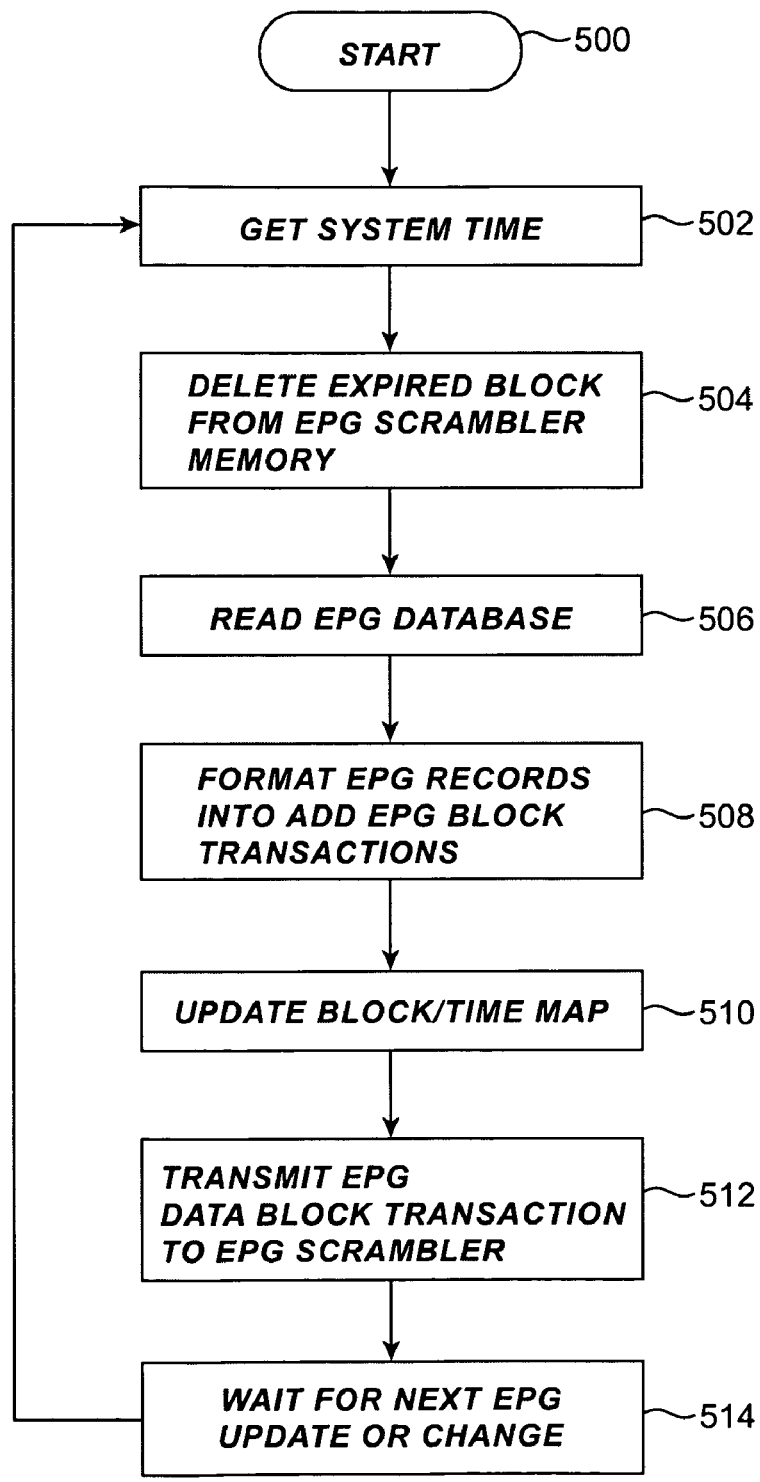
FIG. 32 is a flow chart illustrating the operation of the EPG transaction formatter of FIG. 29.

FIG. 32 illustrates a flow chart for one embodiment of software that can be used and embodied in EPG transaction formatter 58. As shown, the software starts at step 500 and gets the system time and date from the ISP system clock 63 at step 502. An expired EPG data block is then deleted from the memory of the EPG scrambler 28 at step 504. An expired EPG data block is defined as a data block representing a program which has been completely aired prior to the current system time or a program which was aired before the time window used for the EPG. At step 506, current EPG data blocks having a time and date within the EPG time window are read from the EPG database 46. The current EPG data blocks are then formatted into Add EPG Block commands and associated transactions at step 508. A block/time map of EPG transaction formatter 58 is then updated at step 510. The block/time map preferably stores the time that each EPG data block was sent to EPG scrambler 28. The transactions representing the EPG data are then transmitted the EPG scrambler 28 at step 512. EPG transaction formatter 58 then waits at step 514 for the next EPG update (which should occur when the system time enters a new half hour) or the next EPG change (which may occur at any time). Upon receipt of such an update or change, control returns to step 502. Text transaction formatters 60 and 62 similarly generate text transactions for the text data, which as noted above, is defined on a per screen (rather than per program) basis. Hence, an Add Text Screen command is similar to an Add EPG Block command except that the text channel number and screen number are provided in place of the EPG block number and Short Tern/Long Term data bytes. The text transaction formatters 60 and 62 may also request the time from the scrambler so that proper pagination may be maintained.

Figure 33:
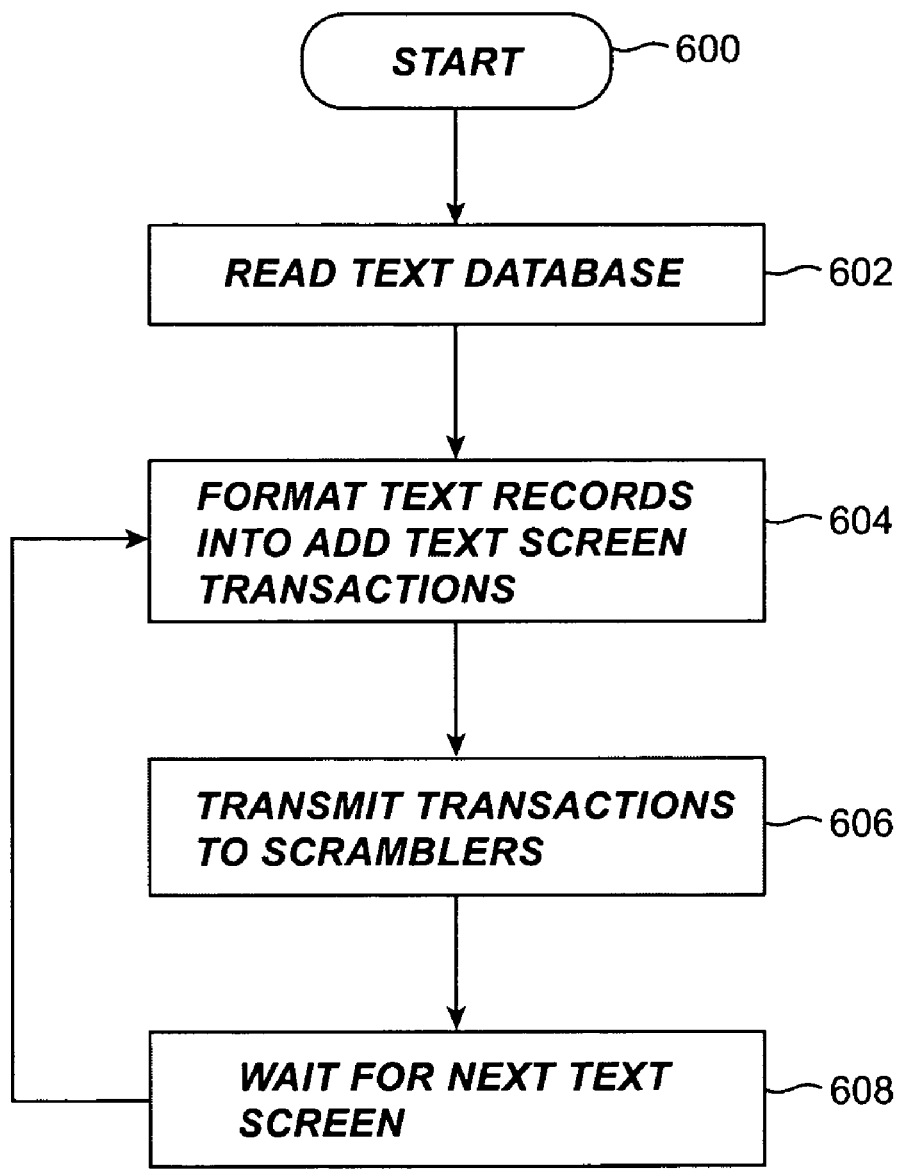
FIG. 33 is a flow chart illustrating one embodiment of the operation of the text transaction formatters of FIG. 29.

FIG. 33 illustrates a flow chart for one embodiment of software that can be used and embodied in text channel transaction formatters 60, 62. As shown, the software starts at step 600 and reads a text screen record from the text database 50 or 54 at step 602. At step 604, the text screen is formatted into Add Text Screen transactions for transmission to the text channel scramblers 30, 32 at step 606. Preferably, such transactions are formatted such that the display characters are sent as display commands rather than as separate characters for every display coordinate of the text display screen. Then, at step 608, text transaction formatter 60, 62 waits a period of time specified by system manager 12 (if auto-pagination is used) before the next text page is formatted and transmitted to the text channel scramblers 30, 32. At the end of this period of time, control returns to step 604 and the next text screen record in the text database 50, 54 is formatted for transmission to text scramblers 30, 32 for insertion in the vertical blanking interval of a particular video signal.

Text data can be passed to the screen by sending a separate character for each display location of a page. In other words, if a text screen comprises 16 lines and 4 characters per line, a text screen is represented by sending 384 (24X16) characters, one for each display location for that display screen. A blank space character is sent to indicate that no character is present in a particular text screen location.

In one embodiment, the text data is transmitted to the screen along with appropriate commands for controlling the display of the text data. For example, a first display command in a sequence identifies the following data as text data and instructs the set top box 34 to fill the television screen with a blue background or some other background or template over which the text will be displayed. The text data is then converted into a series of commands which together identify the separate screens of text. As noted above, the text data is grouped on a per screen basis, which allows the appropriate delay mechanism to be incorporated into the display commands to provide the necessary delay between the presentation of respective text screens.

For this purpose, transaction formatters; 60 and 62 can include software for scanning the text data for actual characters, skipping extra spaces in the text data, and grouping the actual text for transmission in transactions of a designated size which will fit in the vertical blanking interval of a field of a video signal. Since spaces are eliminated, the display commands include a coordinate specifying the row and column address of the first display character on the screen and a number of contiguous characters follow that character in the same transaction until the transaction is filled or a number of successive spaces are encountered.

Attribute information such as underline, blinking, or luminance inversion associated with the characters may also be transmitted using these display commands. These display commands are used to read the text data for a text screen from the appropriate database, and at the end of the text data for a text screen, a display command is transmitted to indicate that all data for that text screen has been transmitted. The transaction formatter 60, 62 also includes a wait loop or "timeout" command at the end of the transmission which builds in a delay (on the order of 7 seconds) which gives the viewer sufficient time to view a text screen before the text data for the next text screen is displayed, thereby providing auto-pagination of the text screen.

Auto-pagination permits the viewer to automatically advance from one text screen to the next without any intervention by the viewer. In accordance with the auto-pagination scheme of the invention, the cable operator can specify the time duration between screens and forward this information to the transaction formatters; 60, 62. Then, during operation when the viewer selects a text channel, the current page of text data is displayed by extracting the selected text channel data from the vertical blanking interval of the video signal in which it is inserted and mapping that text data to a channel of the viewer's television which is designated for display of that text channel. The next screen of text data will be displayed after a predetermined delay which gives the viewer sufficient time to read the displayed text data for the current screen (approximately 7 seconds). This technique could replace the commonly used "barker" channel which uses a computer to generate text data which is then transmitted as a complete video channel over the cable television system.

Configurator 56 can respond to control commands from HEC 14 to provide updated authorization information to router and formatter 43 for comparison with the incoming data and to add/subtract database managers and databases and the like as EPG suppliers 18 and text channel suppliers 20 are added and subtracted 57 from the system. The control link between HEC 14 and configurator 56 can be used to report the status of the ISP 16 to system manager 12. Additionally, the control link may accept text data from system manager 12 for displaying system messages and the like.

In one embodiment, the interface between configurator 56 and HEC 14 is an RS-232 port with a data format fixed at, for example, 9600 baud. All control data is preferably transmitted as ASCII characters. Upon receipt of a message from HEC 14, configurator 56 checks the data, performs the requested action and returns a command response message in a message format of the type described above for communications between router and formatter 43 and the EPG and text channel suppliers. Sample commands sent from HEC 14 to configurator 56 over the control link include a Set Date and Time command (for synchronization purposes), Request Configuration commands, Request Status commands, Get Category Record commands, Scrambler Control commands, and Database Control commands.

In one embodiment, during operation, ISP 16 monitors all input ports data from the EPG and text data service providers and builds a list of all available EPG and text data services. This list is sent to the system manager 12 using a Request Configuration command. This command specifies the available service providers, the type of service (EPG or text data) from each provider, the communications port associated with each service, the scrambler address or data stream (EPG or text data) for each service, the authorization code from the supplier for each service, the time and date of the last update from the service provider, the time and date of the last update to the scramblers, the time and date of the latest EPG data in the EPG database, and the like. Such information is provided to the system manager 12 for each service provider when this command is given.

The Request Status command can contain flags indicating whether there are errors present in the error log and if the category list has changed since the last Request Status command was received. Get Error Record and Get Category Record commands may then be used to extract the error and category information.

In one embodiment, configuration commands are separated into EPG and text service configuration commands. A Configure EPG Service command specifies the service provider, the type of service, whether the service is to be enabled or disabled, the authorization code from the EPG supplier 18, the scrambler data stream for Short Term data, the scrambler data stream for Long Term data, the length of the Short Term data in hours (1-255), and the length of the Long Term data in hours (1-4096). The Configure Text Service command specifies the service provider, the type of service (weather, sports, and the like), whether this service is to be enabled or disabled, the authorization code from the text channel supplier 20, the scrambler address or data stream for the text data, the channel number, and the pagination delay time in seconds) before the next page of text data is to replace the current page of text data on the screen for auto-pagination.

The scrambler control commands can include, for example, a Rebuild Scrambler Memory command which is used when a scrambler replaced and needs data to be reloaded in its memory and a Scrambler Configuration command for specifying the amount of scrambler memory in kilobytes.

In one embodiment, the database control commands include, for example, a Clear Database command which is used to clear the database associated with a particular service and a Delete Database command which is used to delete the database associated with a particular service. Other database control commands such as a Download Category Map command may also be provided for establishing a list of the specified categories of program data in the EPG data.

Figure 34:
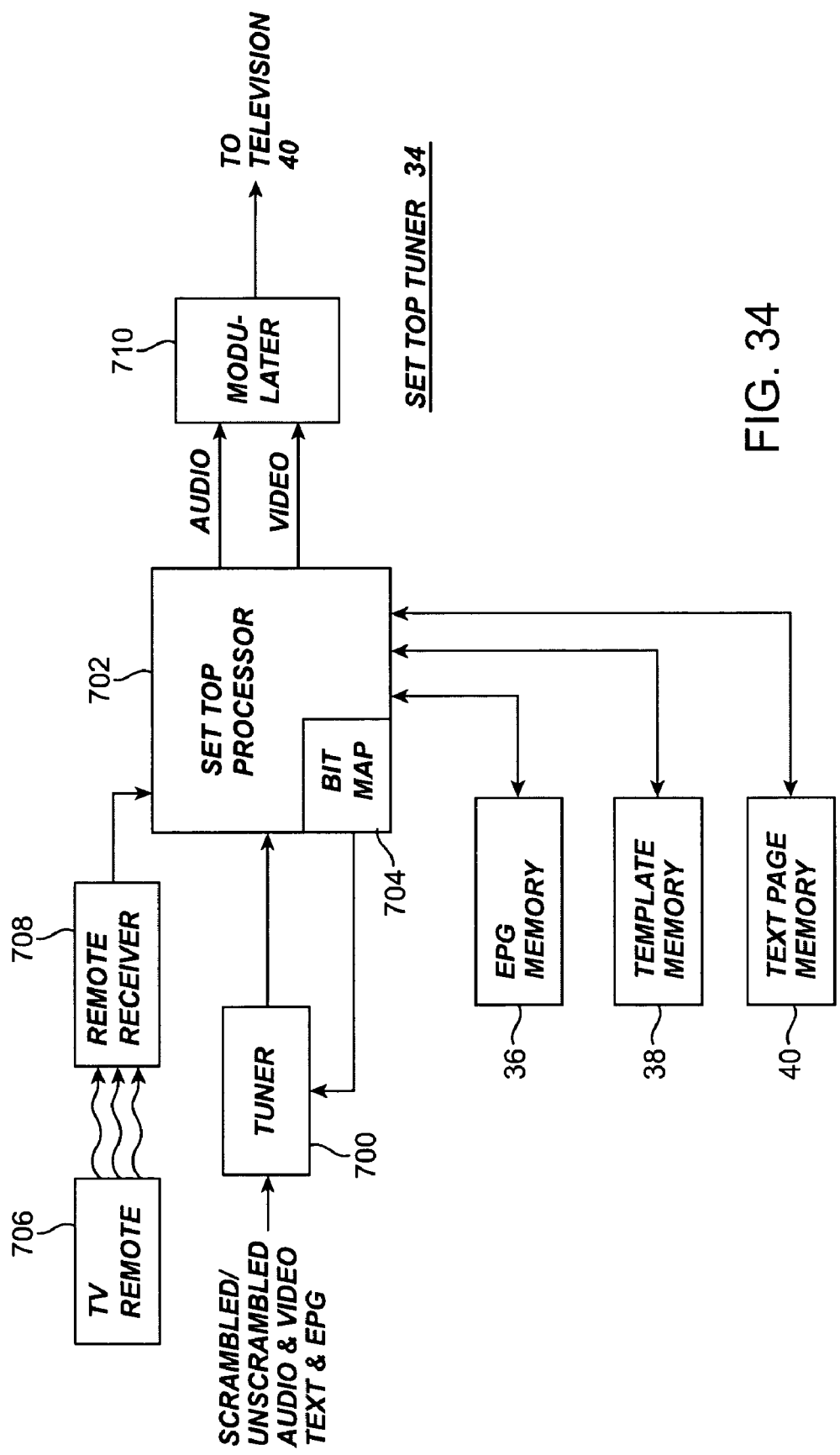
FIG. 34 illustrates one embodiment of a set top box for use in receiving text data and EPG data.

FIG. 34 illustrates one embodiment of a set top box 34 that can be used with the present invention. As shown, set top box 34 includes EPG memory 36, template memory 38, text page memory 42, a set top box 700, and a set top processor 702 which reads commands from the vertical blanking interval of the incoming video signal and performs the appropriate action. For example, if the incoming command is a text channel definition or EPG definition command from HEC 14, the appropriate update of bit map 704 is performed. Similarly, if the incoming command is a display command including EPG data, that data is stored in EPG memory 36 and is displayed with the template stored in template memory 38 when the user makes a menu selection via television remote control unit 706 and remote receiver 708 requesting display of the EPG data. The template data may be sent as part of EPG display commands if no template memory is provided. On the other hand, if the incoming command is a display command including text data, a page of that data is stored in text page memory 42 for presentation to the display a page at a time. The text page memory can be automatically updated every few seconds by virtue of the delay built into the display commands from the text formatters 60, 62 if auto-pagination is enabled. Alternatively, the user can be allowed to manually access the text data in the memory. If manual access is provided, it is preferred that the text page memory hold at least the currently displayed text page, the previous text page and the subsequent text page in order to give the user the ability to scroll through the text data In either case, set top processor 702 preferably has the ability to request the next text page while the current page is being displayed so that the next text page is already loaded for display at the end of the screen delay time. The selected text, EPG or video signal is then modulated at modulator 710 for display on television screen 40 at the channel specified in bit map 704.

Figure 42:
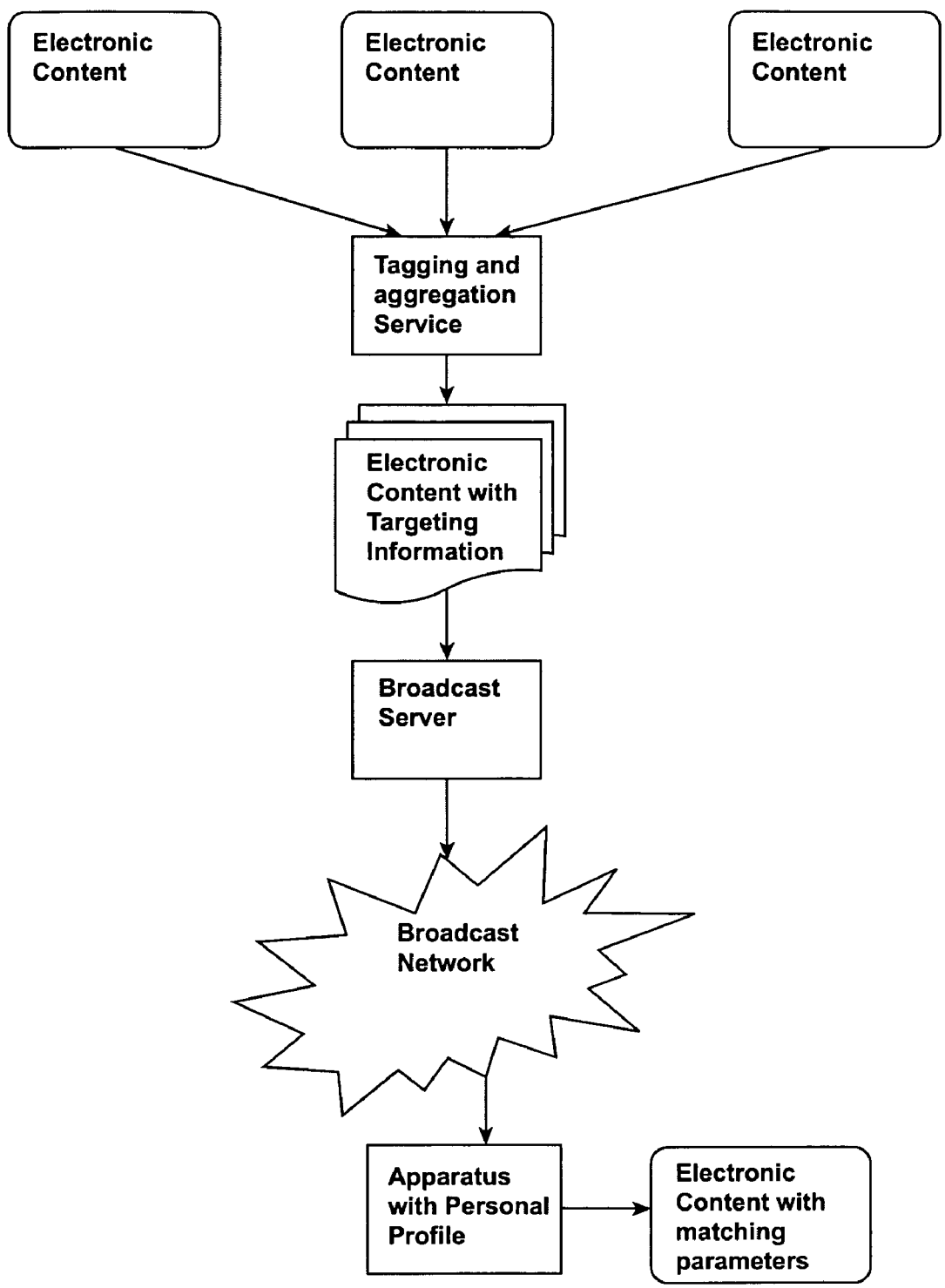
FIG. 42 illustrates a method for distributing targeted electronic content without compromising the privacy of users.

Bit map 704 of set top processor 702 of the set top box 34 maps the received text information to the designated cable channel for display by designating the frequency that must be tuned by box 700 to receive the desired text data. This information is received in the aforementioned text channel definition transactions from HEC 14. For example, the viewer may specify via television remote 706 that she wishes to view a sports text data channel which her program guide indicates to be available by tuning the set top box 34 to channel 181. Set top processor 702 then checks bit map 704 for channel 181 to determine that it must tune the frequency for channel 29 in order to extract the sports text data for the viewer's channel 181 from the vertical blanking interval of channel 29, set top processor 702 ten sets set top box 100 to tune channel 29 but the video signal for channel 29 is not displayed. Instead, the video screen is blanked by set top processor 702 and the text data extracted from the vertical blanking interval by set top processor 702 is displayed. Any necessary descrambling of the received video is performed by set top processor 702. The viewer thus perceives that many more "virtual" channels are available even though a separate video channel was not used to transmit the text data In one embodiment of the present invention, illustrated in FIG. 42, electronic content is tagged and aggregated at a server and becomes electronic content with targeted information. Suitable electronic content includes but is not limited to, advertising, news segments, video programs, audio programs, WEB pages, and the like. The electronic content with targeted information is send to a broadcast server and broadcast widely. Set top box 34 has created profiles representing different people in the household. Set top box 34 matches the tags in the broadcast stream with the profiles created and determines which of the tagged content should be downloaded. A subset of all of the content that is broadcast that are relevant to the personalities in the household are downloaded and displayed to the user.

For example, set top box 34 can be used to match the tags in the broadcast stream with a demographic profile of a viewer previously created and determine which of the tagged content should be downloaded. An individual viewer receives from set top box 34 only.* Set top box 34 matches the tags in the broadcast stream with the demographic profile of the viewer created and determines which of the tagged content should be downloaded.

Some example of demographic characteristics include, but are not limited to, a user's gender, race, age and income. The output of the analysis of viewing habits of the representative sample provides a basis for determining demographic characteristics of the individual user.

As shown, set top box 34 reads commands of the incoming tagged and aggregated electronic content and performs the appropriate action. For example, if the incoming command is a text channel definition or EPG definition command from HEC 14, the appropriate update of bit map 704 is performed. Similarly, if the incoming command is a display command including EPG data, that data is stored in EPG memory 36 and is displayed with the template stored in template memory 38 when the user makes a menu selection via television remote control unit 706 and remote receiver 708 requesting display of the EPG data. The template data may be sent as part of EPG display commands if no template memory is provided. If the incoming command is a display command including text data, a page of that data is stored in text page memory 42 for presentation to the display a page at a time. The text page memory can be automatically updated every few seconds by virtue of the delay built into the display commands from the text formatters 60, 62 if auto-pagination is enabled. Alternatively, the user can be allowed to manually access the text data in the memory. If manual access is provided, it is preferred that the text page memory hold at least the currently displayed text page, the previous text page and the subsequent text page in order to give the user the ability to scroll through the text data. In either case, set top processor 702 preferably has the ability to request the next text page while the current page is being displayed so that the next text page is already loaded for display at the end of the screen delay time. The tagged and aggregated electronic content is then modulated at modulator 710 for display on television screen 40 at the channel specified in bit map 704.

Bit map 704 of set top box 34 maps the received tagged and aggregated electronic content to a designated cable channel for display. Set top processor 702 then checks bit map 704 for channel 18 1 to determine that it must tune the frequency for channel 29 in order to extract the. Any necessary descrambling of the received tagged and aggregated electronic content is performed by set top processor 702.

Figure 35:
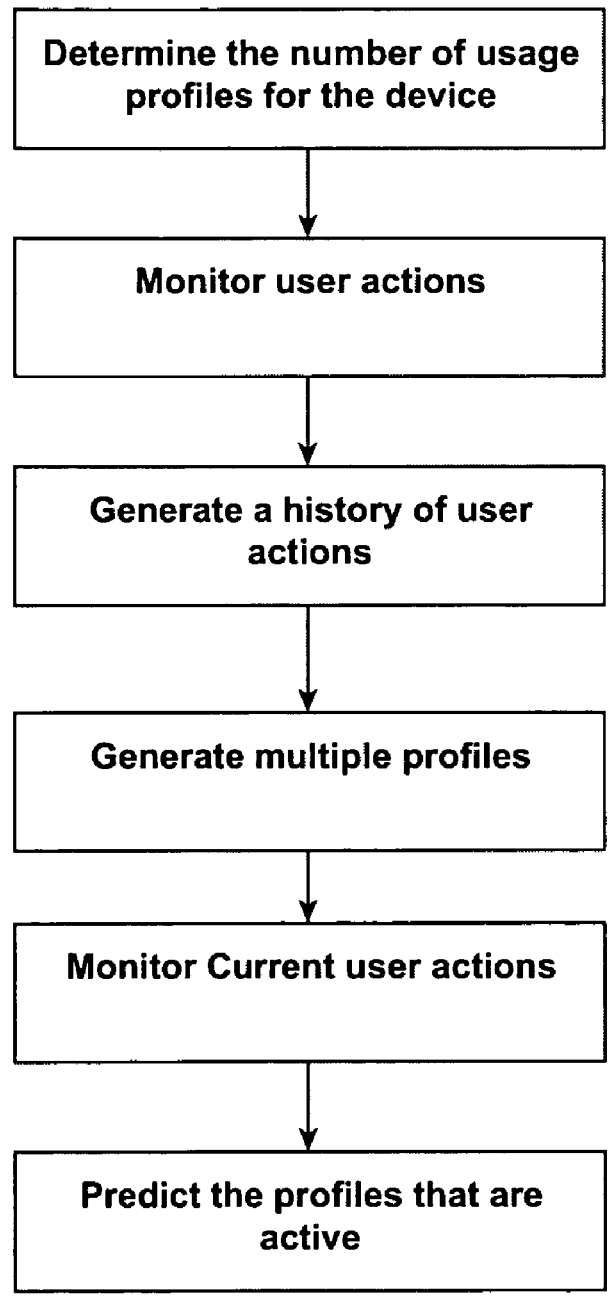

The present invention also provides a mechanism to automatically create multiple profiles corresponding to multiple users with or without any information being explicitly providing by the users about themselves. FIG. 35 shows an embodiment of the invention that causes the automatic creation of multiple profiles and automatic identification of profiles when they are active on the device.

In one embodiment, number of profiles to be created is initially determined. Several methods may be used to determine the number of profiles. In one embodiment of the current invention the number of profiles is optimally determined by applying the Minimum Message Length (MML) criterion. The process of applying MML criterion for determining the optimal number of clusters in described in reference (ref.). In one embodiment of the current invention, a user of the device explicitly specifies; the number of profiles to be created.

The system monitors user interactions with the device. The user interactions may include but are not limited to channel change requests, requests to view more information, configuration of device parameters, requests to performs recording or deletion of programs from a storage device. All actions due to user interactions are recorded in a history database that stores history of viewer actions. Data records in the history database describing viewer action can be of different formats. FIG. 37a shows one of the possible formats for the data record. Data records may contain information about the action, time at which the action occurred, and some parameters that further describes the action. In one embodiment of the invention, only actions matching certain criteria are recorded in the history database. For example, all user action about watching channels can be ignored if the duration of watching is less than a configurable threshold, or all user action about watching a particular channel like preview channel can be ignored. In the default usage of the device, the user will not be identifying himself or herself during each usage session. A usage session in this context can be the period during which there are user activities between two periods of inactivity, or the period during which the device is used between two periods during which the device is not in use. It will be left to the device to determine who the actual user is, in order to provide a very personalized environment to the user. In such a scenario the user action records will not contain any information about who the user is. In one embodiment of the current invention, the user can identify himself or herself explicitly for all or some of the usage sessions by using some mechanism provided by the system. These mechanisms may include pressing a sequence of keys, or choosing a user name from a menu and logging-in as that user. In this embodiment of the invention the user can identify himself or herself during certain sessions and may choose not to identify himself or herself during some other sessions. In the case where the user identifies himself or herself certain user action records can have the user name or some other identification data as a parameter which specifies that a user was togged-in for the session from which the user action record was generated.

Figure 36:
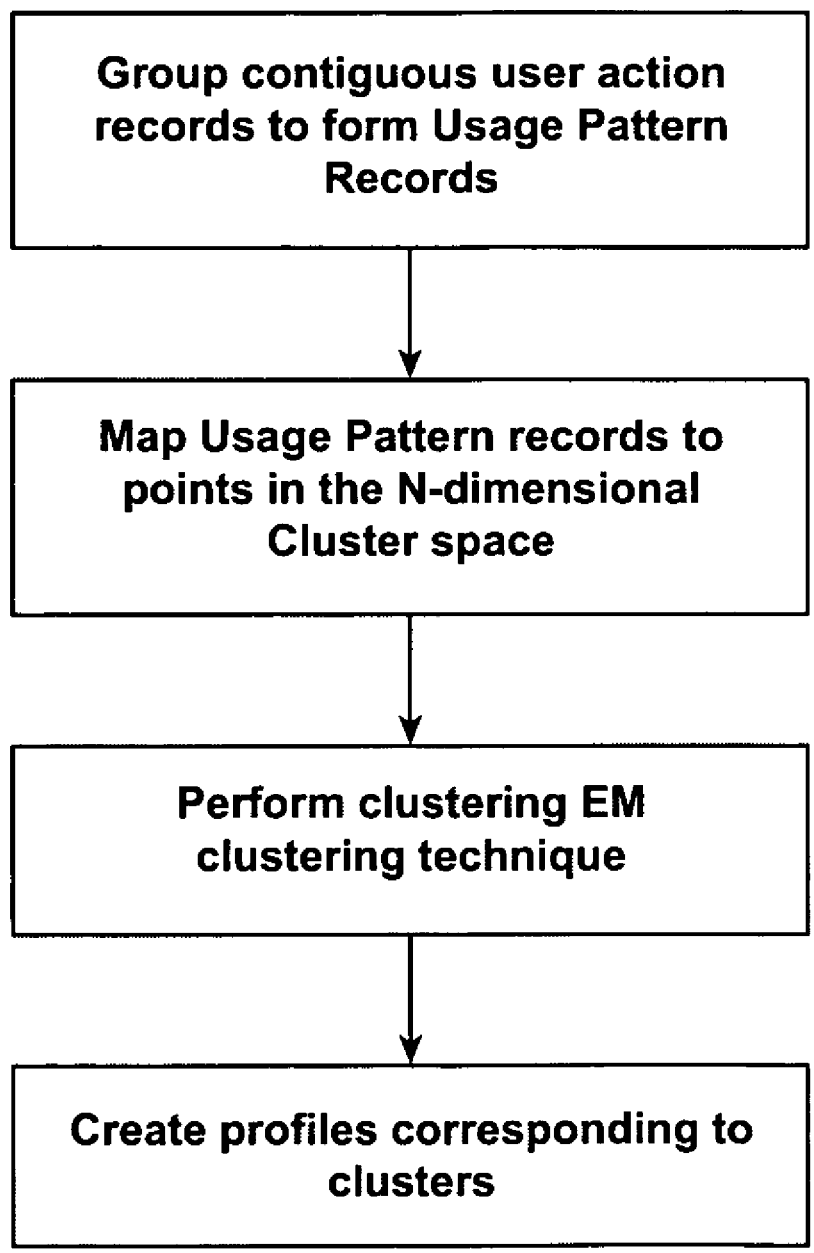

By analyzing the user action history database that was generated for a period of time, the current invention provides a mechanism to create multiple profiles automatically. Each of these profiles may correspond to the entire preference of a single user, a group of related preferences of a single user, a group of related preferences of a group of users or the entire set preferences of a group of users. The mechanism for creating multiple profiles is described in FIG. 36.

Sets of consecutive user action records are grouped together to form usage pattern records. Usage pattern records can be in the form of arrays of user action records. Only user actions that occur contiguously are grouped together in a single usage pattern record. The usage pattern records can be formed using many methods, some of which are:

1. Grouping together all user action records that are in a single usage session into a single usage pattern records. This is represented graphically in FIG. 38a.

2. Grouping together all user action records that are in a single usage session into a one or more usage pattern records where each usage pattern record has a predetermined number of user action records. This is represented graphically in FIG. 38b.

Figure 39:
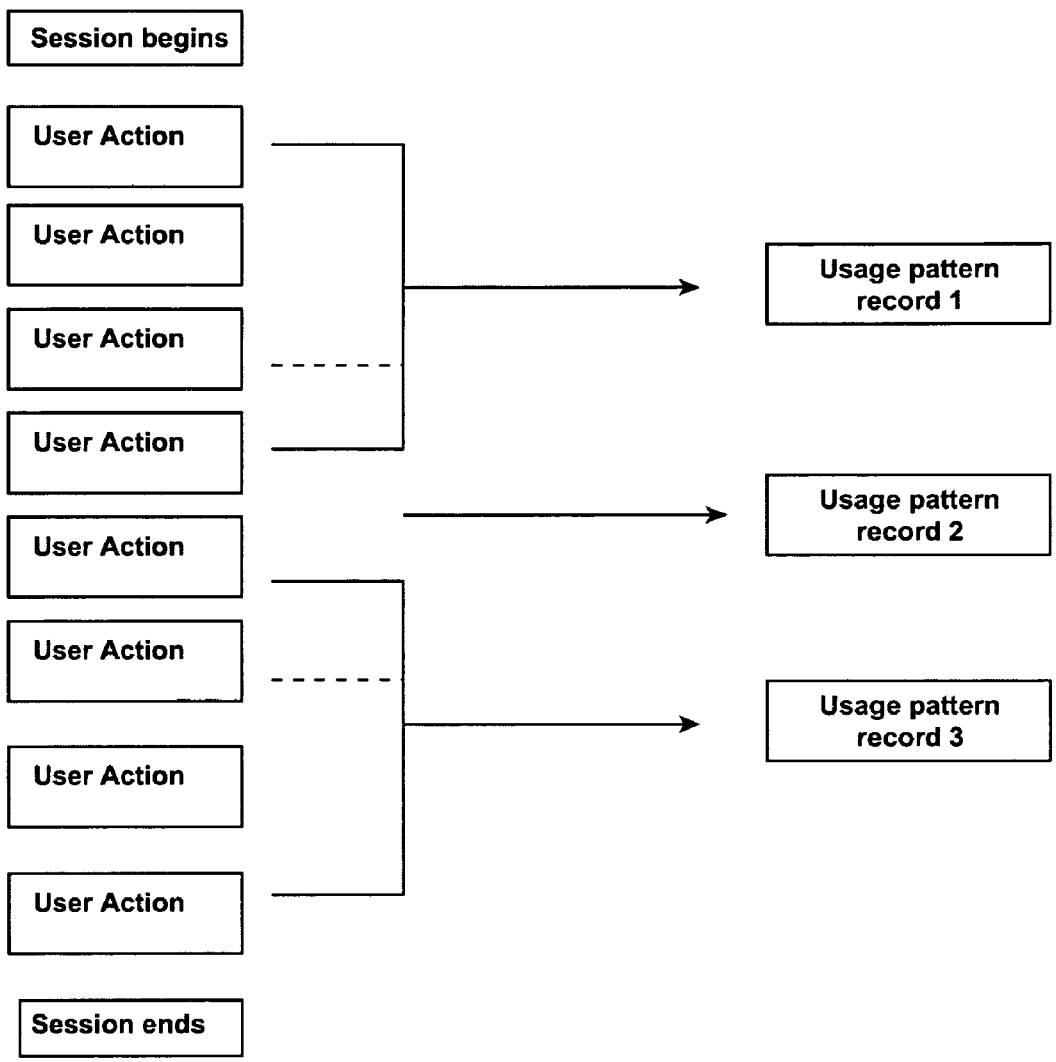

3. Grouping together a predetermined number of consecutive user action records in a usage session into one or more usage pattern records where each usage pattern record has a number of user action records which overlap with some of the user action records in an adjacent usage pattern record. This is represented graphically in FIG. 39.

Each usage pattern record is mapped to a point in an N-dimensional space, each axis of this N-dimensional space representing a parameter that is of significance in identifying multiple profiles. The N-dimensions for this space are called cluster-dimensions. The parameters for this N-dimensional space are chosen either manually by people skilled at identifying the most significant parameters in identifying multiple profiles, or automatically by identifying the aspects of profiles that differs significantly between profiles. In one embodiment of the current invention a set of these parameters are identified and configured as the apparatus is configured during initialization, and a new set is added periodically by looking at aspects which differ in the multiple profiles that are stored in a device. A wide variety of combinations of initial parameters may be used. In one embodiment these initial parameters are the channel names in a channel line up and viewing times. In the embodiment, these initial parameters are possible values of program description fields of television programs. In one embodiment the rate of channel change is also one of the parameters. The mapping of the usage pattern record to a point in the space defined by cluster-dimensions can be done by many methods. One method determines the quantity of a particular characteristic which is defined by a clustering parameter, exhibited in a usage pattern record, e.g. number of channel changes in a usage pattern, and uses this as the value of the axis for the corresponding dimension. One method determines the rate of consumption of a particular characteristics in a usage pattern record, e.g. rate of consumption for "NBC" in a usage pattern record is 0.5 which indicates that programs on "NBC" were watched 50% of times during the period of this usage pattern record.

All the points in the space defined by cluster dimension are clustered into a number of clusters using standard clustering algorithms. Any clustering algorithm can be used to perform the clustering. In one embodiment EM clustering is applied to group the points in the cluster-dimension space into a predetermined number of clusters. The number of profiles being created decides the number of clusters formed. Anyone skilled in the art of artificial intelligence and clustering, especially EM clustering, will be familiar with these clustering techniques. Each cluster formed as a resulting of the clustering represents a single profile. The clustering process also provides the mixture weights for each of the clusters as one of the outputs. The mixture weight for a cluster can be used to compute the percentage of time the profile was active, of the total amount of time for which the device was used.

In one embodiment of the present invention, the clustering is performed periodically using the user actions records accumulated in the history database. In one embodiment, user action records are periodically removed from the history database based on certain criteria such as the age of the record, size of the record, relevancy of the record etc.

Figure 40:
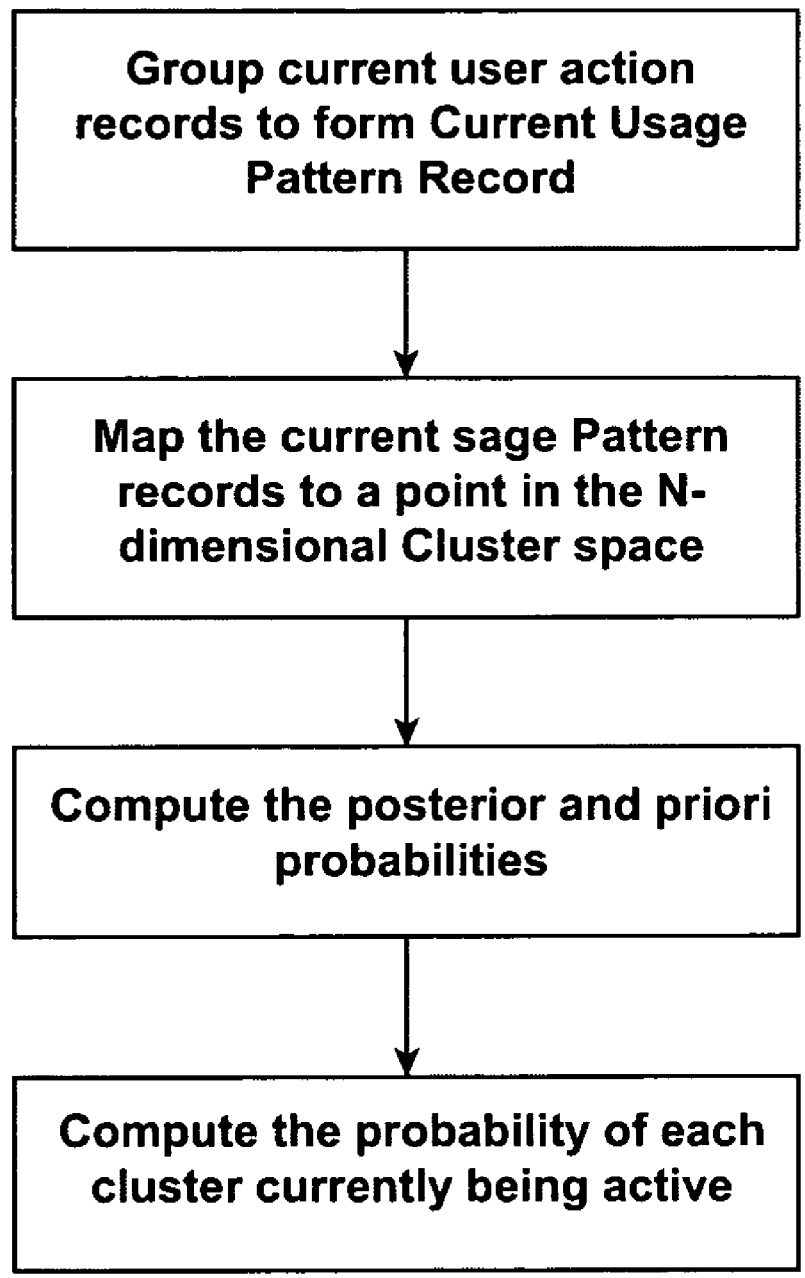

The current invention also provides a mechanism to predict profile that is active at any given time. FIG. 40 illustrates the method for identifying the profile currently active on the device. Current user actions are monitored and user action records are created. The most recent user action records are used to create a usage pattern record. The usage pattern record is mapped to a point in the cluster dimension. Using the Information about clusters representing multiple profiles, the, probability of each of the clusters being active given the usage pattern is computed. This is computed by using Bayesian Probability theory that can be used to compute the posterior probability using the prior probability and mixture weights. The probability of a cluster being active is computed using the probability of the usage-pattern record given the profile (P/usage_pattern profile), the probability of the profile being active and the probability of the usage record occurring. The mathematical representation for the Bayesian Probability theory in the current context is given below $P(\text{profile/usage\_pattern}) = P(\text{usage\_pattern, profile}) * P(\text{profile})) P(\text{usage\_pattern})$ In this equation probability of usage pattern record occurring given profile (P(usage-pattern, profile)) can be computed by knowing the probability distributions governing the clusters. In one embodiment, the cluster probability distribution can be assumed to be the Gaussian probability distribution, so that the P(usage_pattern profile) can be computed using the cluster center and cluster variation. Cluster center and the cluster variation are the output generated by the clustering process performed for generating multiple profiles.

In one embodiment, switching the device on can be one of the user actions recorded and "time of usage" one of the clustering dimension. In this embodiment, as soon as a user switches the device on, the probability for any cluster being active can be determined, even with out any further user actions. As the user performs more user actions, the current usage pattern record is refined to include more user action records and the probability of profiles which may be active is refined with the addition of each new user action record. As more user action records are added to the current usage pattern, a set of the oldest user action records may be removed from the current usage pattern record. This process ensures that the effect of individual user actions in the identification of active profiles decreases as time passes.

Figure 41:
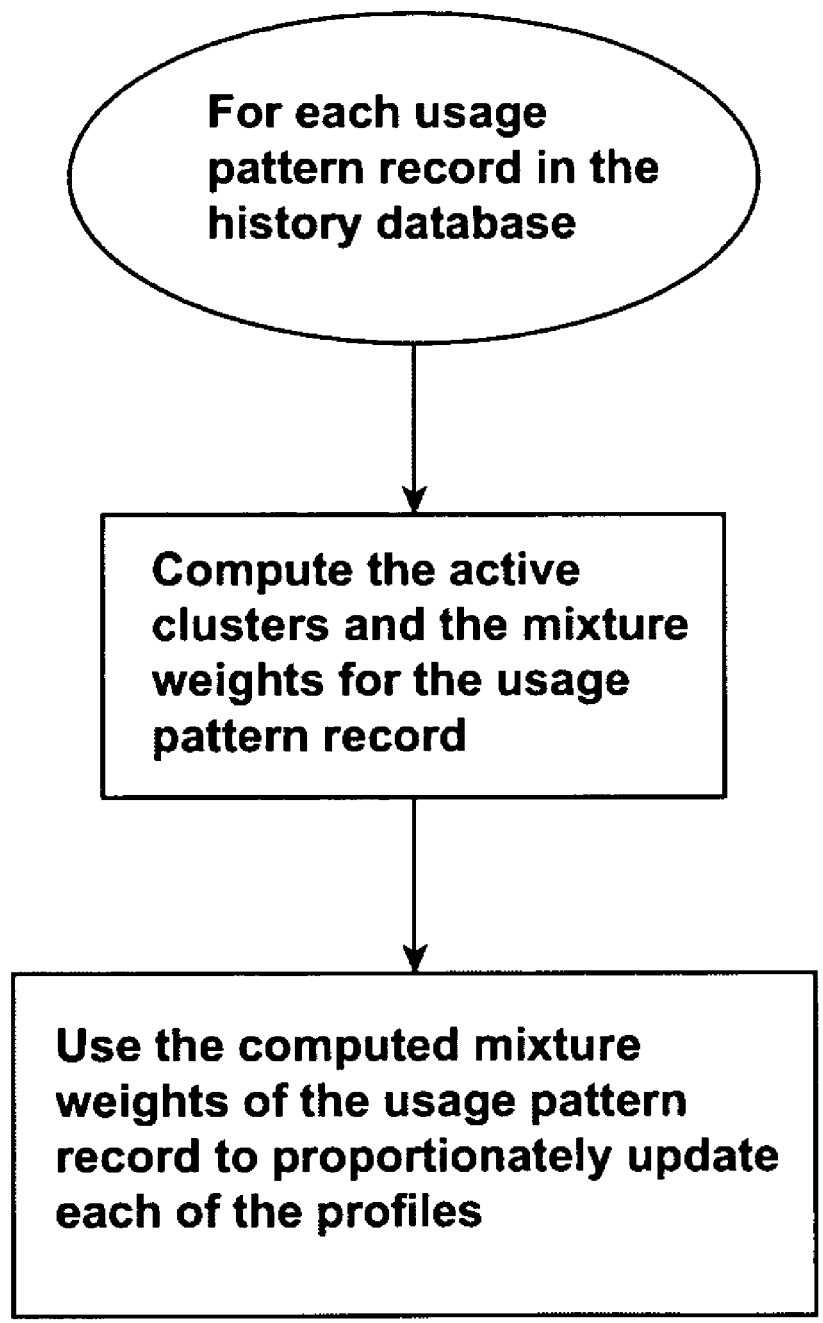

In one embodiment of the current invention, the clusters generated by the clustering procedures are used to create multiple profiles using a method described in FIG. 41. In this embodiment, the clusters are used to compute the probability of each clusters being active during the period of each usage pattern record. User preferences for each profile are created using processes described above using the user actions weighted by the probability of the corresponding cluster being active.

In yet another embodiment of the present invention, multiple profiles may be created for each user. Each of such multiple profiles may be used to describe the user's viewing preferences at various time periods, such as weekday or weekend, or morning or evening. The profiles may also vary according to other variables, such as showing more sports during football season, more gardening shows during spring, more political commentaries every four years during the primaries, etc. Thus, once the system of the invention is activated and the user who activated the system is recognized, the system may further determined the time of day and/or week and access the appropriate profile for the user.

Figure 43:
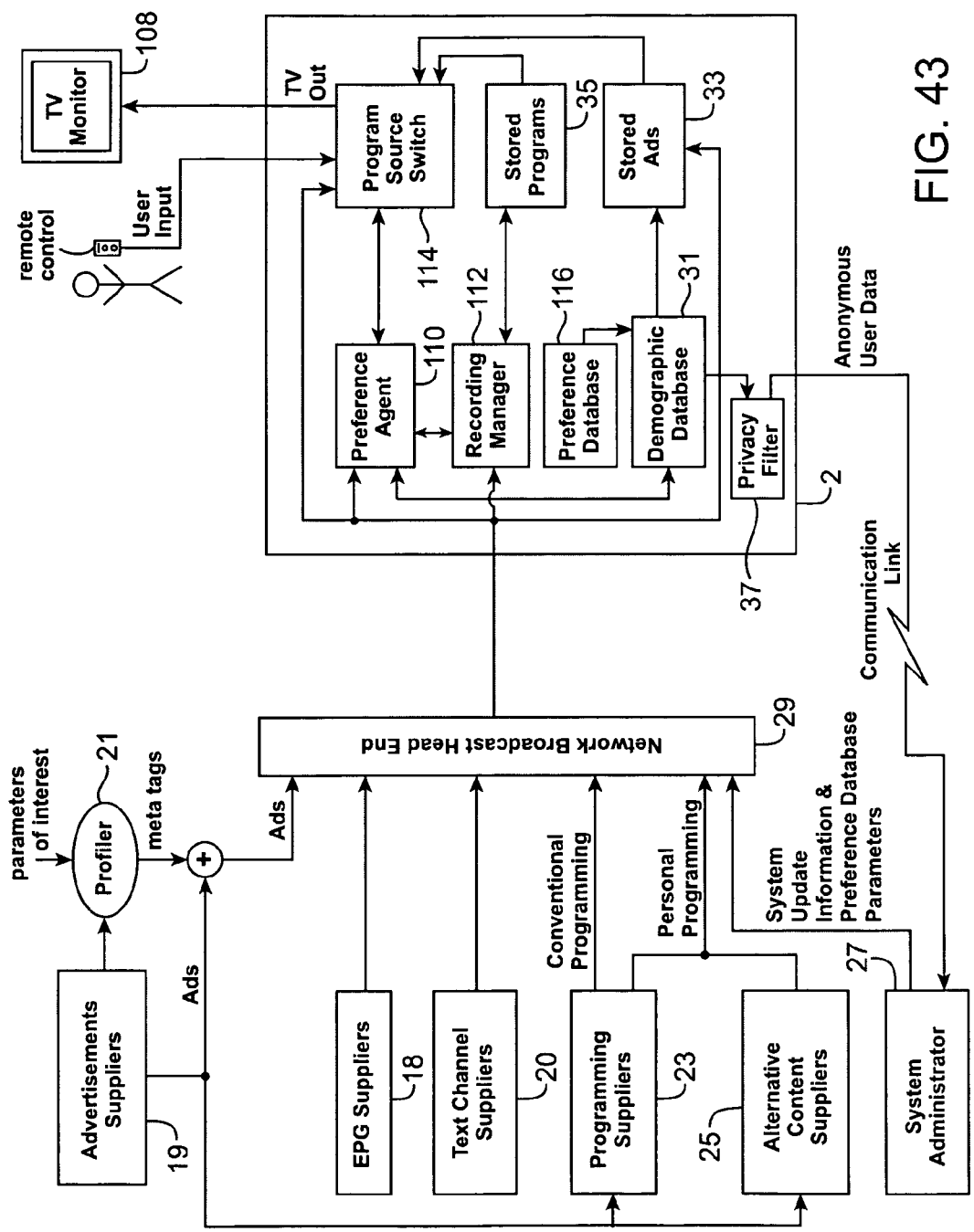
FIG. 43 illustrates an embodiment of a system according to the present invention.

With reference now to FIG. 43, in another preferred embodiment of the present invention used to deliver advertising content to specifically targeted viewers based upon their individual viewer profile, the broadcast network amasses content from the many different content providers and combines it at a network broadcast head end 29 into a broadcast signal that is transmitted to, and received by, the television control system 2 of the present invention. The control system 2 sorts through the content received from the broadcast network based upon the profiles of the different viewers in the particular household, compiles lists of preferred programs available to each user, records and stores programs of interest, and makes the programs available for viewing when required. Equally important, the control system 2 receives and sorts through various advertising content and stores the content most relevant to the viewers in the house hold based upon their demographic profiles and the target audience of the advertising content.

With greater particularity, and as shown in FIG. 43, content providers include EPG suppliers 18, text channel suppliers 20, conventional programming suppliers 23, and alternative content suppliers 25. As described below, alternative content refers to highly targeted programming that may be delivered through the use of a control system 2 as described herein. Conventional programming encompasses all types of programming currently available and including, but not limited to, movies, news, sport events, educational programs, pay-per-view shows, and shopping channels. Advertising content suppliers 19 provide promotional material such as short video clips or graphical and text information to programming suppliers 23 for inclusion in their conventional programming content, in a manner familiar to TV viewers worldwide. However, in a novel method of delivering advertising content uniquely available through the use of the present invention, advertising content may be supplied to alternative content suppliers (see discussion below) and may also be profiled through a profiler 21 to develop meta data descriptive of each individual advertising message. As discussed elsewhere in the specification, the meta data refers to demographic characteristics that describe the viewers to whom each advertisement is specifically targeted.

The profiler 21 may be a software based system or may rely upon human intervention to watch and analyze each advertising message and develop meta data descriptive of the advertisement. Alternatively, the advertising content suppliers 19 may provide this information along with the advertisement. The meta data is developed based upon the parameters of interest to the clients for whom the ads are developed, and will typically include the age, gender, ethnic background, education, profession, and other demographic information related to the viewer. The meta data will thus describe the viewers to which each advertising message is targeted in terms of the viewers' demographic information as defined by the parameters mentioned previously. The meta data thus generated is then appended to each advertisement and the thus-tagged advertisements are provided to the broadcast network for inclusion in the broadcast signal.

The tagged advertisements will preferably be provided in a plurality of channels, wherein each channel may carry a specific type of advertisement in terms of the target audience. Thus, each channel may be defined according to one demographic parameter or an often recurring combination, e.g. a channel with ads for men, a channel with ads for women, a channel with ads for male sports fans, etc. Alternatively, each channel may carry a stream of all types of ads, wherein each type of ad is present in a ratio dependent upon the demographic parameters to which it is targeted. Thus, ads targeted to male sports fans on weekend afternoons will be more numerous than ads targeted to young children, because of the large number of sports events broadcast at such time and the high probability that young children will be playing outside rather than watching TV indoors at such times. Although providing tagged advertising content via a plurality of channels is not a requirement of the invention, it is believed that the sheer amount of advertising content available will require multiple channels as a practical matter. Furthermore, providing channels in a pre-sorted manner may reduce the amount and complexity of the sorting carried out by the control system 2 (as more fully described below).

Also as shown in FIG. 43, the signal broadcast by the network may further include information provided by the administrator of the service provided by the invention, e.g. Metabyte Inc., the assignee of this application. As described in more detail elsewhere in the application, this information may include updates of the software of the control system 2.

With continued reference to FIG. 43, the network broadcast signal is transmitted to, and received by, the control system 2. The broadcast signal may be analog or digitally encoded, and may be transmitted via cable, satellite, telephone line, or any other practicable manner. In view of the large number of channels typically available and the state of the art, practical considerations will most likely dictate that the network signal be broadcast in digital form, in which case both the network head end 29 and the control system 2 will need to incorporate ADC and DAC circuitry, in a manner very well known to those skilled in the art. Furthermore, it is understood that the control system 2 will need to incorporate channel tuning circuitry that, although not shown in the figure, will be necessary to separate the numerous signals multiplexed in the broadcast signal and select any one of these signals (i.e. channels) as necessary.

Once received by the control system 2, the broadcast signal is supplied to various components of the system. The program switch 114 responds to the viewers input as provided via a remote control or similar unit to select the desired channel and direct the channel signal to the TV monitor 108. As described previously, the preference agent 110 monitors the viewing selection of the various viewers using the control system 2 and creates viewing profiles of each viewer that are stored in the preference database 116. Based upon these profiles, the preference agent 110 sorts through the incoming programming content as described in the EPG information to compile lists such as "Top 10" lists of viewing choices available at any given time to each viewer, and directs the recording manager 112 to record the top-ranked program being broadcast at any given time (including any programs selected by the viewers for recording) and store it in the stored programs memory device 35.

The preference agent further contains software that allows it to create a demographic profile for each viewer, based upon the viewing profile of the viewer and certain algorithms or associative rules. These algorithms may be adjusted over time as the model employed by the system administrator 27 is enhanced and its accuracy improves. To this end, the system update information channel included in the broadcast signal may include periodic software updates, including new preference database parameters that may need to be included at the request of the advertising suppliers 19. Thus, in one embodiment the control system 2 of the invention may be remotely upgraded to meet any new demands that may arise as advertising content providers become familiar with the system and the process of custom tailoring narrowly focused, targeted advertisements. The demographic profile created for each viewer is stored in the demographic database 31, which resides in the control system 2 and thus ensures the viewers privacy.

The preference agent 110 also sorts through the advertising content streaming in through multiple advertising channels contained within the broadcast signal and, based upon the demographic profiles of the viewers and the meta data contained in each advertisement to describe the target audience for the particular advertisement, stores and/or causes the display of particular advertisements. The control system 2 may utilize any of a variety of methods to manipulate the advertising content, as described below.

In one embodiment of the invention, the advertising channels each carry the same type of advertising. The preference agent determines which viewer is watching TV at any given time and stores in stored ads memory device 33 those tagged advertisements that are targeted to the particular viewer. At appropriate times during the program that is being watched by the viewer, such as during the commercial breaks typically inserted in most TV programs, the preference agent directs the program source switch 114 to access the stored ads and play a selected advertisement on the TV monitor 108. If the program being watched by the viewer contains information regarding the length of the commercial break, the preference agent may select stored ads of appropriate length to insert in the allotted time slot. The preference agent may further keep track of the ads that have been previously played to ensure that all stored ads are displayed equally. Alternatively, tagged ads may contain the desired number of times that the advertisement provider wants the ad to be aired during any given day, or perhaps the specific times at which the ad should be shown. Thus, after a number of ads having been stored, e.g. sufficient for a 24 hour period, the preference agent may review all of the stored ads meta data and develop a strategy for showing these ads to the viewer including when and how often.

Alternatively, the preference agent may cause a certain number of ads to be displayed and direct the recording manager 112 to record the selected program if the stored ads being displayed run longer than the allotted time slot for the commercial break. The control system 2 of the present invention can therefore manipulate the broadcast schedule of a program to a certain extent by modifying the amount of advertising content that the viewer is subjected to.

In another embodiment, the advertising channels may be operational for only a limited time during the day, typically at off-peak hours (e.g. 2 a.m.), during which all advertisements for the coming day may be downloaded and stored. Thus, an advertising channel may be turned on at a certain time and stream all advertisements to the control system during the space of an hour or two. Alternatively, a regular programming channel may suspend programming for an hour or two at a convenient time and supply the advertisements for the following day. In yet another alternative, a dedicated connection such as a phone line or an internet connection may be used for periodic downloads of advertisements.

In an alternative embodiment, multiple advertising channels carry a mixture of advertisements such that at any given time the preference agent has the option of selecting at least one advertisement targeted to the viewer from one of these channels. In this embodiment the control system need only to store one advertisement at any given time to ensure continuity between the program being watched and the advertisements. Thus, by way of example, the commercial break in the program may occur at a time that does not correspond to the beginning of an advertisement on any of the advertising channels. In this case, the advertisement stored by the control system is directed through the program source switch to the TV monitor while another targeted advertisement is concurrently stored for subsequent display. If the commercial break happens to coincide with the start of a targeted advertisement on any of the advertising channels, the preference agent can simply cause the program source switch to direct the particular channel to the TV monitor while another advertisement from another advertising channel is being stored.

In another embodiment, each regular programming channel can carry multiple, multiplexed versions of an advertisement. When a commercial break occurs, the preference agent selects the most appropriate version of the advertisement and directs it to the program source switch. This embodiment would require additional circuitry to de-multiplex the various versions of each add and apply the particular version selected by the preference agent to the program source switch.

The novel method of delivering targeted advertising that is provided by the invention is extremely advantageous to the advertising community. In one aspect, the invention allows greater freedom in producing advertisements because they no longer need to be appealing to as wide and varied an audience. Furthermore, because the alternative advertisements are delivered in real time, all viewers are reached by individualized advertisements at the same time, thus providing significant time savings in comparison with the prior art, wherein five different advertisements would require five different time slots during which to be broadcast. The cost savings thereby realized, especially during very popular events such as the Super Bowl, can be significant.

As mentioned above, preference agent 110 may sort through available channels to select the ten (or any other number) programs currently playing that most closely match the viewer's viewing profile. In addition, the preference agent may also build customized listings of future programs based upon the viewer's profile as well as any additional criteria specified by the user. In a preferred embodiment the user will have the ability to fully customize his viewing profile, including the values assigned to the different parameters that make up his or her viewing profile. In an alternative embodiment the user may even be allowed to specify what kind of advertising he prefers. Such a configuration would likely generate an alternative billing arrangement, whereby the user agrees to watch advertisements in exchange for the ability to specify the types of advertising he wishes to be subjected to and perhaps some sort of financial incentive.

Another novel possibility engendered by the present invention is the creation of a "personal channel" that is always showing the most interesting program being broadcast at any given time and/or previously recorded and stored programs that were very close matches to the viewer's profile. Thus, turning on to the personal channel will always guarantee the viewer the most individualized, interesting viewing experience available based upon the programs broadcast during a certain preceding time period that the viewer may specify. The personal channel may thus show a collage of movies, news segments, sports events, and any other programming content that was broadcast during the preceding 24 hours and that matched the viewer's profile to within a specified degree.

An additional element of control system 2 that may be incorporated only in selected control systems is a privacy filter 37 that deletes any personal information from the demographic database and transmits this anonymous information to the system administrator 27 for purposes of maintaining and updating the model used to generate the demographic database. Such models of the control system will require a feedback line for transmitting the demographic information to the system administrator, and in a preferred embodiment is a telephone line or a dedicated internet line such as DSL, cable, etc. The system administrator may offer financial or other incentives to users to convince them to supply this type of information. By carefully selecting users across a wide demographic cross section, the system administrator can use the information thus gathered to enhance the model used to develop a viewer's demographic profile based upon his or her viewer profile by comparing these users' actual demographic data with the demographic profile developed by the preference agent.

Due to the narrowly focused nature of the advertising delivered by the invention, the targeted advertising developed for delivery by the control system of the invention may include novel elements such as coupons or highly targeted descriptions. Thus, targeted advertising developed for distribution via the present invention may include specific information, couched in specific language, that is intended to be especially appealing to the target audience.

The invention further allows the creation of highly targeted content other than advertisements that can be delivered only to a very specific audience. Thus, movies, shows, religious programs, video magazines, infomercials, etc., may be developed to reach a very specific audience without the restrictions typically imposed on the content developers when the program will reach, or at least be accessible to, a very wide audience. This embodiment will require that such specific content be supplied via dedicated channels that cannot be tuned to directly by a conventional TV tuner, and thus may only be accessed through the control system 2. Such highly targeted content may be provided by alternative content suppliers 25 or even be developed for alternative distribution by conventional programming suppliers 23. Thus, use of the present invention may create a new distribution medium that will allow the content providers to not only reach a very specific audience but also to remotely, automatically exclude certain segments of the audience from accessing this material. Such alternative content could be broadcast exclusively on a viewer's personal channel, as described previously.

Figure 44:
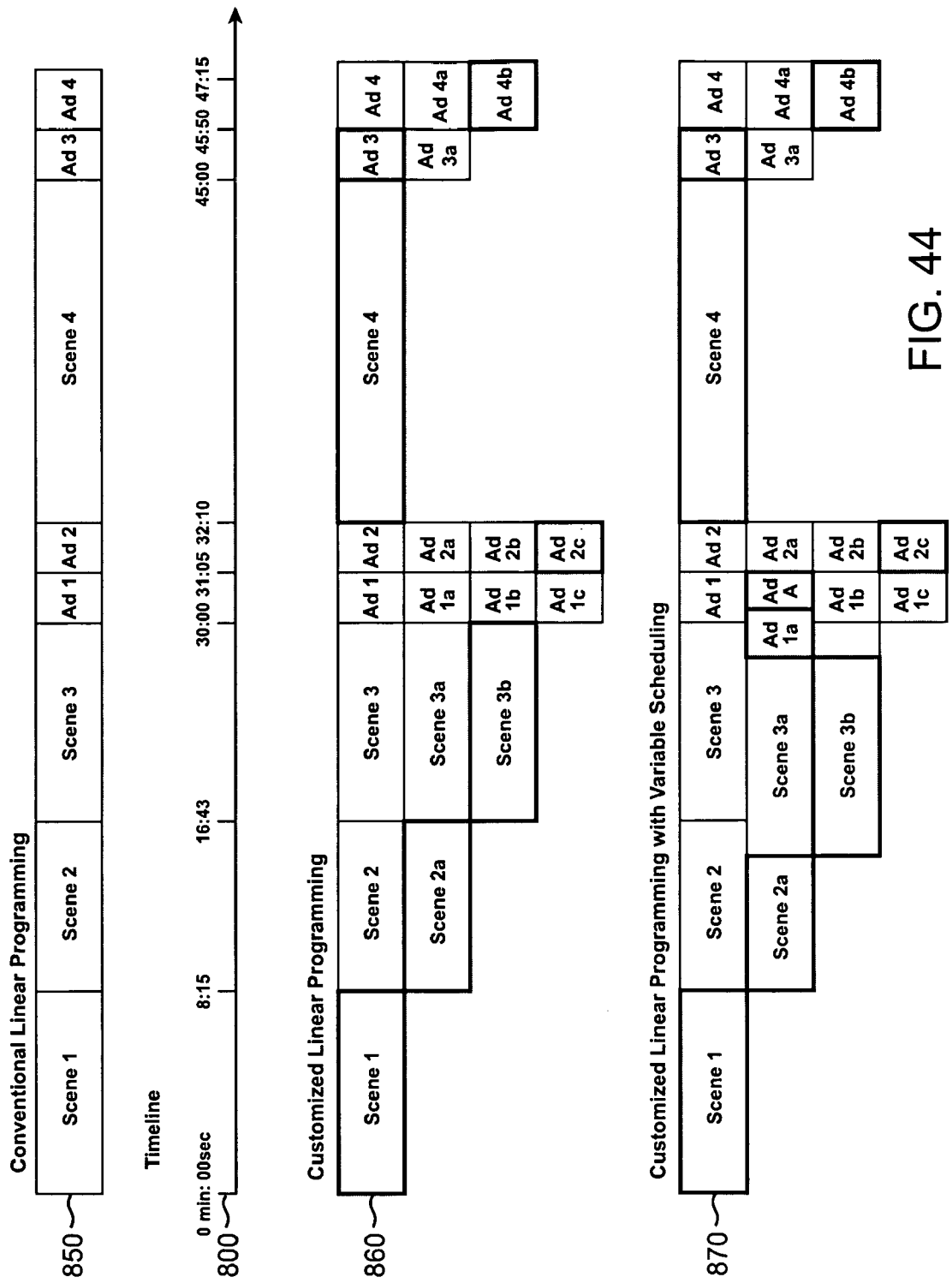
FIG. 44 illustrates custom linear programming according to the present invention.

The present invention thus enables the delivery of highly targeted content to a viewer that includes not only advertisements, but other programming and content. With reference now to FIG. 44, a time line 800 is shown tracking the progress of a typical television program 850. In conventional linear programming as currently available to TV viewers from broadcast as well as cable/DSS stations, program 850 is composed of scenes such as Scene 1, Scene 2, etc., and advertisements such as Ad 1, Ad 2, etc. In accordance with conventional linear programming, the scenes are shown sequentially as predetermined by the producer of the program, and are interspersed with showing of the advertisements as determined by the head-end operator. In accordance with the invention, customized linear programming is enabled due to the development of demographic and/or viewer preference profiles for each user. Thus, a customized linear program 860 may still be comprised of scenes interspersed with advertisements, but some or all of the scenes as well as the advertisements may now be targeted to various demographic or viewing traits of the user. Thus, Scene 2 may actually have been shot in two different versions by the producer of the television program, Scene 2 and Scene 2*a*, wherein each version of the scene is more appropriate, or of more interest, or less offensive, to a particular target audience. Thus, in one possible embodiment, Scene 2*a* may be a less violent or less graphic version of Scene 2. The system of the present invention receives TV signals carrying both scenes, and selects among the available alternatives based upon the profile of the currently watching user and the target data of the alternative scenes. Program 860 as shown in FIG. 44 is thus shown to the user in a linear, seamless manner as comprising Scene 1, alternative Scene 2*a*, alternative Scene 3*b*, alternative Ad 1*a*, alternative Ad 2*c*, Scene 4, Ad 3, and alternative Ad 4*b*.

The same matching and selection process occurs with Scenes 3, 3*a* and 3*b*, as well as the advertisements. Thus, Ad 1 may be provided in four variations, each targeting a different demographic characteristics, be it the users sex, income, geographic location, or any other desired characteristic. As previously mentioned, providing such targeted ads provides a more interesting and enjoyable watching experience for the user, and thus enhances the likelihood that the user will watch the advertisement rather than switch channels or walk away.

It is important to point out that the method of targeted advertising enabled by the invention is different from providing advertising messages by a programming guide. The present invention enables showing advertisements in an apparently conventional, linear manner whereby the broadcast of a television program is halted periodically by the head-end to broadcast advertisements. The advertisements thus shown are targeted to the individual user watching a particular TV set, but the user is not prompted in any manner to select between alternative ads or in any other way informed of the fact that alternative ads are being received by the set-top box. This is a different manner of providing targeted advertisements from providing targeted advertisements by a programming guide because, in a conventional programming guide context, the TV screen is typically split in at least two different areas, wherein one area shows program listings and the other area displays advertisements. Thus, in the context of a program guide, the user does not receive any programming at all, but rather only program listings and advertisements.

As shown in FIG. 44, alternate scenes and advertisements are preferably of the same length and thus occupy the same time slots within the program time line. However, it also possible to provide alternative advertisements and scenes of different lengths, such as those comprising television program 870. In this embodiment, the set top box would additionally fulfill the role of scheduler by calculating the length of each scene and advertisement and scheduling the scenes and advertisements for showing to the user in a seamless, apparently linear program with no interruptions or overlaps. In this embodiment both the scenes and the advertisements may be comprised of any combination of broadcast and previously recorded, stored scenes and advertisements. Thus, by way of example, in program 870 alternative Scene 2*a* may be shorter than alternative Scene 2, which would necessitate showing Scene 3*b* and Ad 1*a* at an earlier time. In this case, an additional Ad A may be shown between Ad 1a and Ad 2c, where Ad A is selected by the set top box because its target profile fits the demographic profile of the user and because it is of the appropriate length of time.

Providing a customized program will also be able to reach a wider audience by catering more individually to specific traits and characteristics of the general viewing population. Furthermore, providing such customized content may also allow greater artistic and expressive freedom for producers of programming, as they will be able to explore different variations of the same story line and edit various scenes for various audiences. Another possible use for the customized linear programming enabled by the present invention is providing highly individualized services such as news, weather, stock market quotes, shopping events, instructional videos, etc.

The popularity and acceptance of the system of the present invention will depend largely upon the cost to the end users, i.e. the viewers. As such, in one preferred financial arrangement, the user pays a set price for the control system, i.e. the hardware, connects the control system to his TV and incoming cable or satellite dish line, and enjoys the personalized services provided by the control system at no further cost. The system administrator will provide tagged advertisements for broadcast by the broadcast network and charge a fee to the advertisement client. The actual advertisements may be provided by an advertising content supplier or the advertising client itself (e.g. a truck manufacturer), to which the system administrator tags the meta data. The fee may be based upon the total number of control systems installed and/or the target audience that the advertising client wishes to reach. Thus, if a client wishes to air advertisements that are tagged to reach a relatively wide audience of viewers who have purchased and presumably installed the control system of the invention, the fee charged will be proportionally higher than the fee charged for a more narrowly focused advertisement.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. A method to deliver customized linear video programming to each of a plurality of individual viewers, comprising the steps of:
   (a) obtaining information representative of viewing habits and associated characteristics of a representative sample of the general population;
   (b) analyzing said representative information to generate parameters of a predictive model that explains the relationship between the viewing habits and the associated characteristics;
   (c) processing information indicative of preferences of each of the plurality of viewers in accordance with the predictive model, to develop viewer characteristics target information for each of the viewers; and
   (d) configuring a set of video programming segments for each viewer selected from a plurality of available video programming segments, to create an apparently linear program for linear delivery to the viewer in accordance with the viewer characteristics target information.

2. The method of claim 1 wherein analyzing said representative information further includes the steps of: constructing a Bayesian network to calculate maximum a posteriori values for the parameters of the predictive model to predict television program viewing preferences for each viewer.

3. The method of claim 1 wherein processing information indicative of preferences of each of the plurality of viewers includes the steps of: using said parameters in viewer devices, to develop viewer characteristics target information for each of the viewers.

4. The method of claim 3 wherein processing information indicative of preferences of each of the plurality of viewers includes the steps of: using said parameters in viewer devices to predict viewing preferences of individual viewers.

5. The method of claim 3 wherein processing information indicative of preferences of each of the plurality of viewers includes the steps of: using said parameters in viewer devices to predict viewing preferences of individual viewers, without divulging private information about viewing habits to the outside world.

6. The method of claim 5 further comprising the steps of communicating the predictive model parameters to viewer devices using a one way communication channel.

7. The method of claim 6 wherein the step of device configuring a set of video programming segments further includes the steps of:
   using said parameters in each viewer device to predict viewing preferences of individual viewers; and
   each viewer device configuring said set of video programming segments for each viewer selected from a plurality of available video programming segments, to create an apparently linear program for linear delivery to the viewer in accordance with the viewing preferences of individual viewers.

8. The method of claim 3 further comprising the steps of:
   receiving at least two simultaneous streams of video programming, each programming stream including a set of discrete alternative video programming segments, the video programming segments defining a plurality of content elements unrelated to one another;
   subdividing each video programming stream into its component set of discrete video programming segments, such that sequential display of the video programming segments results in an apparently linear video program;
   choosing particular ones of the discrete alternative video programming segments from each of the video programming streams based upon the viewer characteristics information;
   wherein the step of configuring a set of video programming segments further includes the steps of:
      configuring the chosen alternative video programming segments for each viewer, such that content elements of one programming stream meet the viewer characteristics target information for each of the viewers and are interspersed with unrelated content elements of the other programming stream which also meet the viewer characteristics target information for each of the viewers; and
      assembling the chosen alternative video programming segments from each of the video programming streams into a customized and apparently linear program for linear delivery to each of the plurality of viewers in accordance with the viewer characteristics information, the assembly performed without regard to a characteristic time duration of any one of the chosen alternative video programming segments so long as the apparently linear program runs within a given time period.

9. The method of claim 3 wherein processing information indicative of preferences of each of the plurality of viewers further includes the steps of: processing information indicative of television programs watched by each of the plurality of viewers.

10. The method of claim 3 wherein processing information indicative of preferences of each of the plurality of viewers further includes the steps of: processing information indicative of television programs recorded by each of the plurality of viewers.

11. The method of claim 3 wherein processing information indicative of preferences of each of the plurality of viewers further includes the steps of: processing information indicative of television programs not watched by each of the plurality of viewers.

12. The method of claim 3 wherein processing information indicative of preferences of each of the plurality of viewers further includes the steps of: processing information indicative of television program guide information requested by each of the plurality of viewers.

13. The method of claim 3 wherein processing information indicative of preferences of each of the plurality of viewers further includes the steps of: processing information indicative of television program guide information not requested by each of the plurality of viewers.

14. The method of claim 1 wherein processing information indicative of preferences of each of the plurality of viewers to develop viewer characteristics target information for each of the viewers further includes the steps of: processing information indicative of preferences of each of the plurality of viewers to develop demographic information for each of the viewers.

15. The method of claim 1 wherein configuring a set of video programming segments comprises: configuring a set of video programming segments selected from the group of video programming segments comprising advertising, entertainment, news, weather, financial, sports, educational, and shopping programming.

16. The method of claim 1 wherein configuring a set of video programming segments further comprises:
selecting one or more of the video programming segments from a plurality of available alternative video programming segments to create an apparently linear program for linear delivery to the viewer, the program exhibiting content customized in accordance with the viewer characteristics information.

17. The method of claim 1 wherein configuring a set of video programming segments further comprises:
selecting one or more of the video programming segments from a plurality of available alternative video programming segments to create an apparently linear program for linear delivery to the viewer, the program exhibiting content targeted to the viewer characteristics information.

18. A system to deliver customized linear video programming content to each of a plurality of individual viewers, comprising:
a predictive module that analyzes information representative of viewing habits and associated characteristics of a representative sample of the general population, to generate parameters of a predictive model that explains the relationship between the viewing habits and the associated characteristics;
a processor that processes information indicative of preferences of each of the plurality of viewers in accordance with the predictive model, to develop viewer characteristics target information for each of the viewers,
a programming controller that configures a set of video programming segments for each viewer selected from a plurality of available video programming segments, to create an apparently linear program for linear delivery to the viewer in accordance with the viewer characteristics target information.

19. The system of claim 18 wherein the predictive module analyzes said representative information to construct a Bayesian network to calculate maximum a posteriori values for the parameters of the predictive model to predict television program viewing preferences for each viewer.

20. The system of claim 18 wherein the processor further uses said parameters in viewer devices to develop viewer characteristics target information for each of the viewers.

21. The system of claim 20 further comprising viewer devices, wherein the processor further uses said parameters in viewer devices to predict viewing preferences of individual viewers.

22. The system of claim 20 wherein the processor further uses said parameters in viewer devices to predict viewing preferences of individual viewers, without divulging private information about viewing habits to the outside world.

23. The system of claim 22 wherein the predictive model parameters are communicated to viewer devices using a one way communication channel.

24. The system of claim 23 wherein the programming controller uses said parameters in each viewer device to predict viewing preferences of individual viewers, and configures said set of video programming segments for each viewer selected from a plurality of available video programming segments, to create an apparently linear program for linear delivery to the viewer in accordance with the viewing preferences of individual viewers.

25. The system of claim 20 wherein:
each viewer device comprises a receiver for receiving at least two simultaneous streams of video programming, each programming stream including a set of discrete alternative video programming segments, the video programming segments defining a plurality of content elements unrelated to one another;
the programming controller comprises: a programmer operative to subdivide each linear video program sequence into its component set of discrete video programming segments, means for choosing particular ones of the discrete alternative video programming segments from each of the video programming streams based upon the viewer characteristics information, means for configuring the chosen alternative video programming segments for each viewer such that content elements of one programming stream meet the viewer characteristics target information for each of the viewers and are interspersed with unrelated content elements of at least one of the other programming stream which also meet the viewer characteristics target information for each of the viewers, and means for assembling the chosen alternative video programming segments from each of the video programming streams into a customized and apparently linear program for linear delivery to each of the plurality of viewers in accordance with the viewer characteristics information.

26. The system of claim 20 wherein the processor further processes information indicative of television programs watched by each of the plurality of viewers.

27. The system of claim 20 wherein the processor further processes information indicative of television programs recorded by each of the plurality of viewers.

28. The system of claim 20 wherein the processor further processes information indicative of television programs not watched by each of the plurality of viewers.

29. The system of claim 20 wherein the processor further processes information indicative of preferences of each of the plurality of viewers further includes the steps of: processing information indicative of television program guide information requested by each of the plurality of viewers.

30. The system of claim 20 wherein the processor further processes information indicative of television program guide information not requested by each of the plurality of viewers.

31. The system of claim 18 wherein the processor further processes information indicative of preferences of each of the plurality of viewers to develop demographic information for each of the viewers.

32. The system of claim 18 wherein the programming controller configures a set of video programming segments by configuring a set of video programming segments selected from the group of video programming segments comprising advertising, entertainment, news, weather, financial, sports, educational, and shopping programming.

33. The system of claim 18 wherein the programming controller configures a set of video programming segments by selecting one or more of the video programming segments from a plurality of available alternative video programming segments to create an apparently linear program for linear delivery to the viewer, the program exhibiting content customized in accordance with the viewer characteristics information.

34. The system of claim 18 wherein the programming controller configures a set of video programming segments by selecting one or more of the video programming segments from a plurality of available alternative video programming segments to create an apparently linear program for linear delivery to the viewer, the program exhibiting content targeted to the viewer characteristics information.

* * * * *